United States Patent
Yamada et al.

(10) Patent No.: US 9,383,624 B2
(45) Date of Patent: Jul. 5, 2016

(54) REFLECTION-TYPE OPTICAL CONTROL ELEMENT

(71) Applicants: Yasusei Yamada, Aichi (JP); Kazuki Yoshimura, Aichi (JP); Kazuki Tajima, Aichi (JP)

(72) Inventors: Yasusei Yamada, Aichi (JP); Kazuki Yoshimura, Aichi (JP); Kazuki Tajima, Aichi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 94 days.

(21) Appl. No.: 14/408,336

(22) PCT Filed: Jun. 13, 2013

(86) PCT No.: PCT/JP2013/066391
§ 371 (c)(1),
(2) Date: Dec. 16, 2014

(87) PCT Pub. No.: WO2013/191085
PCT Pub. Date: Dec. 27, 2013

(65) Prior Publication Data
US 2015/0168801 A1   Jun. 18, 2015

(30) Foreign Application Priority Data

Jun. 20, 2012 (JP) .................................. 2012-139118
Apr. 22, 2013 (JP) .................................. 2013-089550

(51) Int. Cl.
*G02F 1/01* (2006.01)
*G02F 1/19* (2006.01)
(Continued)

(52) U.S. Cl.
CPC ............... *G02F 1/19* (2013.01); *G02F 1/1523* (2013.01); *E06B 2009/2464* (2013.01);
(Continued)

(58) Field of Classification Search
CPC ......... G02F 1/01; G02F 1/0018; G02F 1/153; G02F 1/1523; G02F 1/157; G02F 2201/34; G02F 2201/38; G02F 2201/501; G02F 2001/1536; G02F 2203/02; G02F 1/19; E06B 2009/2464; E06B 9/24
USPC ........... 359/240, 266, 267, 270, 275; 427/108
See application file for complete search history.

(56) References Cited

U.S. PATENT DOCUMENTS 5,635,729 A   6/1997   Griessen et al.
5,905,590 A   5/1999   Van Der Sluis et al.
(Continued)

FOREIGN PATENT DOCUMENTS

JP   2004-004795   1/2004
JP   2004-502196   1/2004
(Continued)

OTHER PUBLICATIONS

Extended European Search Report dated May 21, 2015.
(Continued)

*Primary Examiner* — Loha Ben
(74) *Attorney, Agent, or Firm* — IPUSA, PLLC

(57) ABSTRACT

A reflection-type optical control element has an optical control layer whose state is reversibly changed between a transparent state caused by hydrogenation and a reflective state caused by dehydrogenation, a catalyst layer that accelerates the hydrogenation and the dehydrogenation in the optical control layer, and an oxidation inhibition member that is arranged between the optical control layer and the catalyst layer and inhibits oxidation of the optical control layer that is caused by oxygen that permeates through the catalyst layer.

13 Claims, 34 Drawing Sheets

(51) Int. Cl.
  *G02F 1/15* (2006.01)
  *G02F 1/157* (2006.01)
  *E06B 9/24* (2006.01)
  *G02F 1/153* (2006.01)

(52) U.S. Cl.
  CPC ............... *G02F 1/153* (2013.01); *G02F 1/157* (2013.01); *G02F 2001/1536* (2013.01); *G02F 2201/34* (2013.01); *G02F 2201/38* (2013.01); *G02F 2201/501* (2013.01); *G02F 2202/34* (2013.01); *G02F 2203/02* (2013.01)

(56) References Cited

U.S. PATENT DOCUMENTS

| | | | | |
|---|---|---|---|---|
| 6,259,549 | B1* | 7/2001 | Leupolz | G02F 1/1523 359/265 |
| 6,647,166 | B2 | 11/2003 | Richardson | |
| 7,545,551 | B2* | 6/2009 | Yoshimura | G02F 1/1525 359/265 |
| 8,189,255 | B2* | 5/2012 | Yoshimura | G02F 1/1523 359/267 |
| 8,773,746 | B2* | 7/2014 | Tajima | C03C 17/36 359/267 |
| 2002/0089732 | A1 | 7/2002 | Ouwerkerk et al. | |
| 2003/0196454 | A1 | 10/2003 | Jin | |
| 2004/0021927 | A1 | 2/2004 | Milne et al. | |
| 2010/0039692 | A1 | 2/2010 | Yamada et al. | |
| 2012/0033476 | A1 | 2/2012 | Endo | |
| 2014/0247474 | A1* | 9/2014 | Yamada | E06B 9/24 359/240 |

FOREIGN PATENT DOCUMENTS

| | | |
|---|---|---|
| JP | 2007-039283 | 2/2007 |
| JP | 2007-301778 | 11/2007 |
| JP | 2008040422 | 2/2008 |
| JP | 2009-103936 | 5/2009 |
| JP | 2010-066747 | 3/2010 |
| JP | 2012-055155 | 3/2012 |
| KR | 10-2002-0071027 | 9/2002 |
| WO | 2007126313 | 11/2007 |

OTHER PUBLICATIONS

International Search Report mailed on Sep. 17, 2013.
Korean Office Action dated Nov. 13, 2015.

* cited by examiner

REFLECTION-TYPE OPTICAL CONTROL ELEMENT

TECHNICAL FIELD

The present invention relates to a reflection-type optical control element.

BACKGROUND ART

In general, a window (opening) of a building is a location for the transfer in and out of a lot of heat. For example, a rate of heat loss flowing from a window in a case of heating in winter is approximately 48% and a rate of heat inflowing from a window in a case of cooling in summer reaches even approximately 71%. Therefore, it is possible to obtain an effect of enormous energy saving by appropriately controlling light and/or heat through a window.

An optical control glass has been developed for such a purpose and has a function of controlling an inflow and/or outflow of light and/or heat.

There are some kinds of methods for executing an optical control of such an optical control glass, and it is possible to provide, for example, the following materials:

1) an electrochromic material with an optical transmittance that is reversibly changed by applying an electric current and/or an electric voltage thereto;

2) a thermochromic material with an optical transmittance that is changed depending on a temperature; and 3) a gasochromic material with an optical transmittance that is changed by a control of an atmospheric gas.

Among these, a study of an electrochromic optical control glass that uses a tungsten oxide thin film for an optical control layer is most advanced, so that a stage of practical application has generally been attained at present and a marketed product has also been provided.

However, an electrochromic optical control glass wherein a tungsten thin film is used for this optical control layer is such that a principle thereof is that light is absorbed by the optical control layer to execute an optical control. Therefore, there is a problem in that the energy saving effect is degraded because an optical control layer absorbs light so as to be heated and it is also re-radiated into the room interior. In order to eliminate this, an optical control is not executed by absorbing light and it is necessary to execute an optical control by reflecting light. That is, a material (reflection-type optical control element) has been desired that has a characteristic in such a manner that a state thereof is reversibly changed between a transparent state and a reflective state.

For a material that has such a characteristic, it has been found and reported in recent years that a state is reversibly changed between a transparent state and a reflective state due to hydrogenation and dehydrogenation of a rare earth metal such as a yttrium or a lanthanum (see, for example, Patent Document 1).

Otherwise, an alloy of a rare earth metal such as gadolinium and magnesium (see, for example, Patent Document 2), an alloy of magnesium and a transition metal (for example, see Patent Document 3), and an alloy of an alkaline-earth metal such as calcium and magnesium (for example, Patent Document 4) have already been known as a material that has a reflection-type optical control characteristic (optical control mirror characteristic).

However, there is a problem of degradation in the above-mentioned reflection-type optical control element in such a manner that switching between a transparent state and a reflective state is hardly executed after the switching is repeated. It is found that this major cause is that magnesium in a magnesium alloy layer being an optical control layer penetrates a palladium layer being a catalyst layer and emerges on a surface thereof, with repetition of switching, and such emerging magnesium is oxidized to be magnesium oxide so that hydrogen is not allowed to penetrate therethrough.

For this reason, a reflection-type optical control element with a thin film of a metal such as titanium, niobium, or vanadium as a buffer layer being inserted between an optical control layer and a catalyst layer has been developed in order to prevent such magnesium from emerging on a surface (see, for example, Patent Document 5).

However, even when a buffer layer is provided, about 500 times of switching causes degradation, and as it is exceeded, switching is hardly executed. Furthermore, there is a problem in that a transmittance of visible light in a transparent state is reduced by insertion of a buffer layer (see, for example, Patent Document 5).

Although fabrication of an element that is not degraded even when switching is repeated 10000 or more times is successful by using $Mg_{1-x-y}Y_xSc_y$ for an optical control layer (see, for example, Patent Document 6), a film thickness of an expensive palladium catalyst layer is increased for an optical control element with a high durability in order to inhibit permeation of oxygen into an optical control layer. Moreover, there is also a problem in that a transmittance in a transparent state is decreased as a film thickness of the catalyst layer is increased.

PRIOR ART DOCUMENTS

Patent Documents

[Patent Document 1] U.S. Pat. No. 5,635,729 specification
[Patent Document 2] U.S. Pat. No. 5,905,590 specification
[Patent Document 3] U.S. Pat. No. 6,647,166 specification
[Patent Document 4] Japanese Laid-Open Patent Application No. 2010-066747 official gazette
[Patent Document 5] Japanese Patent No. 4736090 official gazette
[Patent Document 6] Japanese Patent Application No. 2012-055155

SUMMARY OF THE INVENTION

Problems to be Solved by the Invention

A practical example of the present invention is provided by taking the above-mentioned point(s) into consideration, and aims at providing a reflection-type optical control element with an improved durability for repetition of switching between a transparent state and a reflective state and inhibited reduction of a transmittance thereof.

Means for Solving the Problem

According to one practical example of the present invention, a reflection-type optical control element is provided that has an optical control layer whose state is reversibly changed between a transparent state caused by hydrogenation and a reflective state caused by dehydrogenation, a catalyst layer that accelerates the hydrogenation and the dehydrogenation in the optical control layer, and an oxidation inhibition part that is arranged between the optical control layer and the catalyst layer and inhibits oxidation of the optical control layer that is caused by oxygen that permeates through the catalyst layer.

Effects of the Invention

According to a practical example of the present invention, it is possible to provide, for example, a reflection-type optical control element with a high repetition durability that inhibits degradation of the reflection-type optical control element that is caused by switching between a transparent state and a reflective state, by inserting an oxidation inhibition part between a catalyst layer and an optical control layer. Furthermore, according to a practical example of the present invention, it is possible to provide, for example, a reflection-type optical control element with a nearly colorless state, namely, a high optical transmittance, in a case where a transparent state is provided by hydrogenation, because it is possible to reduce a film thickness of a catalyst layer.

EMBODIMENTS FOR IMPLEMENTING THE INVENTION

A First Embodiment

In the present embodiment, a reflection-type optical control element for the present invention will be described.

A reflection-type optical control element for the present invention is characterized by being provided with an optical control layer whose state is reversibly changed between a transparent state caused by hydrogenation and a reflective state caused by dehydrogenation, a catalyst layer that accelerates hydrogenation and/or dehydrogenation in the optical control layer, and an oxidation inhibition part that is arranged between the optical control layer and the catalyst layer and inhibits oxidation of the optical control layer that is caused by oxygen that permeates through the catalyst layer.

Figure 1:
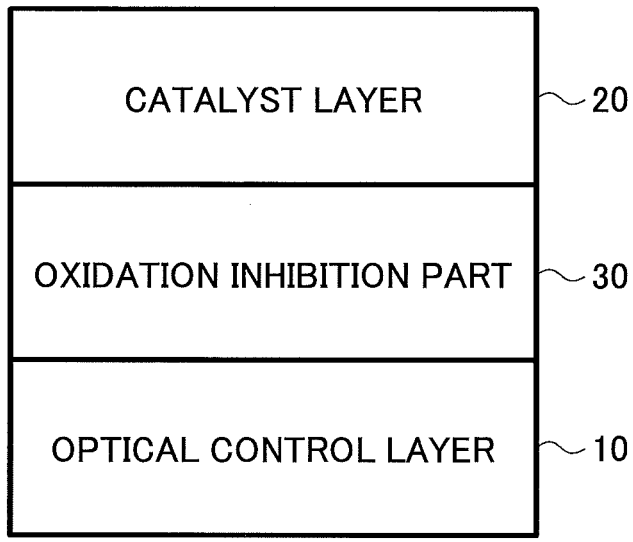
FIG. 1 A cross-sectional diagram of a reflection-type optical control element according to a first embodiment of the present invention.

FIG. 1 illustrates a configuration example of a reflection-type optical control element in the present invention. As illustrated in the figure, a reflection-type optical control element in the present embodiment is provided with an optical control layer 10, a catalyst layer 20, and an oxidation inhibition part 30.

The catalyst layer 20 also has a function of inhibiting oxidation of the optical control layer 10, and it is preferable for the catalyst layer 20 to be as thin as possible in order to increase a visible transmittance in a transparent state thereof. In this case, it is possible to improve a function of inhibiting oxidation of the optical control layer 10 by forming the oxidation inhibition part 30 described above, because only the catalyst layer 20 may provide an insufficient oxidation inhibition function for the optical control layer 10.

The oxidation inhibition part 30 is arranged between the catalyst layer 20 and the optical control layer 10. A configuration of the oxidation inhibition part 30 is not particularly limited, and it is sufficient to be capable of inhibiting oxidation of the optical control layer 10 that is caused by oxygen that permeates through the catalyst layer 20.

In particular, it is preferable for the oxidation inhibition part 30 to be provided with at least one kind of oxidation inhibition layer among three kinds of oxidation inhibition layers that will be illustrated below.

An low-oxygen-permeability oxidation inhibition layer that has a hydrogen permeability and inhibits permeation of oxygen to inhibit oxidation of the optical control layer.

A transmittance-variable oxidation inhibition layer that has a hydrogen permeability and reacts with oxygen to inhibit oxidation of the optical control layer, and further, changes a transmittance thereof due to hydrogenation thereof.

A mixing-type oxidation inhibition layer that has a part that has a hydrogen permeability and inhibits permeability of oxygen to inhibit oxidation of the optical control layer and a part that reacts with oxygen to inhibit oxidation of the optical control layer and further changes a transmittance thereof due to hydrogenation thereof.

This is because an oxidation inhibition part is provided with at least one layer among the three kinds of oxidation inhibition layers described above and thereby it is possible and preferable to have a function of inhibiting oxidation of the optical control layer 10 that is caused by oxygen, cooperatively with the catalyst layer 20.

The three kinds of oxidation inhibition layers mentioned above will be described below.

First, a low-oxygen-permeability oxidation inhibition layer will be described.

For a material of a low-oxygen-permeability oxidation inhibition layer, such a material is not limited as long as a hydrogen permeability and a characteristic for inhibiting permeation of oxygen (or an oxygen impermeability) are possessed in combination, and it is possible to use, for example, a metal thin film or a metal multilayer film.

Furthermore, the low-oxygen-permeability oxidation inhibition layer may slightly be oxidized by repeating switching between a transparent state caused by hydrogenation and a reflective state caused by dehydrogenation. For that reason, it is also preferable to have a hydrogen permeability and an oxygen impermeability, for an oxide of a substance that composes such a low-oxygen-permeability oxidation inhibition layer, for example, in a case where the low-oxygen-permeability oxidation inhibition layer is a metal thin film, an oxide of such a metal.

Moreover, the catalyst layer 20 may diffuse to a side of the optical control layer 10. In a case where a metal with a weight density greater than that of the catalyst layer 20 is used for a low-oxygen-permeability oxidation inhibition layer, it is possible to inhibit such diffusion, and hence, it is possible for a low-oxygen-permeability oxidation inhibition layer to be composed of a metal with a weight density greater than that of (a material of) the catalyst layer 20.

For a metal that composes a low-oxygen-permeability oxidation inhibition layer, it is possible to provide, for example, tungsten, tantalum, hafnium, or an alloy of the aforementioned metal. Here, no limitation of these is provided and it is sufficient to comply with the requirement(s) described above, wherein it is also possible to preferably use, for example, a material that has a function similar to that of a metal (or an alloy thereof) as described above.

As described above, a configuration of a low-oxygen-permeability oxidation inhibition layer is not limited, and it is preferable for a low-oxygen-permeability oxidation inhibition layer to be, for example, a thin film that includes at least one kind of metal selected from tungsten, tantalum, and hafnium or an alloy that includes the aforementioned metal (that is at least one kind selected from tungsten, tantalum, and hafnium), and/or an oxide of the metal (that is at least one kind selected from tungsten, tantalum, and hafnium) or the alloy.

Next, a transmittance-variable oxidation inhibition layer will be described.

A transmittance-variable oxidation inhibition layer is a layer that has a hydrogen permeability as described above and reacts with oxygen to inhibit oxidation of the optical control layer, and further changes a transmittance thereof due to hydrogenation. Because such a transmittance-variable oxidation inhibition layer functions as a sacrifice layer that reacts with oxygen that permeates through the catalyst layer 20 and inhibits oxidation of an optical control layer, it is preferable to have a film thickness that that is greater than that of a low-oxygen-permeability oxidation inhibition layer.

For that reason, it is preferable to use one that has a characteristic in such a manner that, when the optical control layer 10 is in a transparent state, a transmittance-variable oxidation inhibition layer also changes to a transparent state simultaneously, as a material that composes a transmittance-variable oxidation inhibition layer, so that a transmittance in a transparent state is not reduced even when a film thickness of a transmittance-variable oxidation inhibition layer is increased.

For a material of a transmittance-variable oxidation inhibition layer, such a material is not particularly limited and is able to be used as long as a hydrogen permeability and a characteristic for reacting with oxygen to inhibit oxidation of an optical control layer and changing a transmittance due to hydrogenation are possessed in combination.

In particular, for a transmittance-variable oxidation inhibition layer, it is possible to preferably use, for example, a metal material that is used for an optical control layer of an optical control mirror. Specifically, it is preferable for a transmittance-variable oxidation inhibition layer to be, for example, a thin film that includes scandium or a magnesium-scandium alloy, and/or a hydride of scandium or a magnesium-scandium alloy.

In particular, it is possible to preferably use a scandium or magnesium-scandium alloy thin film. For a magnesium-scandium alloy, a composition thereof is not particularly limited, and for example, it is preferable for a composition of a magnesium-scandium alloy thin film to be $Mg_{1-x}Sc_x$ ($0.4 \leq x < 1$) wherein it is more preferable for a value of x that indicates a ratio of Sc to satisfy a relation of $0.5 \leq x < 1$.

Next, a mixing-type oxidation inhibition layer will be described.

A mixing-type oxidation inhibition layer has a part that has a hydrogen permeability as described above and inhibits permeation of oxygen to inhibit oxygen of a an optical control layer as described above, and a part that reacts with oxygen to inhibit oxidation of the optical control layer and further changes a transmittance due to hydrogenation.

That is, a material of a low-oxygen-permeability oxidation inhibition layer as described above and a material of a transmittance-variable oxidation inhibition layer are included in one layer.

Distributions or ratios of a material of a low-oxygen-permeability oxidation inhibition layer and a material of a transmittance-variable oxidation inhibition layer in a mixing-type oxidation inhibition layer are not particularly limited, and for example, a material of a transmittance-variable oxidation inhibition layer may be irregularly or regularly distributed in a material of a low-oxygen-permeability oxidation inhibition layer. Alternatively, a material of a low-oxygen-permeability oxidation inhibition layer may be configured to be distributed in a material of a transmittance-variable oxidation inhibition layer.

Furthermore, a mixing-type oxidation inhibition layer may be divided into a plurality of areas to arrange each of a material of a low-oxygen-permeability oxidation inhibition layer and a material of a transmittance-variable oxidation inhibition layer for each area.

A mixing-type oxidation inhibition layer may be configured to mix both materials that are a material of a low-oxygen-permeability oxidation inhibition layer and a material of a transmittance-variable oxidation inhibition layer, without being divided into areas.

Here, it is preferable for the oxidation inhibition part 30 to be provided with either one kind of a low-oxygen-permeability oxidation inhibition layer, a transmittance-variable oxidation inhibition layer, and a mixing-type oxidation inhibition layer, wherein it is also possible to be provided with two kinds selected from three kinds as described above and it is also possible to include all of the three kinds. Furthermore, in any case, a provided layer is not limited to one layer and it is also possible to provide a multilayer as necessary. That is, a configuration may be, for example, such that two or more layers or a plurality of layers are included that are low-oxygen-permeability oxidation inhibition layers (or transmittance-variable oxidation inhibition layers or mixing-type oxidation inhibition layers).

Moreover, a layer other than three kinds of oxidation inhibition layers as described above may be formed in an oxidation inhibition part of a reflection-type optical control element.

A layer thickness of each oxidation inhibition layer provided in an oxidation inhibition part as described above is not particularly limited and is able to be selected depending on a kind of a composing material, an application of use, a required durability, or the like. However, in a case where a layer thickness is increased excessively, an optical transmittance may be affected thereby, and hence, it is preferable for an oxidation inhibition layer provided in an oxidation inhibition part to be, for example, such that a thickness of one layer (a layer thickness of each layer (a film thickness)) is less than or equal to 10 nm. A lower limit thereof is not particularly limited and is able to be selected depending on a required performance or the like. In particular, it is more preferable for a thickness of one layer to be less than or equal to 5 nm, wherein it is further preferable to be less than or equal to 4 nm, because it is preferable to be thinner in order to inhibit reduction of an optical transmittance while oxidation of an optical control layer is inhibited.

Here, a thickness of one layer as referred to herein means a thickness of an individual composing layer in a case where an oxidation inhibition part is composed of a plurality of layers (a plurality of kinds of layers and/or a plurality of layers with an identical kind) as described above, or means a thickness of one layer in a case where it is composed of only such one layer.

It is possible to fabricate an oxidation inhibition layer as described above, independently of a kind thereof, by for example, a sputtering method, a vacuum deposition method, an electron beam deposition method, a chemical vapor deposition (CVD) method, a plating method, or the like. However, no limitation to these methods is provided.

The optical control layer 10 has a chromic characteristic in such a manner that a state thereof is reversibly changed between a transparent state caused by hydrogenation and a reflective state (metallic state) caused by dehydrogenation. That is, the optical control layer 10 has a function of adjusting an optical transmittance.

It is sufficient for the optical control layer 10 to have a material that has a chromic characteristic in such a manner that a state thereof is reversibly changed between a transparent state caused by hydrogenation and a reflective state (metallic state) caused by dehydrogenation, and a specific material thereof is not limited.

However, it is preferable for a configuration thereof to have a rare-earth-magnesium alloy such as Y—Mg, La—Mg, Gd—Mg, or Sm—Mg, or a magnesium-transition metal alloy such as Mg—Ni, Mg—Mn, Mg—Co, or Mg—Fe, or an alloy that includes at least one kind of element selected from group II elements and two or more kinds of elements selected from group III elements and rare-earth elements, and/or a hydride of an alloy as described above.

Such an alloy stores hydrogen therein to be a colorless and transparent state and releases hydrogen to be a silver and reflective state. Here, the optical control layer 10 may include an element other than an alloy as described above, as a trace component (inevitable component).

A method for executing hydrogenation or dehydrogenation of the optical control layer 10 is not particularly limited. For a hydrogenation or dehydrogenation method, for example, three kinds that are first to third methods as described below are known, and hydrogenation or dehydrogenation may be executed by any method.

A first method is generally referred to as a gasochromic approach and is a method that exposes the optical control layer 10 to a gas that includes hydrogen to execute hydrogenation thereof and exposes the optical control layer 10 to a gas that includes oxygen (air) to execute dehydrogenation.

A second method is generally referred to as an electrochromic approach and is a method that uses a liquid electrolyte (an electrolyte fluid) to execute hydrogenation or dehydrogenation of the optical control layer 10.

A third method is also generally referred to as an electrochromic approach and is a method that uses a solid electrolyte to execute hydrogenation or dehydrogenation of the optical control layer 10.

A layer thickness (film thickness) of the optical control layer 10 is selected by taking an optical transmittance, a durability, or the like into consideration and is not particularly limited, and it is preferable to be greater than or equal to 10 nm and less than or equal to 200 nm. This is because if it is less than 10 nm, an optical reflectance in a reflective state may be insufficient, and on the other hand, if it is greater than 200 nm, an optical transmittance in a transparent state may be insufficient.

A formation method for the optical control layer 10 is not particularly limited and it is possible to use a general film formation method. For example, it is possible to use a sputtering method, a vacuum deposition method, an electron beam deposition method, a chemical vapor deposition (CVD) method, or a plating method.

The catalyst layer 20 is formed on the oxidation inhibition part 30 as illustrated in FIG. 1 and has a function of accelerating hydrogenation or dehydrogenation in the optical control layer 10. The catalyst layer 20 ensures a sufficient switching rate from a transparent state to a reflective state and a sufficient switching rate from a reflective state to a transparent state.

It is sufficient for the catalyst layer 20 to have a function of accelerating hydrogenation or dehydrogenation of the optical control layer 10 and no particular limitation is applied thereto, wherein it is preferable to have at least one metal selected from, for example, palladium, platinum, a palladium alloy, and a platinum alloy. In particular, palladium with a high hydrogen permeability is preferably used.

A film thickness of the catalyst layer 20 is appropriately selected depending on a reactivity of the optical control layer 10, a catalytic performance of the catalyst layer 20, or the like, and is not limited, wherein it is preferable to be greater than or equal to 1 nm and less than or equal to 20 nm. If it is less than 1 nm, a function as a catalyst may not sufficiently developed, and on the other hand, if it is greater than 20 nm, an optical transmittance may not be sufficient while a change in improvement of a function as a catalyst is not provided.

In particular, the present invention has the oxidation inhibition part 30, so that it is possible to inhibit oxidation of the optical control layer 10 even when a thickness of the catalyst layer 20 is reduced. For this reason, it is more preferable for a thickness of the catalyst layer 20 to be greater than or equal to 1 nm and less than or equal to 10 nm, wherein it is further preferable to be greater than or equal to 1 nm and less than or equal to 5 nm and it is particularly preferable to be greater than or equal to 1 nm and less than or equal to 4 nm.

A method for formation of the catalyst layer 20 is not particularly limited and it is possible to apply a general film formation method thereto. Specifically, it is possible to use, for example, a sputtering method, a vacuum deposition method, an electron beam deposition method, a chemical vapor deposition (CVD) method, a plating method, or the like, in a method for formation of the catalyst layer 20.

As described above, it is possible for a reflection-type optical control element with the oxidation inhibition part 30 in the present invention to be a reflection-type optical control element with a high switching repetition durability, a high transmittance in a transparent state, and an excellent optical control characteristic, as compared with a reflection-type optical control element that does not include the oxidation inhibition layer 30.

A Second Embodiment

In the present embodiment, a reflection-type optical control element will be described in such a manner that two kinds of oxidation inhibition layers that are a low-oxygen-permeability oxidation inhibition layer and a transmittance-variable oxidation inhibition layer are provided as the oxidation inhibition part 30 in the reflection-type optical control element described in the first embodiment.

Figure 2:
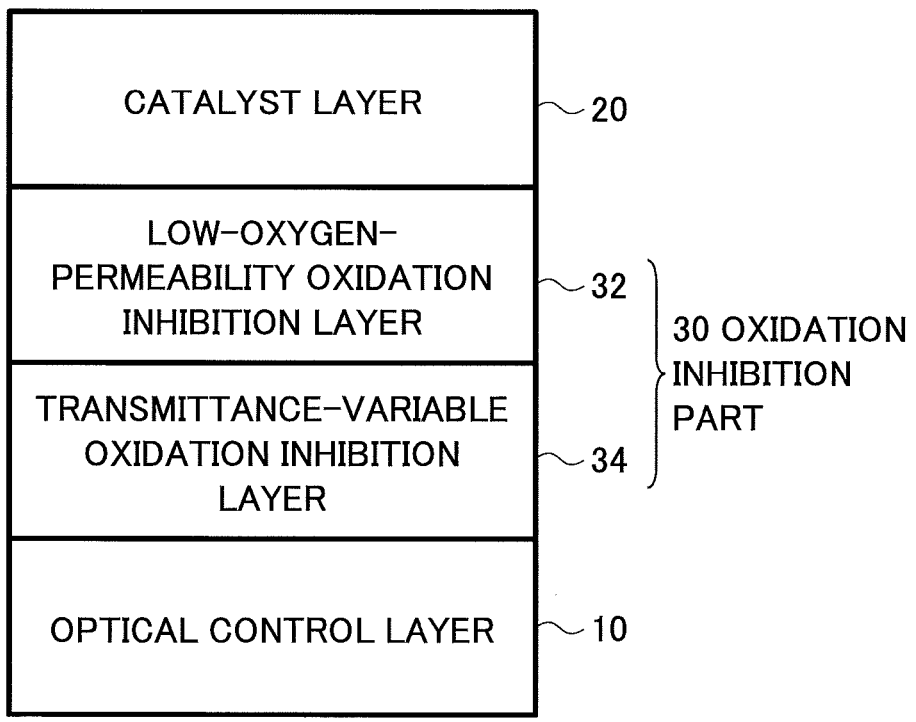
FIG. 2 A cross-sectional diagram of a reflection-type optical control element according to a second embodiment of the present invention.

A configuration example of a reflection-type optical control element in the present embodiment will be illustrated in FIG. 2.

As illustrated in FIG. 2, the oxidation inhibition part 30 in the reflection-type optical control element described in the first embodiment is provided with the low-oxygen-permeability oxidation inhibition layer 32 and the transmittance-variable oxidation inhibition layer 34. Then, the oxidation inhibition part 30 is characterized by being provided with the transmittance-variable oxidation inhibition layer 34 at a side of the optical control layer 10 with respect to the low-oxygen-permeability oxidation inhibition layer 32.

A reflection-type optical control element in the present embodiment is such that two kinds of oxidation inhibition layers that are the low-oxygen-permeability oxidation inhibition layer 32 and the transmittance-variable oxidation inhibition layer 34 are provided for an oxidation inhibition part, wherein a configuration other than the low-oxygen-permeability oxidation inhibition layer 32 and the transmittance-variable oxidation inhibition layer 34 is similar to that described in the first embodiment, and hence, a description thereof will be omitted herein.

The two kinds of oxidation inhibition layers are arranged (inserted) between the optical control layer 10 and the catalyst layer 20. Then, the low-oxygen-permeability oxidation inhibition layer 32 and the transmittance-variable oxidation inhibition layer 34 are formed at a side of the catalyst layer 20 with reference to the transmittance-variable oxidation inhibition layer 34 and at a side of the optical control layer 10 with reference to the low-oxygen-permeability oxidation inhibition layer, respectively, and cooperate with the catalyst layer 20 to have a function of inhibiting oxidation of the optical control layer 10 that is caused by oxygen.

Although the catalyst layer 20 and the low-oxygen-permeability oxidation inhibition layer 32 also have a function of inhibiting oxidation of the optical control layer 10, only the catalyst layer 20 and the low-oxygen-permeability oxidation inhibition layer 32 may be such that a function of inhibiting permeation of oxygen is not sufficient, and hence, the transmittance-variable oxidation inhibition layer 34 that is a sacrifice layer is formed so that it is possible to further improve a function of inhibiting oxidation of the optical control layer 10.

Such a reflection-type optical control element is such that the transmittance-variable oxidation inhibition layer 34 on the optical control layer 10, the low-oxygen-permeability oxidation inhibition layer 32 thereon, and then the catalyst layer 20 are deposited in sequence. Although it is also possible to reverse a sequence (arrangement) of the transmittance-variable oxidation inhibition layer 34 and the low-oxygen-permeability oxidation inhibition layer 32, an oxidation inhibition cooperation effect of two kinds of oxidation inhibition layers may be reduced in this case, and hence, it is preferable to be arranged in a sequence as described above.

Thus, two kinds of oxidation inhibition layers that are the low-oxygen-permeability oxidation inhibition layer 32 and the transmittance-variable oxidation inhibition layer 34 are provided, and thereby, it is possible to inhibit oxidation of the optical control layer 10 that is caused by permeation of oxygen even when a film thickness of the catalyst layer 20 is reduced. For this reason, it is possible to prevent degradation, improve a durability, and further, improve a transmittance in a transparent state, of the optical control layer 10.

A Third Embodiment

In the present embodiment, a reflection-type optical control element will be described in such a manner that an antireflection layer is provided for the reflection-type optical control element described in the first embodiment or the second embodiment.

Figure 3:
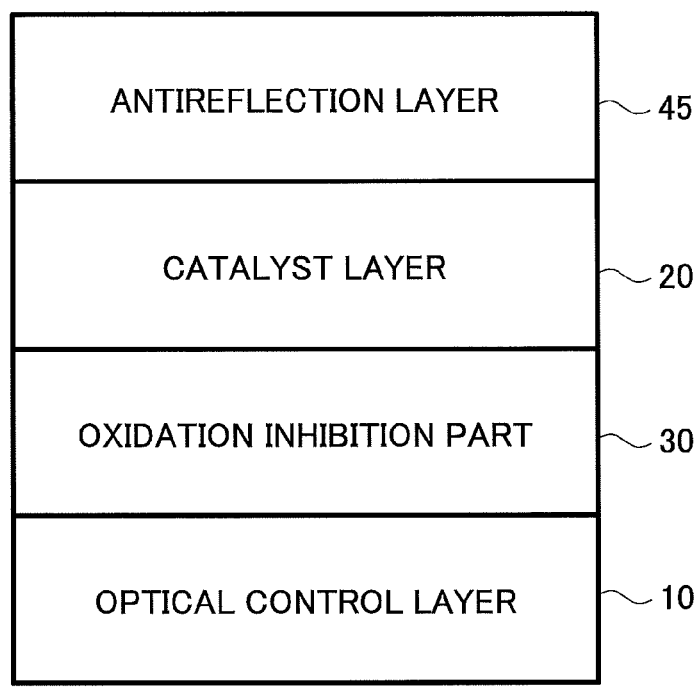
FIG. 3 A cross-sectional diagram of a reflection-type optical control element according to a third embodiment of the present invention.

A configuration example of a reflection-type optical control element in the present embodiment is illustrated in FIG. 3.

A reflection-type optical control element in the present embodiment is such that the reflection-type optical control element described in the first embodiment is provided with an antireflection layer 45 at an opposite side of the oxidation inhibition part 30 with reference to the catalyst layer 20. For example, it is possible to provide the antireflection layer 45 on a surface of the catalyst layer 20 at an opposite side of a surface that contacts the oxidation inhibition part 30, as illustrated in FIG. 3.

The antireflection layer 45 has a function of decreasing reflection and increasing a transmittance, on a surface of a reflection-type optical control layer in a transparent state. Furthermore, it is preferable for the antireflection layer 45 to have a hydrogen permeability. Moreover, it is preferable to have a function of preventing oxidation of the optical control layer 10 that is caused by water or oxygen. It is particularly preferable to be provided with a water-repellency in order to prevent oxidation of the optical control layer 10 that is caused by water or oxygen.

A material of the antireflection layer 45 is not particularly limited and it is possible to preferably use one that has a function of transmitting visible light, permeating hydrogen, and increasing a transmittance of a reflection-type optical control element in a transparent state in a visible region.

However, it is more preferable for a configuration thereof to be such that a refractive index of an antireflection layer in a visible region of 380 nm to 780 nm is greater than or equal to 1.3 and less than or equal to 3.4 as a result of a computer simulation in a case where refractive indices and film thicknesses of the optical control layer 10 in a transparent state, an oxidation inhibition part, and a catalyst layer are taken into consideration, wherein it is further preferable to be greater than or equal to 1.5 and less than or equal to 3.1 and it is particularly preferable to be greater than or equal to 1.6 and less than or equal to 2.7.

As described above, a material of an antireflection layer is not particularly limited. However, it is preferable to include, for example, a metal oxide and/or a polymer in order to provide a refractive index in a range as described above. In particular, it is preferable to be composed of a metal oxide and/or a polymer.

It is preferable for a metal oxide as described above to be, for example, at least one kind selected from cerium oxide, hafnium oxide, niobium oxide, tantalum pentoxide, titanium dioxide, tungsten oxide, yttrium oxide, zinc oxide, and zirconium oxide.

Furthermore, it is preferable for a polymer as described above to be, for example, a fluororesin. This is because a fluororesin does not only function as an antireflection layer but also has a water-repellency so that it is possible to inhibit water from permeating from exterior into the optical control layer 10. For this reason, it is possible for an antireflection layer that includes a fluororesin to further inhibit degradation and improve a durability, of the optical control layer 10.

For an antireflection layer, it is also possible to be composed of one layer or it is also possible to be composed of a plurality of layers. In a case where an antireflection layer is composed of a plurality of layers, it is possible for respective layers to be formed of different materials. Furthermore, a plurality of different materials may be included in one layer.

A film thickness of the antireflection layer 45 is appropriately selected depending on refractive indices, film thicknesses, and the like of the optical control layer 10 in a transparent state, the oxidation inhibition part 30, and the catalyst layer 20, and is not limited. However, it is preferable for a film thickness of the antireflection layer 45 to be greater than or equal to 25 nm and less than or equal to 125 nm in order to improve a transmittance for visible light, wherein it is more preferable to be greater than or equal to 35 nm and less than or equal to 105 nm and it is further preferable to be greater than or equal to 45 nm and less than or equal to 85 nm.

A method for formation of the antireflection layer 45 is not particularly limited and it is possible to use a general film formation method. For example, it is possible to use a sputtering method, a vacuum deposition method, an electron beam deposition method, a chemical vapor deposition (CVD) method, a plating method, spin-coat, or dip-coat.

Here, although a reflection-type optical control element in the present embodiment has been described in such a manner that the reflection-type optical control element described in the first embodiment is provided with the antireflection layer 45, it is also possible to provide a reflection-type optical control element in such a manner that the reflection-type optical control element described in the second embodiment is provided with an antireflection layer. That is, it is possible to provide a configuration in such a manner that a configuration in FIG. 3 is provided with two kinds of oxidation inhibition layers that are the low-oxygen-permeability oxidation inhibition layer 32 and the transmittance-variable oxidation inhibition layer 34 as the oxidation inhibition part 30. This case is preferable because it is possible to further inhibit oxidation, and improve a durability, of the optical control layer 10, as described in the second embodiment.

The reflection-type optical control element described in the first or second embodiment is provided with an antireflection layer, and thereby, it is possible to further improve a transmittance in a transparent state that could have been improved by reducing a film thickness of the catalyst layer 20. Moreover, improvement of a color in a transparent state is also possible.

A Fourth Embodiment

In the present embodiment, a reflection-type optical control member will be described in such a manner that the reflection-type optical control element described in the first embodiment, the second embodiment, or the third embodiment is provided with a transparent member.

Figure 4:
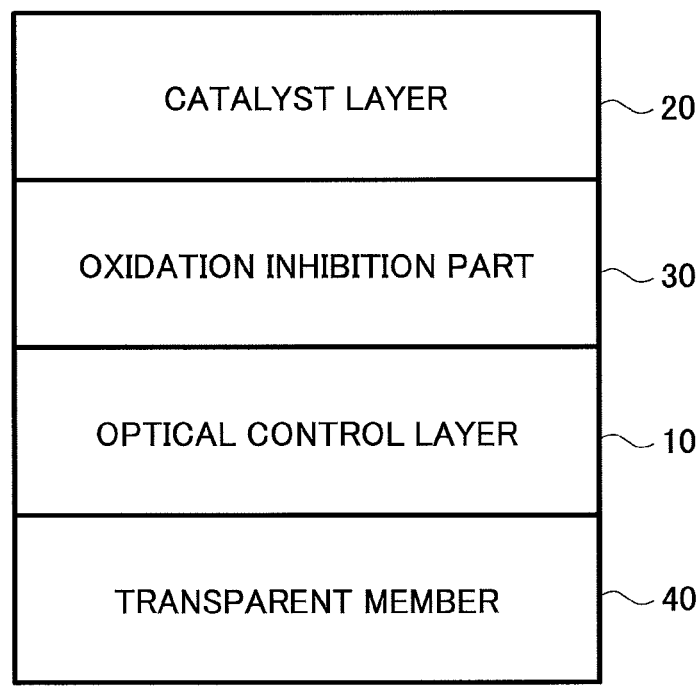
FIG. 4 A cross-sectional diagram of a reflection-type optical control element according to a fourth embodiment of the present invention.

A configuration example of a reflection-type optical control member in the present embodiment is illustrated in FIG. 4.

A reflection-type optical control member in the present embodiment is such that the reflection-type optical control element described in the first embodiment is provided with a transparent member (transparent substrate) 40 at an opposite side of the oxidation inhibition part 30 with reference to the optical control layer 10.

The transparent member 40 has a function of a base for a reflection-type optical control element. Furthermore, it is preferable for the transparent member 40 to have a function of preventing oxidation of the optical control layer 10 that is caused by water or oxygen. The transparent member 40 may be a sheet or film shape and a shape thereof is not limited. Furthermore, it may have, for example, a flexibility.

It is sufficient for the transparent member 40 to transmit visible light and a material thereof is not limited, wherein it is preferable to use a glass or a plastic.

Herein, a polyethylene terephthalate (PET), a polyethylene naphthalate (PEN), a polycarbonate (PC), a nylon, or an acryl is preferably used for a plastic.

The transparent member 40 is provided on a surface of the optical control layer 10, and thereby, it is possible to obtain a reflection-type optical control member that has an optical control function. It is possible to apply such a reflection-type optical control member not only to a window glass of a building or vehicle but also a variety of kinds of articles widely. For example, it is possible to add a reflection-type optical control function to a shield for the purpose of privacy protection, a decoration that utilizes switching between a reflective state and a transparent state, a toy, and the like.

Here, although a reflection-type optical control member in the present embodiment has been described in such a manner that the reflection-type optical control element described in the first embodiment is provided with a transparent member, it is also possible to provide a reflection-type optical control member in such a manner that the reflection-type optical control element described in the second embodiment is provided with a transparent member. That is, it is possible to provide a configuration in such a manner that a configuration in FIG. 4 is provided with two kinds of oxidation inhibition layers that are the low-oxygen-permeability oxidation inhibition layer 32 and the transmittance-variable oxidation inhibition layer 34 as the oxidation inhibition part 30. This case is preferable because it is possible to further inhibit oxidation, and improve a durability, of the optical control layer 10 as described in the second embodiment. Moreover, it is also possible to provide a reflection-type optical control part in such a manner that the reflection-type optical control element described in the third embodiment is provided with a transparent member. That is, it is possible to provide a configuration in such a manner that a configuration in FIG. 4 is provided with the antireflection layer 45 at an opposite side of the oxidation inhibition part 30 with reference to the catalyst layer 20. This case is preferable because it is possible to further increase a transmittance in a transparent state and improve a color as described in the third embodiment.

A Fifth Embodiment

In the present embodiment, a multilayer glass will be described that is provided with the reflection-type optical control element described in the first embodiment, the second embodiment, or the third embodiment.

Specifically, a multilayer glass in the present invention is a multilayer glass that is provided with two or more glass plates wherein the reflection-type optical control element described in the first embodiment, the second embodiment, or the third embodiment is provided on a surface of at least one glass plate that opposes another glass plate.

Then, it is preferable to be provided with an atmosphere control machine that supplies to or exhausts from a gap that is formed by a glass plate provided with a reflection-type optical control element and the other glass plate, hydrogen and oxygen or air.

Figure 5:
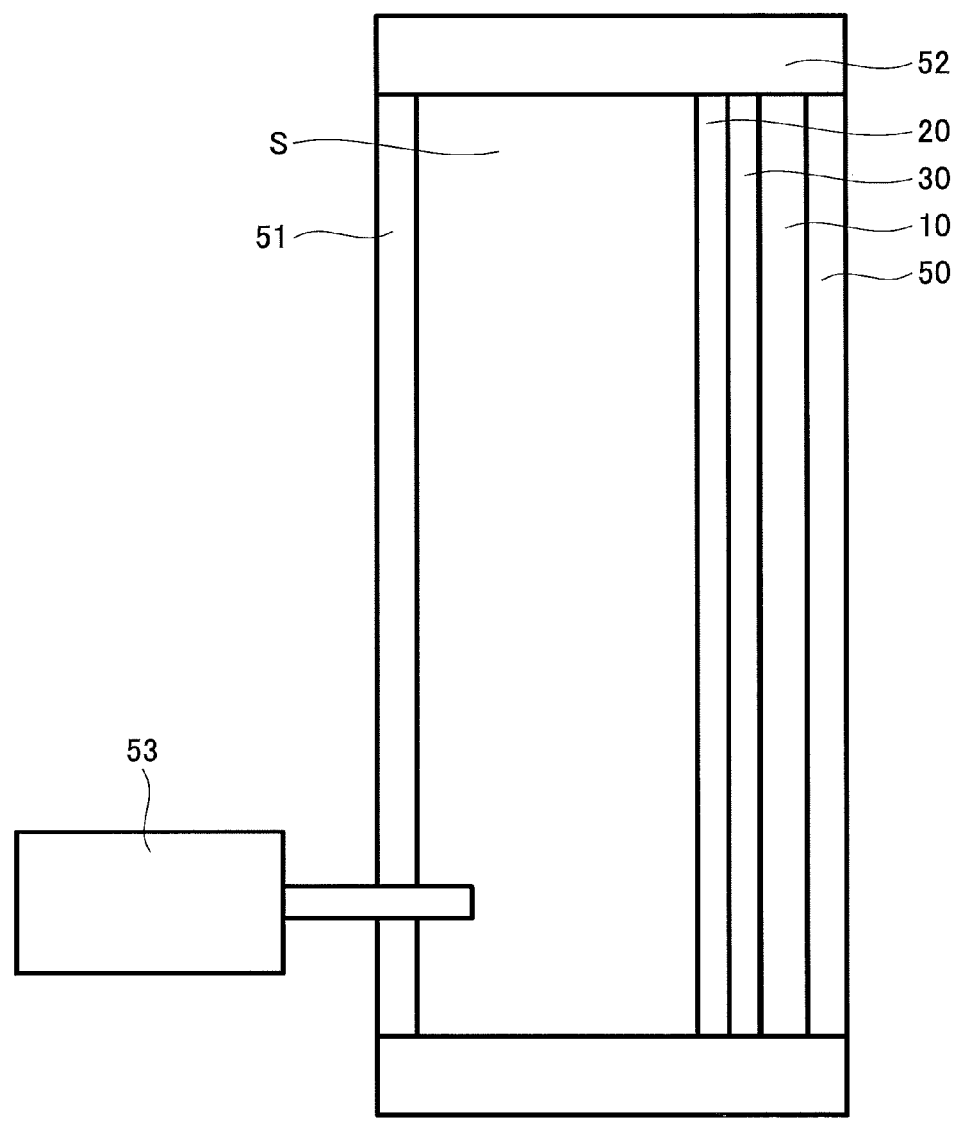
FIG. 5 A cross-sectional diagram of a multilayer glass according to a fifth embodiment of the present invention.

A configuration example of a multilayer glass in the present invention is illustrated in FIG. 5.

FIG. 5 illustrates a cross-sectional diagram of a multilayer glass in the present embodiment. As a configuration thereof is described, a multilayer glass is provided with two glass plates 50 and 51, wherein one glass plate 50 is provided with a reflection-type optical control element as illustrated in FIG. 1 on an inside surface, that is, a surface at a side where such glass pates opposes to each other.

That is, the optical control layer 10, the oxidation inhibition part 30, and the catalyst layer 20 are sequentially formed on an inside surface of one glass plate 50. Then, it is possible for a configuration of the oxidation inhibition part 30 to be a configuration in such a manner that the transmittance-variable oxidation inhibition layer 34 and the low-oxygen-permeation oxidation inhibition layer 32 are sequentially formed (deposited) from a side of the optical control layer 10 as described in the second embodiment. Moreover, it is also possible to provide a configuration in such a manner that the antireflection layer 45 is provided at an opposite side of the oxidation inhibition part 30 with reference to the catalyst layer 20, as described in the third embodiment. Furthermore, the optical control layer 10, the oxidation inhibition part 30, and the catalyst layer 20, or the optical control layer 10, the transmittance-variable oxidation inhibition layer 34, the low-oxygen-permeability oxidation inhibition layer 32, and the catalyst layer 20, or the optical control layer 10, the oxidation inhibition part 30, the catalyst layer 20, and the antireflection layer 45, may sequentially be formed not only on one glass plate but also an inside surface of each of both glass plates 50 and 51.

As illustrated in FIG. 5, a multilayer glass is such that a gas filling chamber S is provided in a gap between the two glass plates 50 and 51 and an opening is sealed with a sealing member 52. In the gas filling chamber S, for example, an argon gas is preliminarily enclosed. An atmosphere controller 53 supplies to and exhausts from the gas filling chamber S, hydrogen and oxygen or air. For example, it is possible to configure the atmosphere controller 53 in such a manner that water is electrolyzed to supply hydrogen or oxygen and a gas in the gas filling chamber S is exhausted to exterior by using a vacuum pump.

As hydrogen is supplied into the gas filling chamber S, the optical control layer 10 is hydrogenated through the catalyst layer 20 and the oxidation inhibition part 30 to be in a transparent state. Furthermore, as oxygen or air is supplied into the gas filling chamber S, the optical control layer 10 is dehydrogenated through the catalyst layer 20 and the oxidation inhibition part 30 to be in a reflective state. Therefore, atmosphere in the gas filling chamber S is controlled by the atmosphere controller 53 and thereby it is possible to reversibly control a state thereof between a transparent state and a reflective state. Furthermore, as supply or exhaust is stopped, it is possible to keep a state as it is. Thereby, it is possible to obtain a multilayer glass that executes an optical control in a gasochromic approach.

At present, spreading of a multilayer glass in a residence is progressed, and use of a multilayer glass is becoming mainstream in a newly constructed house. A reflection-type optical control element is provided in an inside of such a multilayer glass and thereby it is possible to utilize inner space as the gas filling chamber S for switching.

Here, although a multilayer that are provided with two glass plates has illustratively been described in the present embodiment, the number of glass plates is not limited to two and even more glass plates may be included.

Then, it is possible to provide a nearly colorless transparent state due to hydrogenation and it is possible to provide a multilayer glass with a high switching repetition durability, because a reflection-type optical control element is used that is provided with the optical control layer 10 that is composed of a predetermined material, the oxidation inhibition part 30 (the low-oxygen-permeability oxidation inhibition layer 32 and the transmittance-variable oxidation inhibition layer 34), the catalyst layer 20, and in some cases, further the antireflection layer 45, as described already.

PRACTICAL EXAMPLES

Although the present invention will be described in detail with reference to practical examples and comparative examples, the present invention is not limited to such practical examples.

Practical Example 1

In the present practical example, a study was executed for a reflection-type optical control member having a low-oxygen-permeability oxidation inhibition layer being a tungsten thin film as an oxidation inhibition part.

Specifically, a reflection-type optical control member was fabricated in such a manner that a optical control layer composed of a magnesium-yttrium alloy, a low-oxygen-permeability oxidation inhibition layer using a tungsten thin film (oxidation inhibition part), and a catalyst layer were deposited in sequence.

First, a magnesium-yttrium alloy thin film with a thickness of 40 nm (optical control layer), a tungsten thin film with a thickness of 0.8 nm (low-oxygen-permeability oxidation inhibition layer), and a palladium thin film with a thickness of 3.8 nm (catalyst layer) were film-formed on a glass substrate with a thickness of 1 mm (transparent member).

Specific film formation conditions for an optical control layer, a low-oxygen-permeability oxidation inhibition layer, and a catalyst layer will be described.

Film formation of a magnesium-yttrium alloy thin film as an optical control layer, a tungsten thin film as a low-oxygen-permeability oxidation inhibition layer, and a palladium thin film as a catalyst layer was executed by using a magnetron sputtering device capable of multi-element film formation.

A metallic magnesium, a metallic yttrium, a metallic tungsten, and a metallic palladium as targets were set in four sputtering guns, respectively.

First, a glass substrate was washed, and subsequently, set in a vacuum device, and evacuation was executed in a chamber thereof.

Then, an electric voltage was simultaneously applied to metallic magnesium and metallic yttrium targets to fabricate a magnesium-yttrium alloy thin film.

Sputtering was executed by applying powers (electric powers) of 10 W and 40 W to the metallic magnesium and metallic yttrium targets, respectively, in accordance with a direct current sputtering method, while an argon gas pressure in a chamber was 0.3 Pa as a vacuum condition during the sputtering. Here, it was possible to select and control a composition of an obtained film (optical control layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a tungsten thin film was executed by applying a power of 40 W to a metallic tungsten target on an identical vacuum condition.

Finally, deposition of a palladium thin film was executed by applying a power of 30 W to a metallic palladium target on the identical vacuum condition.

A reflection-type optical control member fabricated by a procedure described above was in a metal luster reflective state, and as a surface of the palladium thin film was exposed to a hydrogen gas at 1 atmosphere that had been diluted by argon to be 4 volume % (that will be referred to as a "hydrogen-containing gas" below), such a sample was changed into a transparent state due to hydrogenation of a magnesium-yttrium alloy thin film. On this condition, as a surface of the palladium thin film (catalyst layer) was exposed to atmosphere, returning to the reflective state was caused by dehydrogenation of the magnesium-yttrium alloy thin film.

Thus, it was possible to confirm that a state of the fabricated reflection-type optical control member was reversibly changed between a transparent state caused by hydrogenation and a reflective state caused by dehydrogenation.

Then, a transmittance of laser light was measured for executing an evaluation of an obtained reflection-type optical control member. A measurement of a transmittance of laser light was executed by a device illustrated in FIG. 6.

First, a palladium thin film of a reflection-type optical control member 601 that was a sample wherein a magnesium-yttrium alloy thin film, a tungsten thin film, and the palladium thin film were formed on a glass substrate 60 as described above was bonded to another glass substrate 62 (with a thickness of 1 mm) via a spacer 61.

Then, a predetermined amount of a hydrogen-containing gas was flowed into a gap between two glass plates 60 and 62 for 35 seconds by a mass flow controller 63 and then, flow of the hydrogen-containing gas was stopped for 5 minutes. As the flow of the hydrogen-containing gas was stopped, air flowed from an opening into the gap between the two glass plates 60 and 62. While this was one cycle, a flow control of the hydrogen-containing gas was repeatedly executed a predetermined number of times and a transmittance of laser light was measured for each 1 second during that time.

Figure 6:
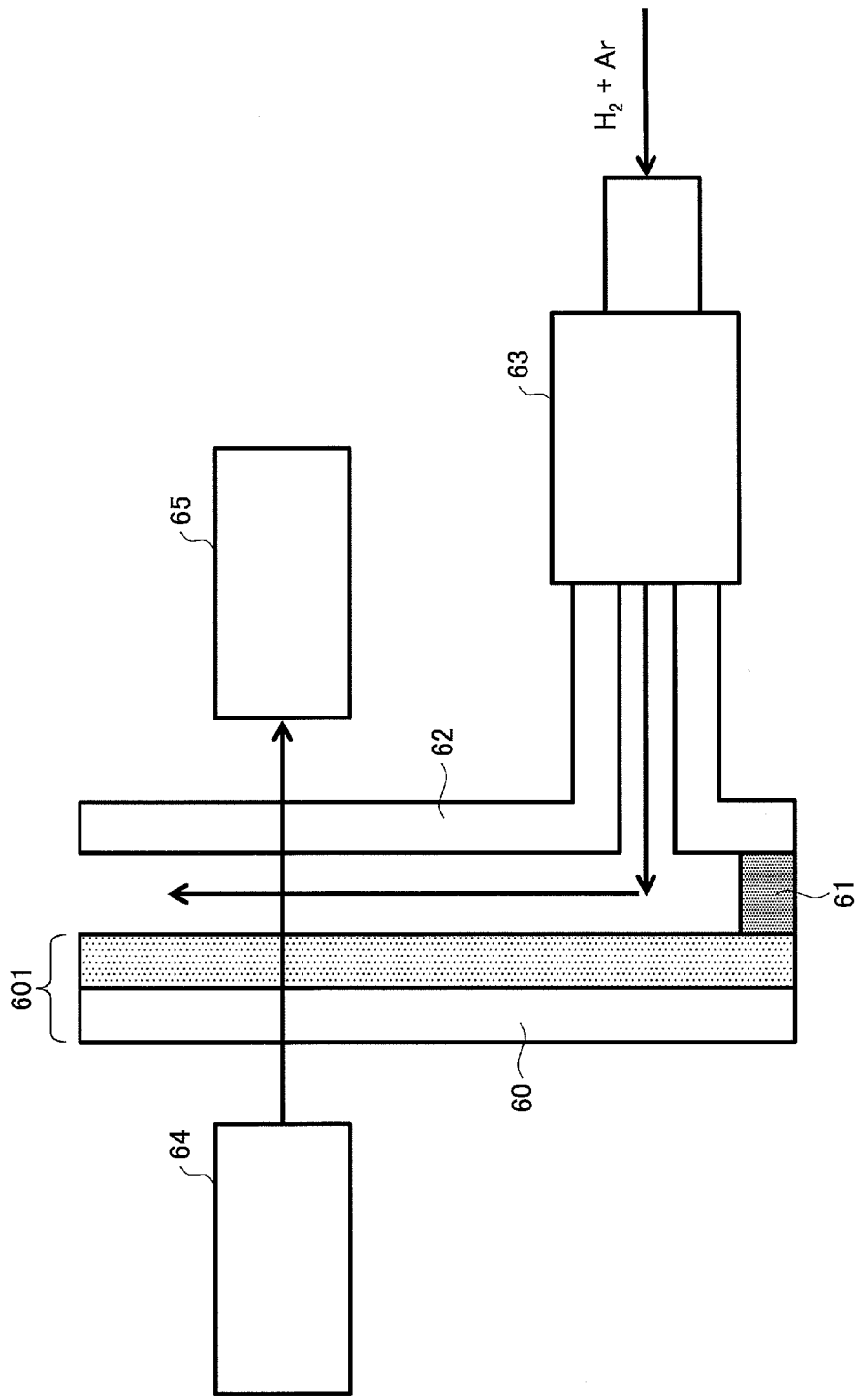
FIG. 6 A cross-sectional diagram that illustrates a configuration of a measurement device for a transmittance of laser light in Practical Example 1 of the present invention.

As illustrated in FIG. 6, a measurement was executed in such a manner that light irradiation was executed by a light source 64 so as to be parallel to a deposition direction of a reflection-type optical control member from an external surface of one glass substrate 60 and an optical transmittance was measured by a light-receiving element 65 provided near an external surface of the other glass substrate 62. A semiconductor laser with a wavelength of 670 nm was used for the light source 64, and a silicon photodiode was used for the light-receiving element 65.

Figure 7:
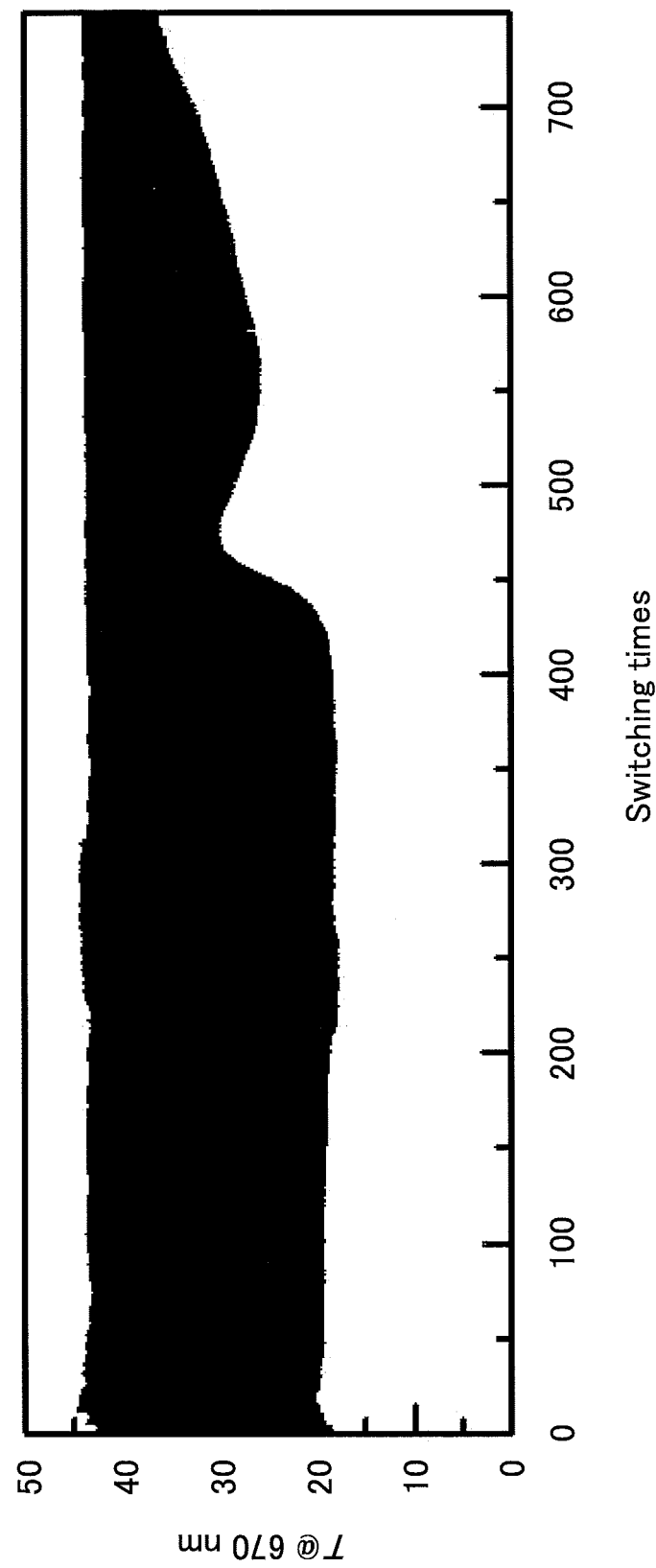
FIG. 7 A diagram that illustrates a relationship between a frequency of state switching between a reflective state and a transparent state and a transmittance of laser light for Practical Example 1 of the present invention.

A measurement result is illustrated in FIG. 7. Thereby, it was possible to find that degradation was not caused by switching up to 400 times at all. As comparison was executed with Comparative Example 2 wherein a thickness of a palladium layer that is a catalyst layer described below is identical (FIG. 11), degradation caused by switching was inhibited significantly, and hence, it was possible to confirm that a tungsten thin film that was a low-oxygen-permeability oxidation inhibition layer had an effect of inhibiting degradation of an optical control layer.

Moreover, a transmittance in a transparent state reached 45% and was generally identical to a transmittance in a transparent state for Comparative Example 2 described below, so that it was possible to find that little degradation of a transmittance was caused even when an oxidation inhibition part was arranged (inserted).

For a sample in Practical Example 1 after a repetition durability test (after the number of times of state switching between a reflective state and a transparent state reached 750), a distribution condition and a chemical bond state of each element (O, Pd, Mg, Y, or W) in a film thickness distribution direction were measured by using X-ray photoelectron spectroscopy (that will be referred to as an "XPS" below). A result of the distribution condition of each element in a film thickness distribution direction is illustrated in FIG. 8.

Figure 8:
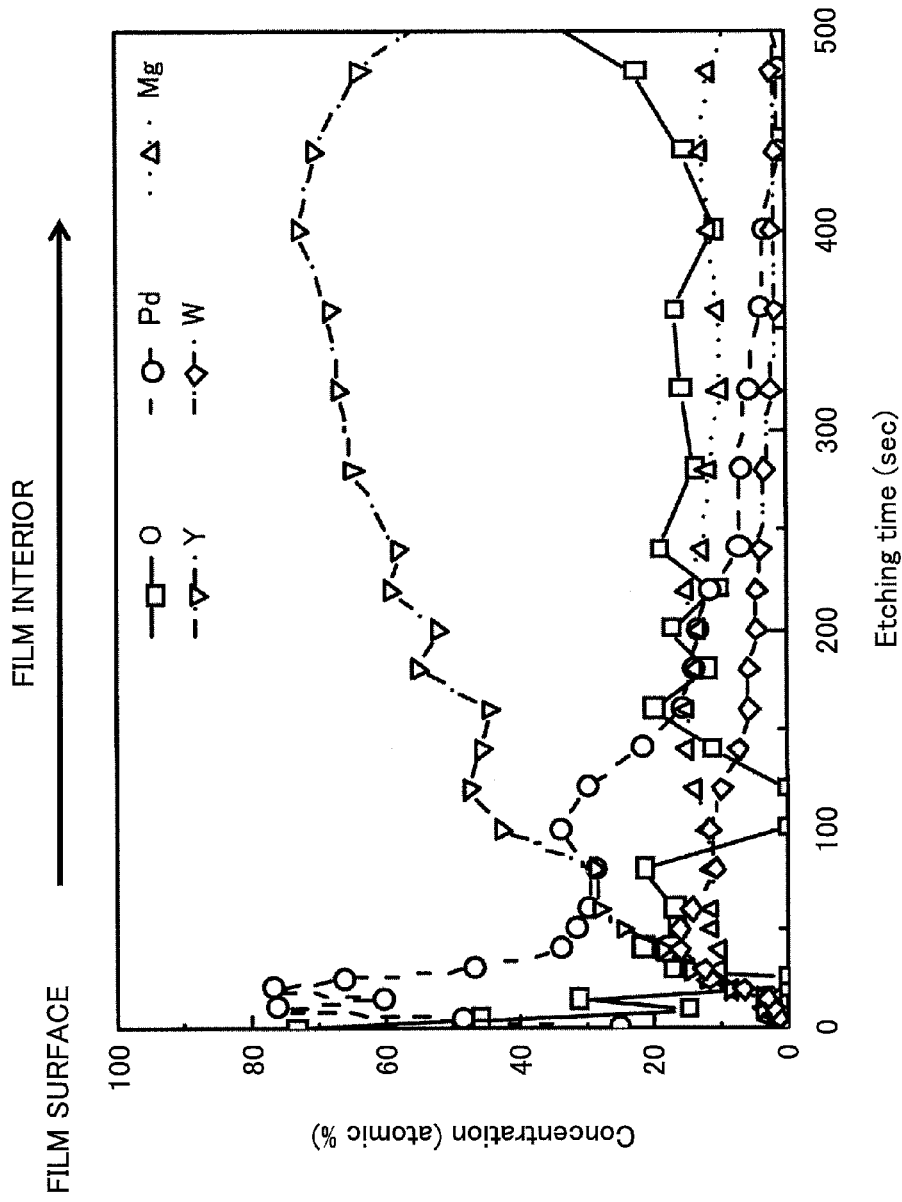
FIG. 8 A distribution condition of each element in a direction of a film thickness of a reflection-type optical control member after a repetition durability test for Practical Example 1 of the present invention.

In FIG. 8, a left side of the figure illustrates a measurement result on a surface (film surface) of a catalyst layer and illustrates a result of an XPS measurement with respect to a portion that was a surface provided by executing etching as going to a right side of the figure, while data at a right side of the figure are considered a distribution of each element in a film interior. That is, a distribution condition of each element is illustrated for a catalyst layer, a low-oxygen-permeability oxidation inhibition layer (oxidation inhibition part), and an optical control layer in sequence as going to a right side of the figure.

Thereby, it was possible to find that little Pd (palladium) diffused into a film interior (an interior of a reflection-type optical control member), that is, a low-oxygen-permeability oxidation inhibition layer or an optical control layer, in the present practical example, even when switching was repeated, and much amount of Pd was present near a film surface (a surface of a reflection-type optical control member), that is, near a catalyst layer. That is, it was possible to confirm that W (tungsten) had an effect of inhibiting diffusion of Pd (palladium).

Moreover, it was possible to find that an amount of oxygen in a film was very low. Thereby, it was possible to confirm that W in a low-oxygen-permeability oxidation inhibition layer had a capability (performance) for inhibiting permeation of oxygen. Moreover, it was possible to find that Mg (magnesium) nor Y (yttrium) did not diffuse onto a film surface and further Mg or Y was hardly oxidized based on spectral peak positions of Mg and Y. It was considered that this led to inhibition of degradation caused by switching repetition.

Comparative Example 1

In the present comparative example, a reflection-type optical control member that did not have an oxidation inhibition layer was fabricated in order to confirm an effect of an oxidation inhibition part. That is, a reflection-type optical control member was fabricated in such a manner that an optical control layer composed of a magnesium-yttrium alloy and a catalyst layer were deposited.

A similar matter to Practical Example 1 was executed except that a tungsten thin film that was an oxidation inhibition part was not formed and a palladium thin film (catalyst layer) was different, in Practical Example 1.

That is, a magnesium-yttrium alloy thin film with a thickness of 40 nm (optical control layer) and a palladium thin film with a thickness of 2.6 nm (catalyst layer) were sequentially film-formed on a glass substrate with a thickness of 1 mm (transparent member). A thickness of a palladium thin film was 3.8 nm in Practical Example 1 but was 2.6 nm in Comparative Example 1 that was less than it. Such a sample 1 was similar to that of Practical Example 6 or 7 described below, except that an oxidation inhibition part in Practical Example 6 or 7 was not formed.

Specific film formation conditions for an optical control layer and a catalyst layer will be described.

Film formation of a magnesium-yttrium alloy thin film as an optical control layer and a palladium thin film as a catalyst layer was executed by using a magnetron sputtering device capable of multi-element film formation.

A metallic magnesium, a metallic yttrium, and a metallic palladium as targets were set in three sputtering guns, respectively.

First, a glass substrate was washed, and subsequently, set in a vacuum device, and evacuation was executed in a chamber thereof.

On a condition identical to that of Practical Example 1, a magnesium-yttrium alloy thin film was fabricated on the glass substrate.

As a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a palladium thin film was executed for a period of time that corresponded to 2.6 nm, by applying a power of 30 W to a metallic palladium target on the identical vacuum condition.

A reflection-type optical control member fabricated in accordance with the procedure described above was in a metal luster reflective state but such a sample was not changed into a transparent state even though a surface of a reflection-type optical control element was exposed to a hydrogen-containing gas.

Figure 9:
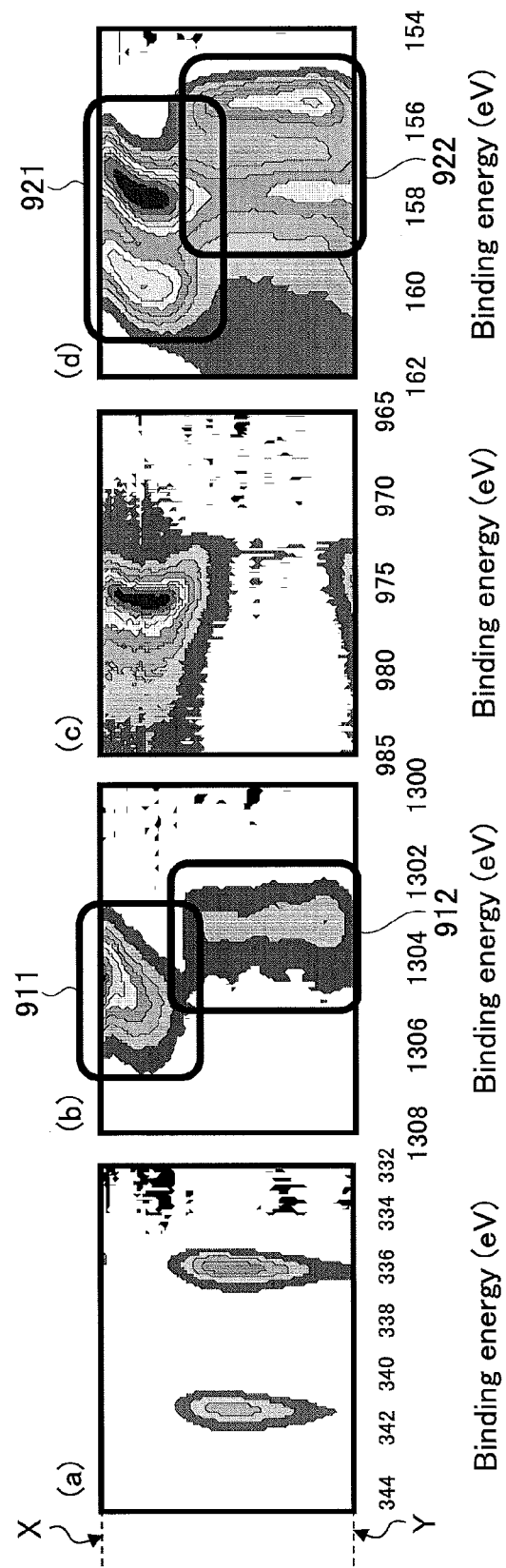
FIG. 9 A distribution condition of each element in a direction of a film thickness of a reflection-type optical control member immediately after fabrication of a sample for Comparative Example 1.

For a sample immediately after sample fabrication in Comparative Example 1, a distribution condition and a chemical bond state of each element (O, Pd, Mg, or Y) in a film thickness distribution direction were measured by using an XPS. A result of the distribution condition of each element in a film thickness distribution direction is illustrated in FIG. 9. FIG. 9 is such that, for each element indicated in an upper part of each graph, a distribution thereof is mapped in a thickness direction of a fabricated reflection-type optical control member, wherein FIG. 9 (*a*), FIG. 9 (*b*), FIG. 9 (*c*), and FIG. 9 (*d*) illustrate distribution conditions for Pd, for Mg, for O, and for Y, respectively. Furthermore, in FIG. 9 (*a*), a top of the figure that is a portion indicated by X and a bottom of the figure that is a portion indicated by Y illustrate a film surface and an interface with a glass substrate, respectively. For this reason, a distribution of a film interior is illustrated as going to a lower side (Y side) of the figure. A similar matter also applies to FIG. 9 (*b*)-(*d*).

First, it was possible to find, from FIG. 9 (*a*), that Pd was not present near a film surface and Pd diffused into a film interior, that is, a side of an optical control layer, although Pd was deposited finally. Then, it was possible to find, from FIG. 9 (c), that a lot of O (oxygen) was distributed in a region near a film surface, and from FIGS. 9(b) and (d), that Mg and Y diffused to a film surface.

Moreover, as was clear when comparing results of distribution conditions of Mg, O, and Y illustrated in FIG. 9(b)-(d), respectively, positions of spectral peaks of Mg1s and Y3d overlapped with a region where a lot of O was distributed, near a film surface. That is, it was possible to find that Mg and Y were principally oxidized or hydroxylated in a region designated as 911 in FIG. 9 (b) and a region designated as 921 in FIG. 9 (d). An oxide of Mg (magnesium oxide) had a very bad hydrogen permeability, and hence, an effect of inhibiting hydrogen diffusion when such magnesium oxide near a surface was hydrogenated or dehydrogenated.

Furthermore, it was considered that a region for oxygen in FIG. 9 (c) did not overlap with a region designated as 912 in FIG. 9 (b) and a region designated as 922 in FIG. 9 (d), and hence, Mg and Y were principally present in metallic states thereof in each region.

Moreover, it was considered that Pd that was a catalyst layer and was not present near a film surface as described above was a reason why such a sample was not changed into a transparent state even though a surface of a reflection-type optical control element was exposed to a hydrogen-containing gas.

Figure 10:
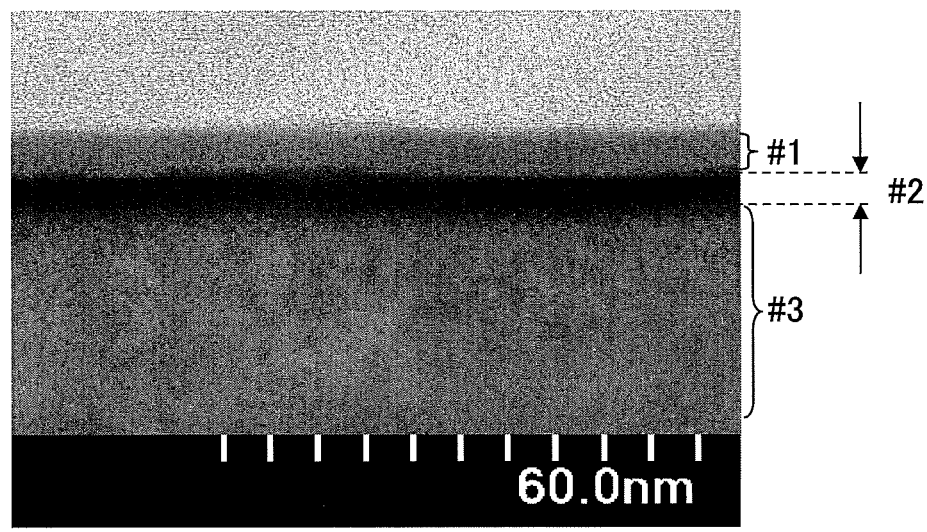
FIG. 10 A cross-sectional diagram of a reflection-type optical control member by STEM immediately after fabrication of a sample for Comparative Example 1.

Moreover, a cross-sectional sample was fabricated from a sample immediately after sample fabrication in Comparative Example 1 and STEM observation and EDX point analysis thereof were executed. A bright-field STEM image was illustrated in FIG. 10.

Thereby, it was possible to find that such a sample was clearly divided into three layers (#1, #2, and #3), wherein Pd was not present in #1 that was composed of Mg and Y and #2 and #3 were composed of principally Pd and Mg, Y, and a small amount of Pd, respectively, from a result of EDX point analysis. This result was consistent with a result of XPS described above.

Comparative Example 2

In the present comparative example, a reflection-type optical control member that had a catalyst layer with a thickness greater than that of Comparative Example 1 and identical to that of Practical Example 1 was fabricated in order to investigate an influence of a film thickness of a catalyst layer. That is, a reflection-type optical control member was fabricated in such a manner that an optical control layer composed of a magnesium-yttrium alloy and a catalyst layer with a thickness of 3.8 nm were deposited.

A sample similar to that of Comparative Example 1 was fabricated except that a film thickness of a palladium thin film (catalyst layer) is different therefrom.

That is, a magnesium-yttrium alloy thin film with a thickness of 40 nm (optical control layer) and a palladium thin film with a thickness of 3.8 nm (catalyst layer) were sequentially film-formed on a glass substrate with a thickness of 1 mm (transparent member). Such a sample 1 was similar to that of Practical Example 1 or Practical Example 2, 3, 4, or 5 described below, except that an oxidation inhibition part was not formed in Practical Example 1, 2, 3, 4, or 5.

Specific film formation conditions for an optical control layer and a catalyst layer will be described.

Film formation of a magnesium-yttrium alloy thin film as an optical control layer and a palladium thin film as a catalyst layer was executed by using a magnetron sputtering device capable of multi-element film formation.

A metallic magnesium, a metallic yttrium, and a metallic palladium as targets were set in three sputtering guns, respectively.

First, a glass substrate was washed, and subsequently, set in a vacuum device, and evacuation was executed in a chamber thereof.

On a condition identical to that of Practical Example 1, a magnesium-yttrium alloy thin film was fabricated on the glass substrate.

As a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a palladium thin film was executed for a period of time that corresponded to 3.8 nm, by applying a power of 30 W to a metallic palladium target on the identical vacuum condition.

A reflection-type optical control member fabricated in accordance with the procedure described above was in a metal luster reflective state, and as a surface of the palladium thin film was exposed to a hydrogen-containing gas, such a sample was changed into a transparent state due to hydrogenation of the magnesium-yttrium alloy thin film. On this condition, as a surface of the palladium thin film was exposed to atmosphere, returning to a reflective state was caused by dehydrogenation of the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured by a device illustrated in FIG. 6 in order to execute an evaluation of an obtained reflection-type optical control member. At this time, a specific operation procedure and condition were similar to those in a case of Practical Example 1 and hence had been omitted herein.

Figure 11:
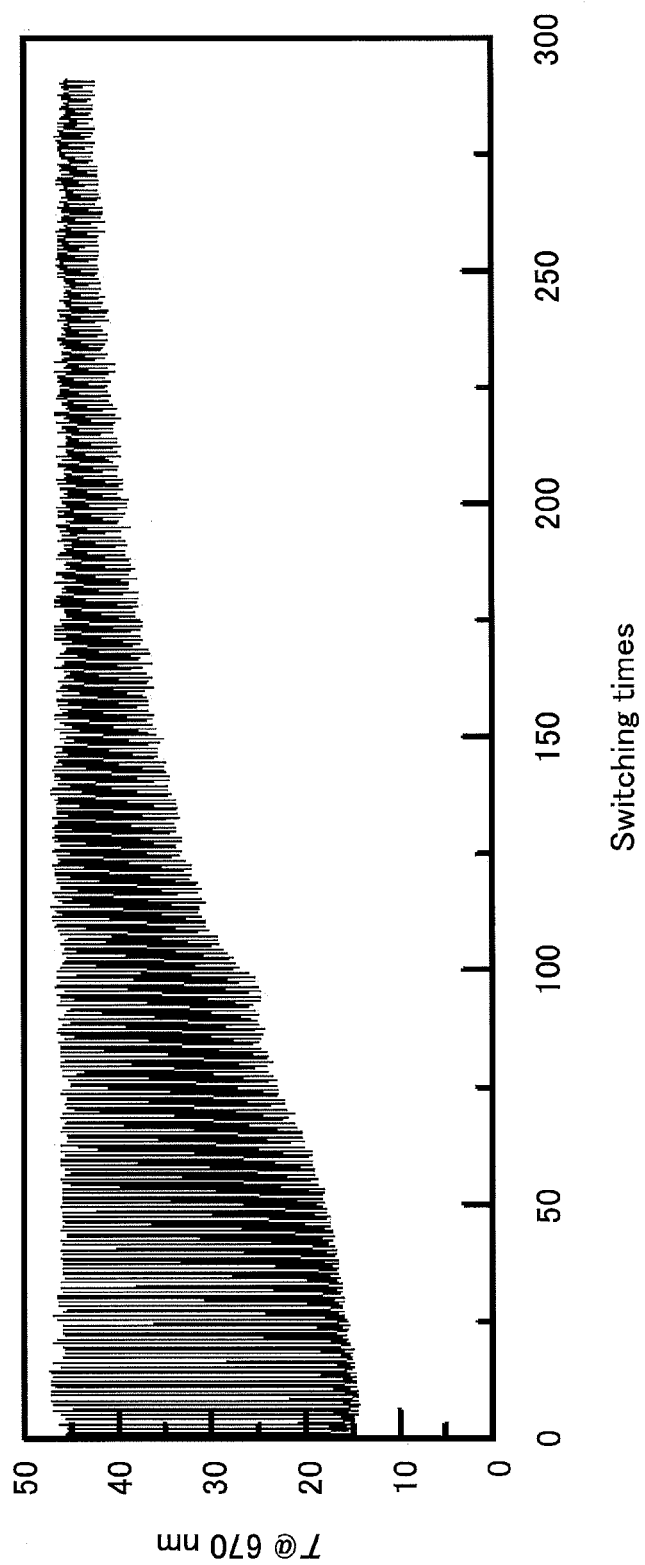
FIG. 11 A diagram that illustrates a relationship between a frequency of state switching between a reflective state and a transparent state and a transmittance of laser light for Comparative Example 2.

A measurement result is illustrated in FIG. 11. Thereby, a large transmittance change was exhibited at first, but a change width was reduced gradually as this was repeated. As exceeding 50 times, this reduction rate was large, and as exceeding 200 times, little change was exhibited. These were caused by degradation caused by repetition of switching.

As was clear when comparing a result of FIG. 7 for Practical Example 1 where a thickness of a catalyst layer is identical, with a reflection-type optical control member in the present comparative example that was subjected to a measurement in FIG. 11, Practical Example 1 was such that little degradation was caused by switching up to 400 times, and it was possible to confirm an effect of Practical Example 1 that had a low-oxygen-permeability oxidation inhibition layer.

Furthermore, it was possible to find, from comparison between FIG. 7 and FIG. 11, that a transmittance in a transparent state (hydrogen storage state) in Practical Example 1 reached 45% and was a transmittance similar to that in a case of Comparative Example 2 although a low-oxygen-permeability oxidation inhibition layer was possessed. From this result, it was possible to confirm that little reduction of an optical transmittance was caused that was caused by arranging a low-oxygen-permeability oxidation inhibition layer in Practical Example 1.

For a sample immediately after sample fabrication in Comparative Example 2, a distribution condition and a chemical bond state of each element (O, Pd, Mg, or Y) in a film thickness distribution direction were measured by using an XPS. A result of the distribution condition of each element in a film thickness distribution direction is illustrated in FIG. 12.

Figure 12:
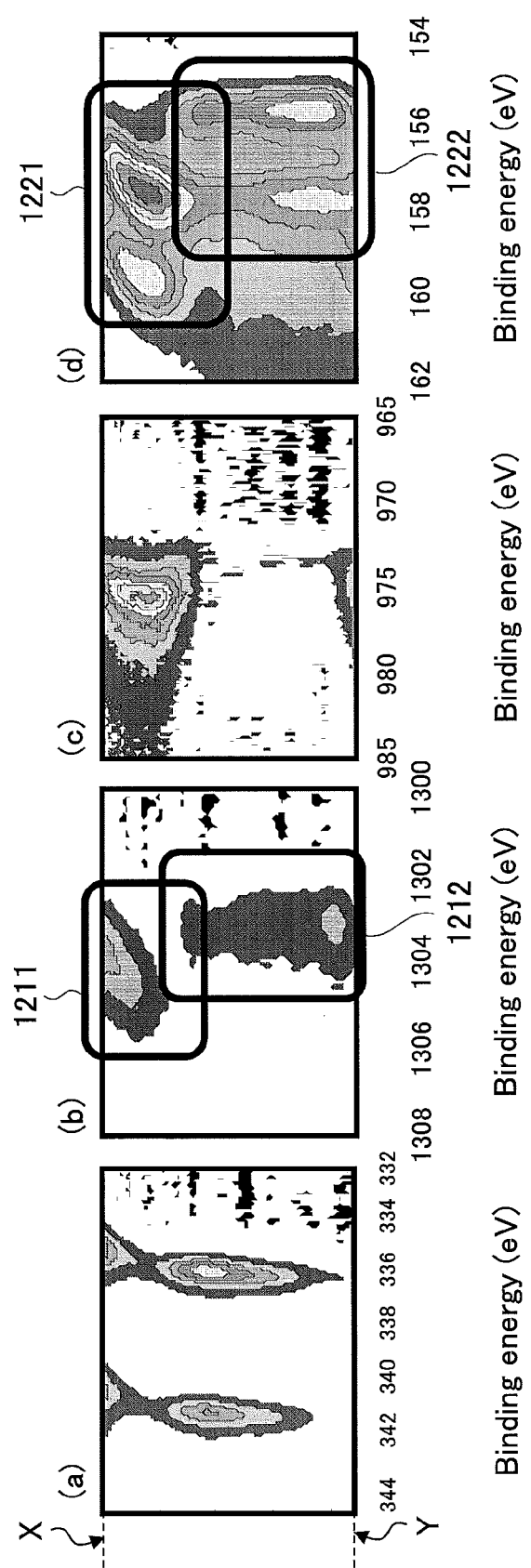
FIG. 12 A distribution condition of each element in a direction of a film thickness of a reflection-type optical control member immediately after fabrication of a sample for Comparative Example 2.

FIG. 12 is such that, for each element indicated in an upper part of each graph, a distribution thereof is mapped in a thickness direction of a fabricated reflection-type optical control member, wherein FIG. 12 (a), FIG. 12 (b), FIG. 12 (c), and FIG. 12 (d) illustrate distribution conditions for Pd, for Mg, for O, and for Y, respectively. Furthermore, in FIG. 12 (a), a top of the figure that is a portion indicated by X and a bottom of the figure that is a portion indicated by Y illustrate a film surface and an interface with a glass substrate, respectively. For this reason, a distribution of a film interior is illustrated as going to a lower side (Y side) of the figure. A similar matter also applies to FIG. 12 (b)-(d).

From FIG. 12 (a), it was possible to find that a lot of Pd diffused in a film interior, that is, a side of an optical control layer, although Pd was also present very near a film surface. Then, as was clear when comparing distributions of respective elements, a lot of O (oxygen) was distributed in a region where little Pd was present, and a region designated as 1211 in FIG. 12 (b) and a region designated as 1221 in FIG. 12 (d) were regions where a lot of Mg and Y were distributed, respectively, wherein a portion thereof overlapped with a region where a lot of oxygen was distributed in FIG. 12 (c).

As described above, as was clear when comparing results of distribution conditions of Mg, O, and Y illustrated in FIG. 12 (b)-(d), respectively, positions of spectral peaks of Mg1s and Y3d overlapped with a region where a lot of O was distributed, near a film surface. That is, it was possible to find that Mg and Y were principally oxidized or hydroxylated in a region designated as 1211 in FIG. 12 (b) and a region designated as 1221 in FIG. 12 (d). An oxide of Mg (magnesium oxide) had a very bad hydrogen permeability, and hence, an effect of inhibiting hydrogen diffusion when such magnesium oxide near a surface was hydrogenated or dehydrogenated. However, it was considered that a state of such a sample was reversibly changed between a transparent state caused by hydrogenation and a reflective state caused by dehydrogenation because little Pd that was a catalyst layer was present very near a film surface differently from Comparative Example 1.

Here, it was considered that a region for oxygen in FIG. 12 (c) did not overlap with a region designated as 1212 in FIG. 12 (b) and a region designated as 1222 in FIG. 12(d), and hence, Mg and Y were principally present in metallic states thereof in each region.

Figure 13:
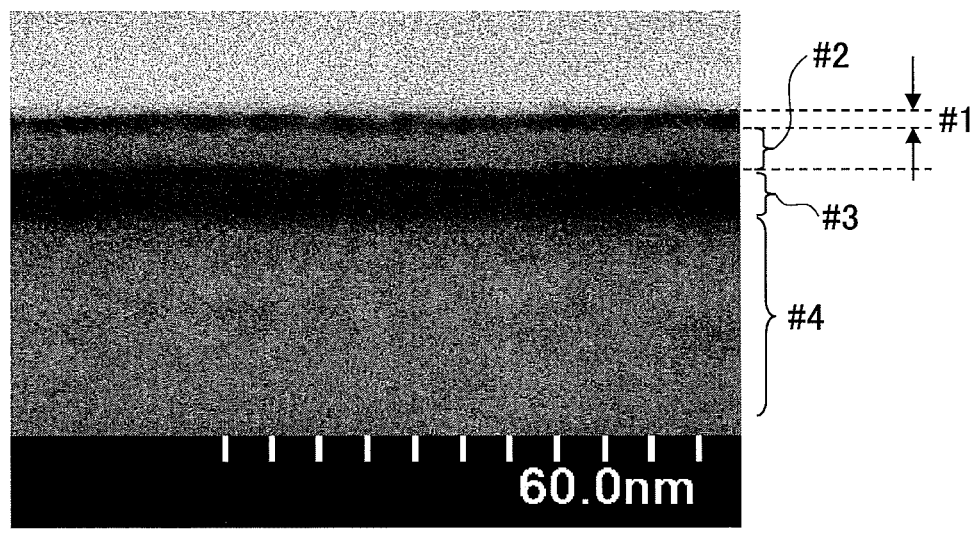
FIG. 13 A cross-sectional diagram of a reflection-type optical control member by STEM immediately after fabrication of a sample for Comparative Example 2.

Moreover, a cross-sectional sample was fabricated from a sample immediately after sample fabrication in Comparative Example 2 and STEM observation and EDX point analysis thereof were executed. A bright-field STEM image was illustrated in FIG. 13.

Thereby, it was possible to find that such a sample was clearly divided into four layers (#1, #2, #3, and #4), wherein #1 was principally of Pd and O and little Pd was present in #2 that was composed of Mg, Y, and O, while #3 was principally of Pd and #4 was composed of Mg, Y, and a small amount of Pd, from a result of EDX point analysis. This result was consistent with a result of XPS.

Figure 14:
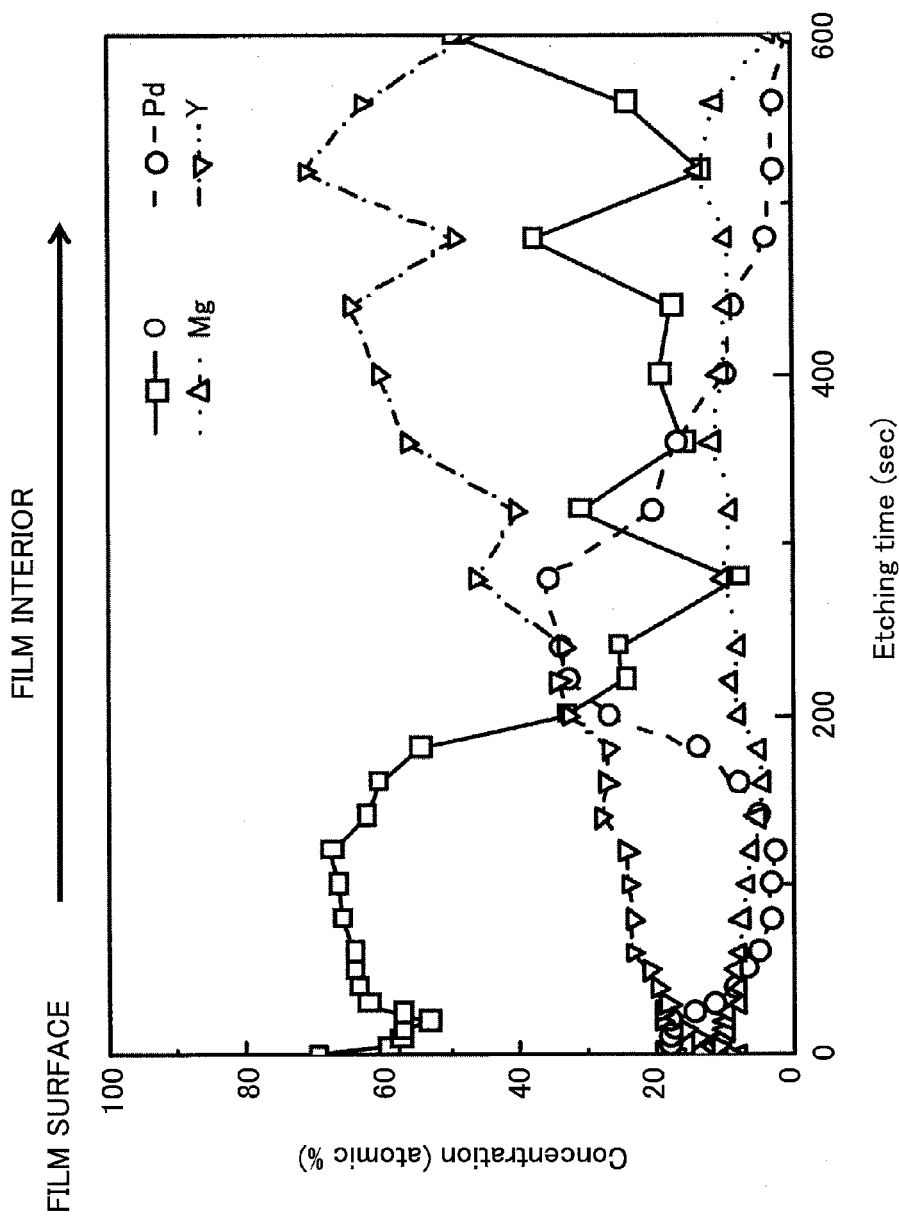
FIG. 14 A distribution condition of each element in a direction of a film thickness of a reflection-type optical control member after a repetition durability test for Comparative Example 2.

For a sample in Comparative Example 2 after a repetition durability test (after the number of times of state switching between a reflective state and a transparent state reached 290), a distribution condition and a chemical bond state of each element (O, Pd, Mg, Y, or W) in a film thickness distribution direction were measured by using XPS. A result of the distribution condition of each element in a film thickness distribution direction is illustrated in FIG. 14.

Thereby, it was possible to find that Pd (of a catalyst layer) deposited on a film surface was diffused into a film interior, that is a side of an optical control layer, by repeating switching, because an amount of Pd on a film top surface was reduced and a peal of Pd was present at a right side of the figure. Then, it was possible to find that Pd in a composition was low near a film top surface, further, a lot of O (oxygen) was distributed in such a region, and Mg and Y diffused to a film surface. This was caused by a small film thickness of a Pd layer.

Moreover, it was possible to find, from positions of spectral peaks of Mg and Y, that Mg and Y were oxidized or hydroxylated in a region where a lot of O was distributed. An oxide of Mg (magnesium oxide) had a very bad hydrogen permeability, and hence, such magnesium oxide near a surface had an effect of inhibiting diffusion of hydrogen at time of hydrogenation or dehydrogenation. For that reason, it was possible to consider that switching between mirror reflective and transparent states (absorption and release of hydrogen) could not be caused by executing switching repeatedly as illustrated in FIG. 11.

Comparative Example 3

In the present comparative example, a reflection-type optical control member that had a further thicker catalyst layer than that of Comparative Example 2 was fabricated in order to investigate an influence of a film thickness of such a catalyst layer. That is, a reflection-type optical control layer was fabricated in such a manner that an optical control layer composed of a magnesium-yttrium alloy and a catalyst layer with a thickness of 7.5 nm were deposited.

A sample similar to that of Comparative Example 1 was fabricated except that a film thickness of a palladium thin film (catalyst layer) is different therefrom.

That is, a magnesium-yttrium alloy thin film with a thickness of 40 nm (optical control layer) and a palladium thin film with a thickness of 7.5 nm (catalyst layer) were sequentially film-formed on a glass substrate with a thickness of 1 mm (transparent member).

Specific film formation conditions for an optical control layer and a catalyst layer will be described.

Film formation of a magnesium-yttrium alloy thin film as an optical control layer and a palladium thin film as a catalyst layer was executed by using a magnetron sputtering device capable of multi-element film formation.

A metallic magnesium, a metallic yttrium, and a metallic palladium as targets were set in three sputtering guns, respectively.

First, a glass substrate was washed, and subsequently, set in a vacuum device, and evacuation was executed in a chamber thereof.

On a condition identical to that of Practical Example 1, a magnesium-yttrium alloy thin film was fabricated on the glass substrate.

As a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a palladium thin film was executed for a period of time that corresponded to 7.5 nm, by applying a power of 30 W to a metallic palladium target on the identical vacuum condition.

A reflection-type optical control member fabricated in accordance with the procedure described above was in a metal luster reflective state, and as a surface of the palladium thin film was exposed to a hydrogen-containing gas, such a sample was changed into a transparent state due to hydrogenation of the magnesium-yttrium alloy thin film. On this condition, as a surface of the palladium thin film was exposed to atmosphere, returning to a reflective state was caused by dehydrogenation of the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of light-emitting-diode light was measured in order to execute an evaluation of an obtained reflection-type optical control member. A device illustrated in FIG. 6 was used for a measurement of a transmittance of light-emitting-diode light, similarly to a case of Practical Example 1.

However, a light-emitting diode with a wavelength of 940 nm was used for a light source 64 and a photodiode was used for a light-receiving element 65. Here, transmittances of a reflection-type optical control element at wavelength of 670 nm and a wavelength of 940 nm were generally identical.

Then, a predetermined amount of a hydrogen-containing gas was flowed into a gap between two glass plates 60 and 62 for 65 seconds by a mass flow controller 63 and then, flow of the hydrogen-containing gas was stopped for 15 minutes. As the flow of the hydrogen-containing gas was stopped, air flowed from an opening into the gap between the two glass plates 60 and 62. While this was one cycle, a flow control of the hydrogen-containing gas was repeatedly executed a predetermined number of times and a transmittance of light-emitting-diode light was measured for each 1 second during that time.

Figure 15:
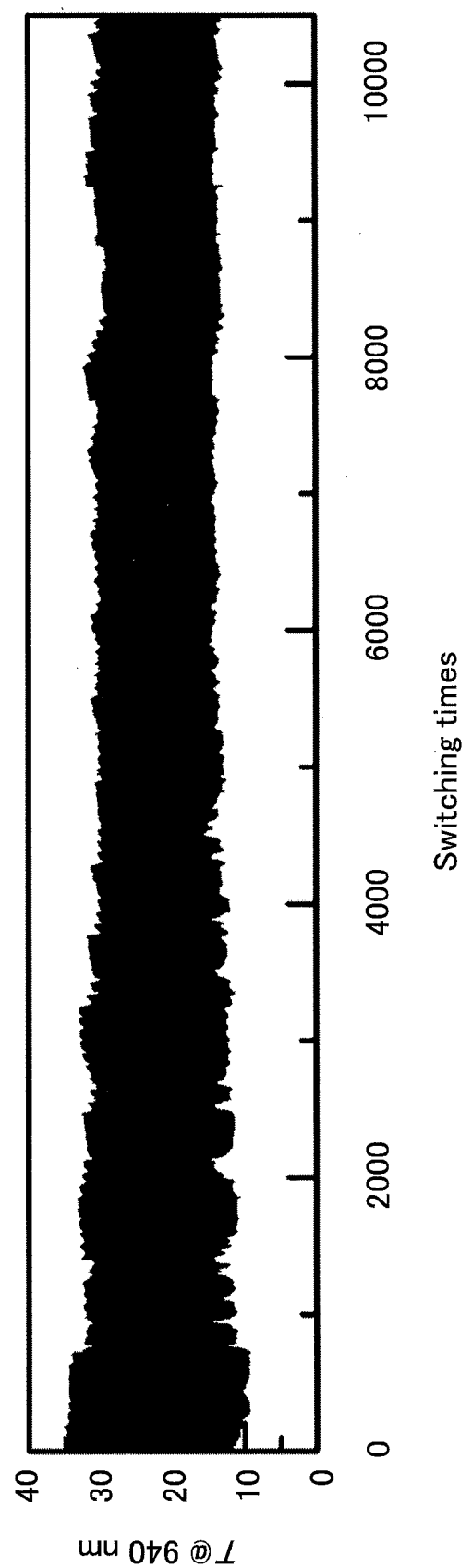
FIG. 15 A diagram that illustrates a relationship between a frequency of state switching between a reflective state and a transparent state and an optical transmittance for a light-emitting diode for Comparative Example 3.

A measurement result is illustrated in FIG. 15. Thereby, it was possible to find that a significant change in a change width was not observed differently from Comparative Example 2 even though switching between a reflective state and a transparent state was executed 10000 or more times, and a high repletion durability was possessed.

However, a transmittance in a transparent state was about 30% that was caused by a greater thickness of a palladium layer and was a significantly small value as compared to Practical Example 1.

Figure 16:
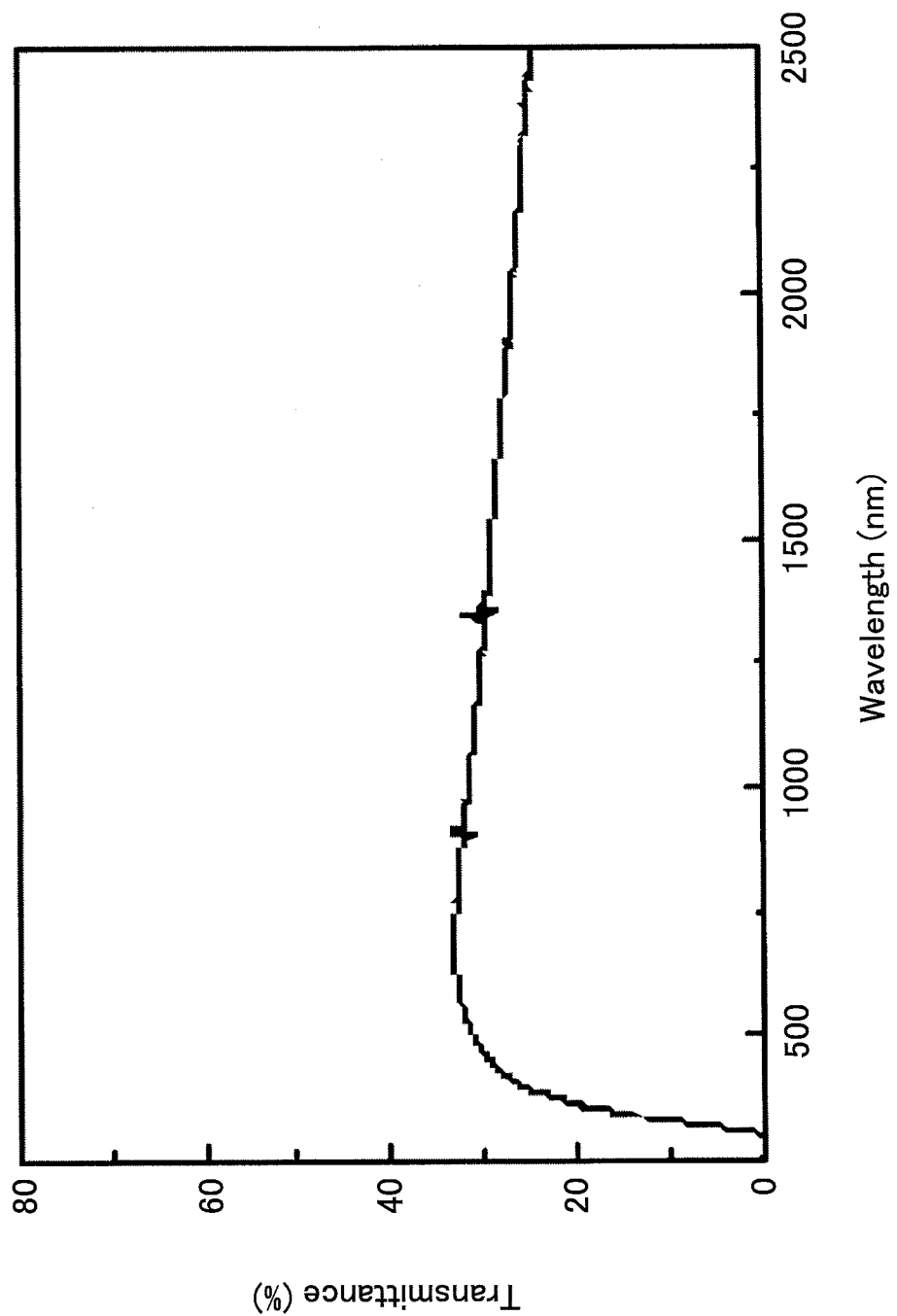
FIG. 16 A spectrum of a transmittance in a transparent state for Comparative Example 3.

A transmittance spectrum of such a sample in a transparent state is illustrated in FIG. 16. From this result, a visible transmittance of such a sample in a transparent state was estimated to be 32%. From the above, it was possible to find that such a sample was sufficient with respect to a repetition durability but a further transmittance in a transparent state was insufficient.

For a sample immediately after sample fabrication in Comparative Example 3, a distribution condition and a chemical bond state of each element (O, Pd, Mg, or Y) in a film thickness distribution direction were measured by using an XPS. A result of the distribution condition of each element in a film thickness distribution direction is illustrated in FIG. 17.

Figure 17:
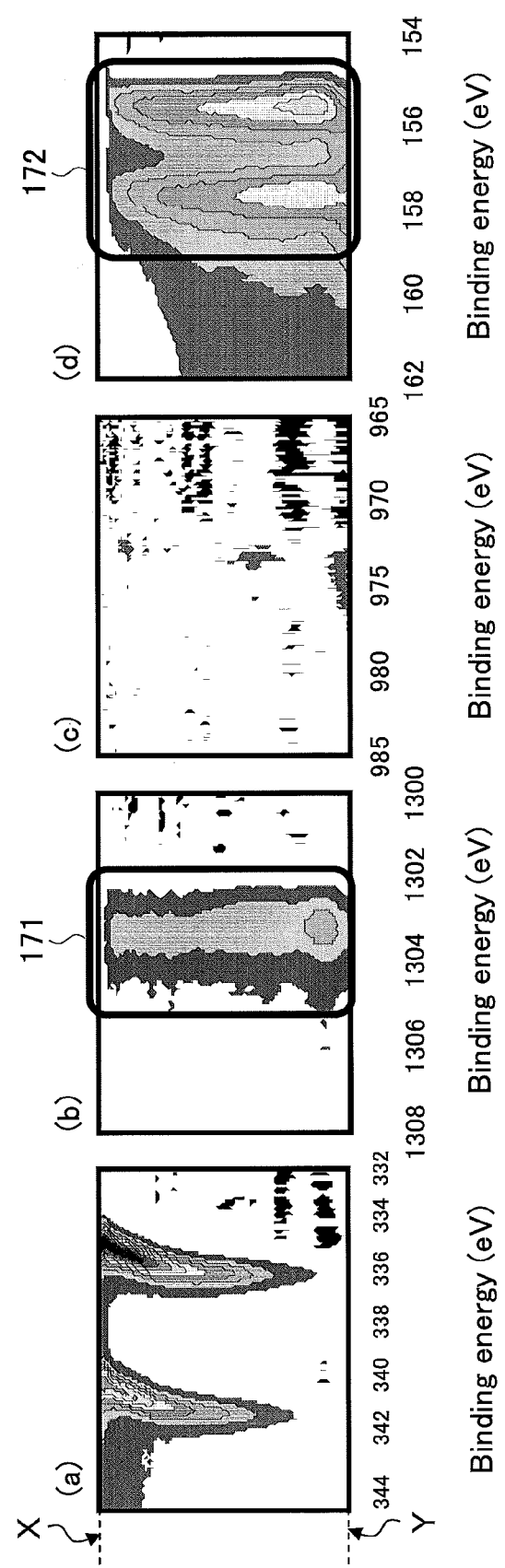
FIG. 17 A distribution condition of each element in a direction of a film thickness of a reflection-type optical control member immediately after fabrication of a sample for Comparative Example 3.

FIG. 17 is such that, for each element indicated in an upper part of each graph, a distribution thereof is mapped in a thickness direction of a fabricated reflection-type optical control member, wherein FIG. 17 (a), FIG. 17 (b), FIG. 17 (c), and FIG. 17 (d) illustrate distribution conditions for Pd, for Mg, for O, and for Y, respectively. Furthermore, in FIG. 17 (a), a top of the figure that is a portion indicated by X and a bottom of the figure that is a portion indicated by Y illustrate a film surface and an interface with a glass substrate, respectively. For this reason, a distribution of a film interior is illustrated as going to a lower side (Y side) of the figure. A similar matter also applies to FIG. 17 (b)-(d).

From FIG. 17 (a), it was possible to find that Pd was widely present from a film surface to a film interior. For that reason, it was possible to find that little O (oxygen) was present in a film and Mg or Y was not oxidized or hydroxylated but was in a metallic state, as was clear from FIG. 17 (c). For this reason, it was possible to consider that a lot of Mg and Y that were distributed in, for example, a region designated as 171 and a region designated as 172 in FIGS. 17(b) and (d), respectively, were principally distributed in metallic states thereof.

It was considered that such a sample had a high repetition durability because Pd that was a catalyst layer was widely present from a film surface to a film interior differently from Comparative Example 1 and Comparative Example 2. However, it was possible to consider that a transmittance in a transparent state was low because Pd that was not changed into a transparent state even when hydrogenation was executed was widely distributed in a film.

Figure 18:
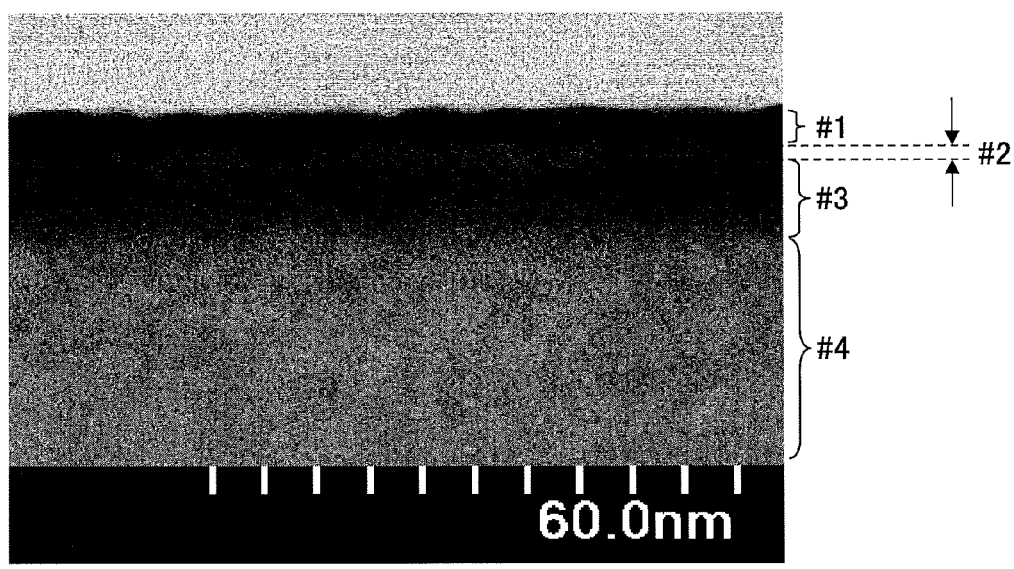
FIG. 18 A cross-sectional diagram of a reflection-type optical control member by STEM immediately after fabrication of a sample for Comparative Example 3.

Moreover, a cross-sectional sample was fabricated from a sample immediately after sample fabrication in Comparative Example 3 and STEM observation and EDX point analysis thereof were executed. A bright-field STEM image was illustrated in FIG. 18.

Thereby, it was possible to find that such a sample was clearly divided into four layers (#1, #2, #3, and #4), wherein #1 was principally of Pd and #2 was composed of Pd, Mg, and Y, while Pd was present in #3 more than #2 and #4 was composed of Mg, Y, and a small amount of Pd, from a result of EDX point analysis. Although it was considered that #2 was very thin and hence could not be distinguished by XPS, this result was generally consistent with a result of XPS.

Practical Example 2

In the present practical example, a study was executed for a reflection-type optical control member that had a low-oxygen-permeability oxidation inhibition layer that was a tantalum thin film as an oxidation inhibition part.

Specifically, a reflection-type optical control member was fabricated in such a manner that an optical control layer that was composed of a magnesium-yttrium alloy, a low-oxygen-permeability oxidation inhibition layer that used a tantalum thin film (oxidation inhibition part), and a catalyst layer were deposited sequentially.

Specifically, a magnesium-yttrium alloy thin film with a thickness of 40 nm (optical control layer), a tantalum thin film with a thickness of 1.0 nm (low-oxygen-permeability oxidation inhibition layer), and a palladium thin film with a thickness of 3.8 nm (catalyst layer) were sequentially film-formed on a glass substrate with a thickness of 1 mm (transparent member).

Specific film formation conditions for an optical control layer, a low-oxygen-permeability oxidation inhibition layer, and a catalyst layer will be described.

Film formation of a magnesium-yttrium alloy thin film as an optical control layer, a tantalum thin film as an oxidation inhibition layer that had a low oxygen permeability, and a palladium thin film as a catalyst layer was executed by using a magnetron sputtering device capable of multi-element film formation.

A metallic magnesium, a metallic yttrium, a metallic tantalum, and a metallic palladium as targets were set in four sputtering guns, respectively.

First, a glass substrate was washed, and subsequently, set in a vacuum device, and evacuation was executed in a chamber thereof.

Then, a magnesium-yttrium alloy thin film was fabricated on a condition identical to that of Practical Example 1. At this time, as a calibration curve of an obtained composition was estimated from a ratio of powers applied to respective targets by using film thicknesses and metal densities and a composition of a fabricated sample was estimated from this curve, a composition of such an alloy was $Mg_{0.36}O_{0.64}$.

Subsequently, deposition of a tantalum thin film was executed by applying a power of 40 W to a metallic tantalum target on a vacuum condition similar to that in a case where the magnesium-yttrium alloy thin film was fabricated.

Finally, deposition of a palladium thin film was executed by applying a power of 30 W to a metallic palladium target on the identical vacuum condition.

A reflection-type optical control member fabricated in accordance with the procedure described above was in a metal luster reflective state, and as a surface of the palladium thin film was exposed to a hydrogen-containing gas, such a sample was changed into a transparent state due to hydrogenation of the magnesium-yttrium alloy thin film. On this condition, as a surface of the palladium thin film was exposed to atmosphere, returning to a reflective state was caused by dehydrogenation of the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured in order to execute an evaluation of an obtained reflection-type optical control member. A device illustrated in FIG. 6 was used for a measurement of a transmittance of laser light, similarly to a case of Practical Example 1. At this time, a specific operation procedure and condition were similar to those in a case of Practical Example 1 and hence had been omitted herein.

Figure 19:
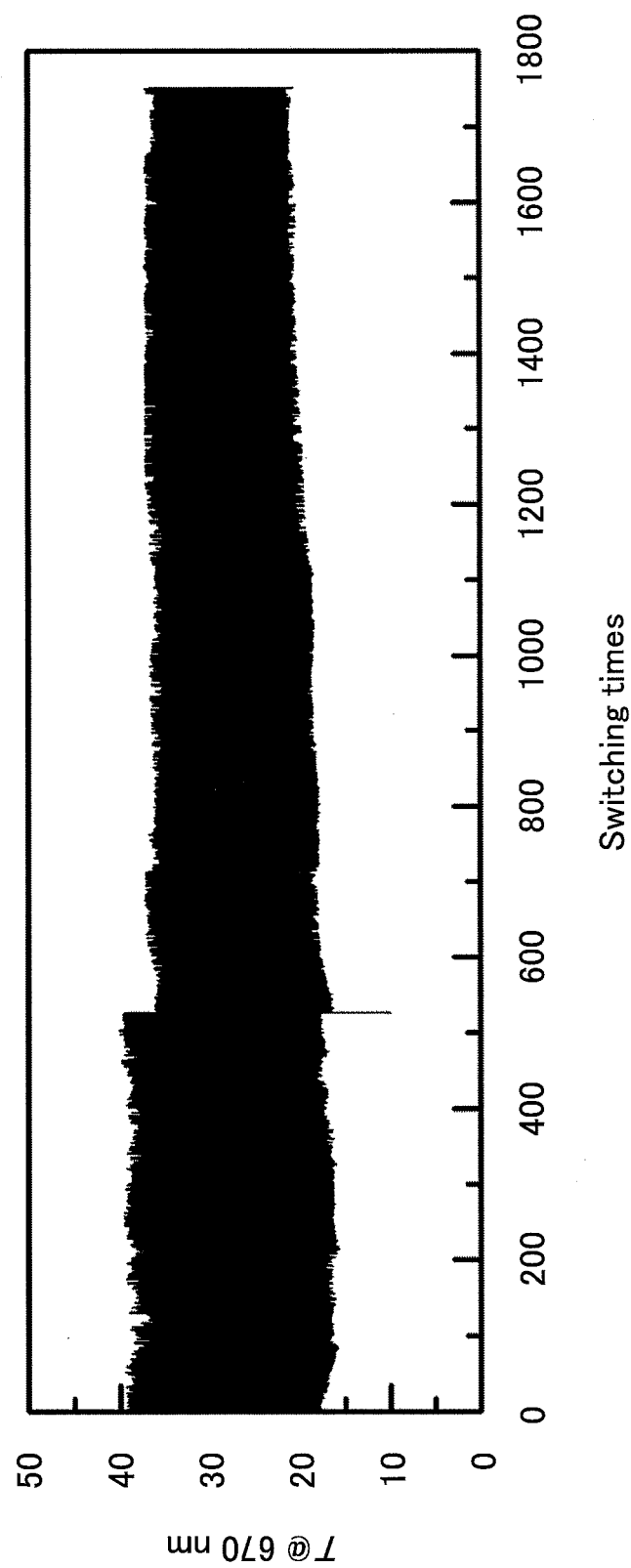
FIG. 19 A diagram that illustrates a relationship between a frequency of state switching between a reflective state and a transparent state and a transmittance of laser light for Practical Example 2 of the present invention.

A measurement result is illustrated in FIG. 19. Thereby, degradation was not caused by switching up to 1700 times at all. It was possible to find that a tantalum thin film had an effect of inhibiting degradation because a switching repetition durability was significantly improved as compared to Comparative Example 2. Moreover, it was possible to find that a transmittance in a transparent state was approximately 40% and was generally identical to a transmittance in a transparent state in Comparative Example 2, and little reduction of a transmittance was caused even though a low-oxygen-permeability oxidation inhibition layer (oxidation inhibition part) was inserted.

For a sample immediately after sample fabrication in Practical Example 2, a distribution condition and a chemical bond state of each element (O, Pd, Mg, or Y) in a film thickness distribution direction were measured by using an XPS. A result of the distribution condition of each element in a film thickness distribution direction is illustrated in FIG. 20.

Figure 20:
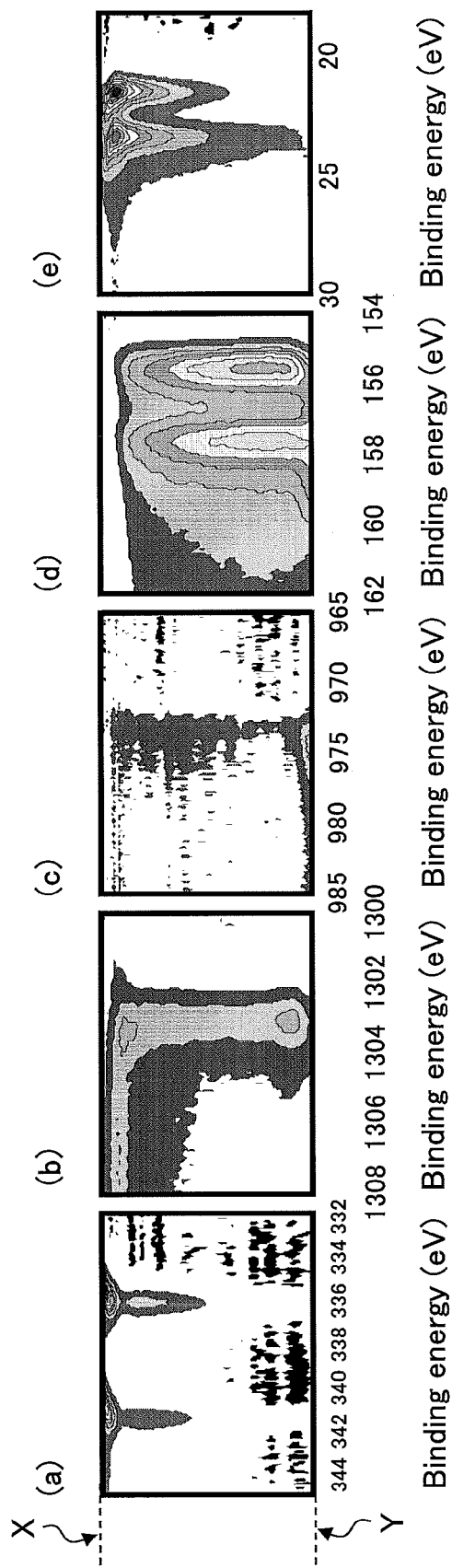
FIG. 20 A distribution condition of each element in a direction of a film thickness of a reflection-type optical control member immediately after fabrication of a sample for Practical Example 2 of the present invention.

FIG. 20 is such that, for each element indicated in an upper part of each graph, a distribution thereof is mapped in a thickness direction of a fabricated reflection-type optical control member, wherein FIG. 20 (a), FIG. 20 (b), FIG. 20 (c), FIG. 20 (d), and FIG. 20 (e) illustrate distribution conditions for Pd, for Mg, for O, for Y, and for Ta, respectively. Furthermore, in FIG. 20(a), a top of the figure that is a portion indicated by X and a bottom of the figure that is a portion indicated by Y illustrate a film surface and an interface with a glass substrate, respectively. For this reason, a distribution of a film interior is illustrated as going to a lower side (Y side) of the figure. A similar matter also applies to FIG. 20 (b)-(e).

From FIG. 20 (a), it was possible to find that such a sample was different from Comparative Example 3 and a Ta layer was present so that Pd was present only very near a film surface. For that reason, it was possible to find that little O (oxygen) was present in a film and Mg or Y was not oxidized or hydroxylated but was in a metallic state, as was clear from FIG. 20 (c).

It was considered that such a sample had a high transmittance in a transparent state and a high repetition durability because Pd that was a catalyst layer was present only very near a film surface.

Figure 21:
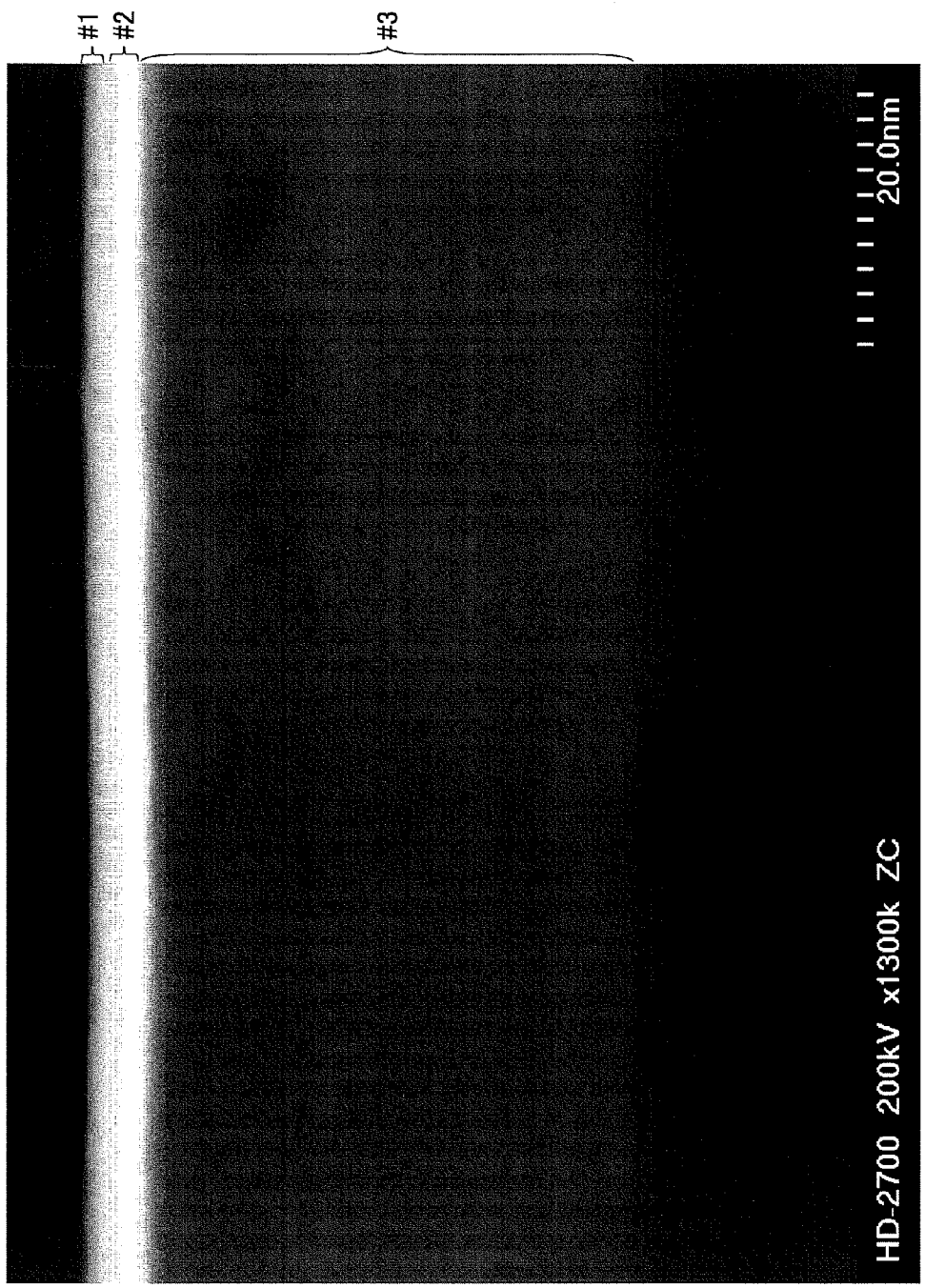
FIG. 21 A cross-sectional diagram of a reflection-type optical control member by STEM immediately after fabrication of a sample for Practical Example 2 of the present invention.

Moreover, a cross-sectional sample was fabricated from a sample immediately after sample fabrication in Practical Example 2 and STEM observation and EDX point analysis thereof were executed. An HAADF image provided by STEM was illustrated in FIG. 21.

Thereby, it was possible to find that such a sample was clearly divided into three layers (#1, #2, and #3), wherein #1 was principally of Pd and #2 was principally composed of Ta, while #3 was principally composed of Mg and Y, from a result of EDX point analysis. This result was generally consistent with a result of XPS.

Figure 22:
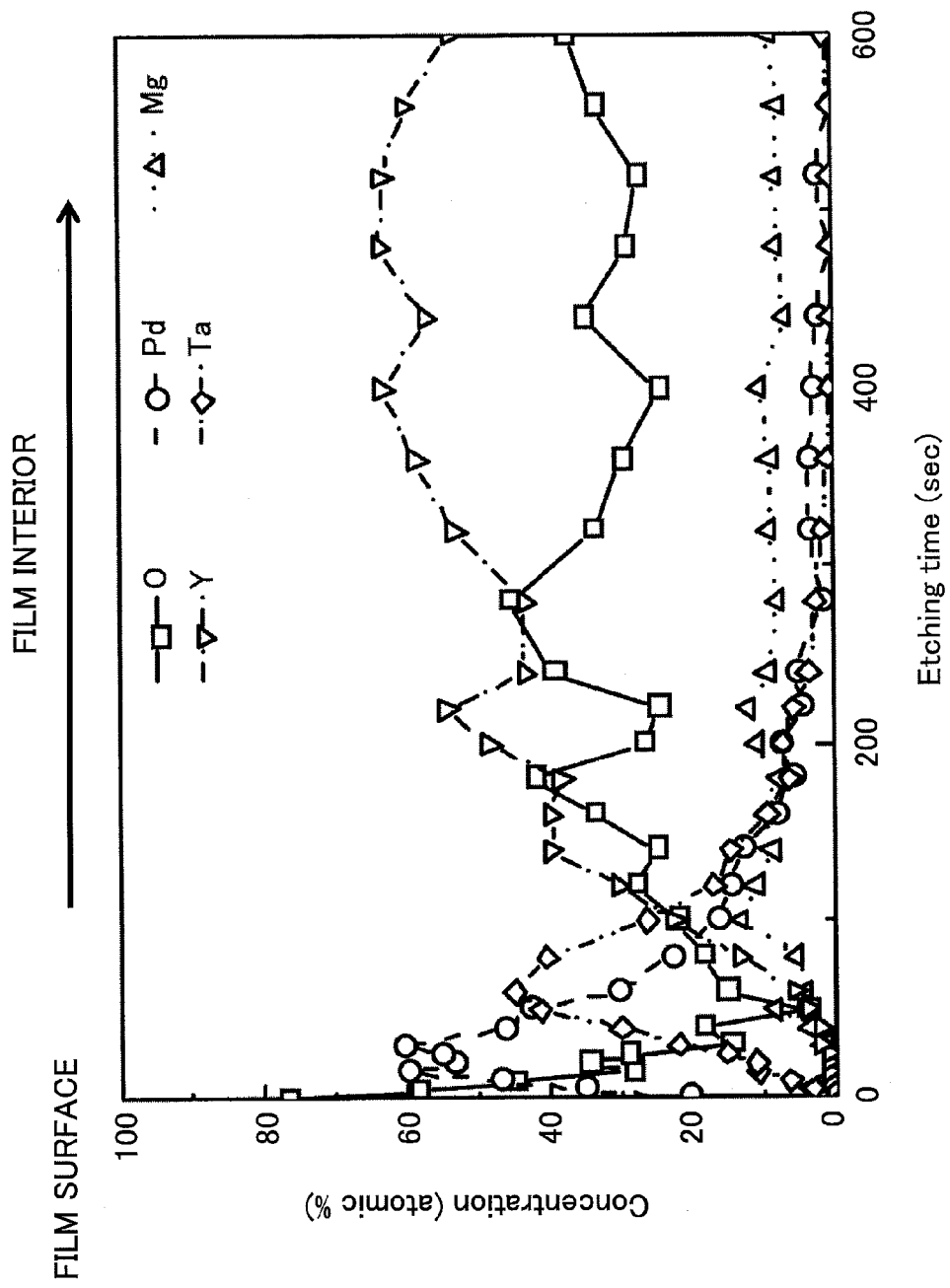
FIG. 22 A distribution condition of each element in a direction of a film thickness of a reflection-type optical control member after a repetition durability test for Practical Example 2 of the present invention.

For a sample in Practical Example 2 after a repetition durability test (after the number of state switching between a reflective state and a transparent state reached 1750), a distribution condition and a chemical bond state of each element (O, Pd, Mg, Y, or Ta) in a film thickness distribution direction were measured by using XPS similarly to Comparative Example 2 and Practical Example 1. A result of the distribution condition of each element in a film thickness distribution direction is illustrated in FIG. 22. As a result, it was possible to confirm that a case where tantalum was used for a low-oxygen-permeability oxidation inhibition layer had an effect of inhibiting diffusion of Pd and a low oxygen permeation performance similarly to a case where tungsten was used in Practical Example 1. It was possible to consider that this matter led to inhibition of degradation caused by switching repetition.

Practical Example 3

In the present practical example, a study was executed for a reflection-type optical control member that had a transmittance-variable oxidation inhibition layer that was a scandium thin film as an oxide inhibition part.

Specifically, a reflection-type optical control member was fabricated in such a manner that an optical control layer that was composed of a magnesium-yttrium alloy, a transmittance-variable oxidation inhibition layer that used a scandium thin film (oxidation inhibition part), and a catalyst layer were deposited sequentially.

Specifically, a magnesium-yttrium alloy thin film with a thickness of 40 nm (optical control layer), a scandium thin film with a thickness of 4 nm (transmittance-variable oxidation inhibition layer), and a palladium thin film with a thickness of 3.8 nm (catalyst layer) were sequentially film-formed on a glass substrate with a thickness of 1 mm (transparent member).

Specific film formation conditions for an optical control layer, a transmittance-variable oxidation inhibition layer, and a catalyst layer will be described.

Film formation of a magnesium-yttrium alloy thin film as an optical control layer, a scandium thin film as a transmittance-variable oxidation inhibition layer, and a palladium thin film as a catalyst layer was executed by using a magnetron sputtering device capable of multi-element film formation.

A metallic magnesium, a metallic yttrium, a metallic scandium, and a metallic palladium as targets were set in four sputtering guns, respectively.

First, a glass substrate was washed, and subsequently, set in a vacuum device, and evacuation was executed in a chamber thereof.

Then, a magnesium-yttrium alloy thin film was fabricated on a condition identical to that of Practical Example 1. At this time, as a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a scandium thin film was executed by applying a power of 40 W to a metallic scandium target on a vacuum condition identical to that in a case where the magnesium-yttrium alloy thin film was fabricated.

Finally, deposition of a palladium thin film was executed by applying a power of 30 W to a metallic palladium target on the identical vacuum condition.

A reflection-type optical control member fabricated in accordance with the procedure described above was in a metal luster reflective state, and as a surface of the palladium thin film was exposed to a hydrogen-containing gas, such a sample was changed into a transparent state due to hydrogenation of the scandium thin film and the magnesium-yttrium alloy thin film. On this condition, as a surface of the palladium thin film was exposed to atmosphere, returning to a reflective state was caused by dehydrogenation of the scandium thin film and the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured in order to execute an evaluation of an obtained reflection-type optical control member. A device illustrated in FIG. 6 was used for a measurement of a transmittance of laser light, similarly to a case of Practical Example 1. At this time, a specific operation procedure and condition were similar to those in a case of Practical Example 1 and hence had been omitted herein.

Figure 23:
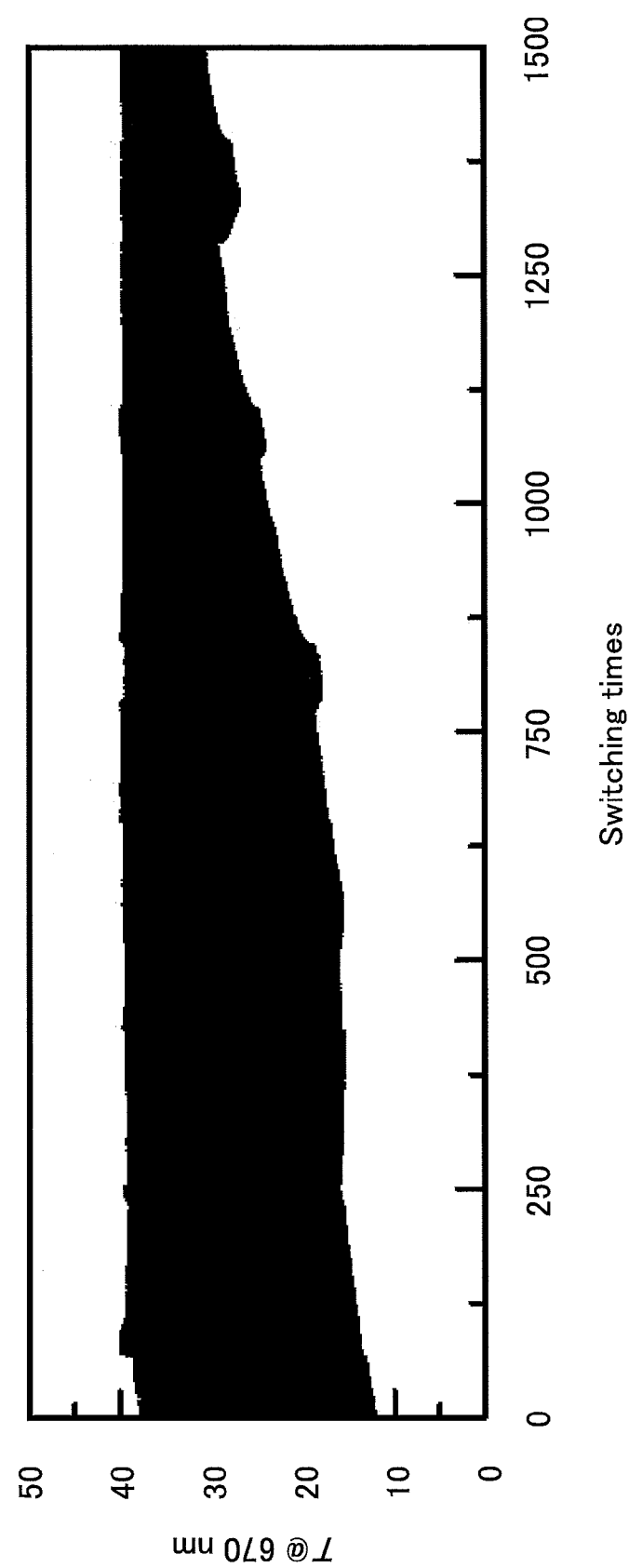
FIG. 23 A diagram that illustrates a relationship between a frequency of state switching between a reflective state and a transparent state and a transmittance of laser light for Practical Example 3 of the present invention.

A measurement result is illustrated in FIG. 23. Thereby, little degradation was caused by switching up to 800 times. It was possible to find that a scandium thin film had an effect of inhibiting degradation because a switching repetition durability was more significantly improved than Comparative Example 2.

Moreover, it was possible to find that a transmittance in a transparent state was approximately 40% and was generally identical to a transmittance in a transparent state in Comparative Example 2, and little reduction of a transmittance was caused even though a transmittance-variable oxidation inhibition layer (oxidation inhibition part) was inserted.

Figure 24:
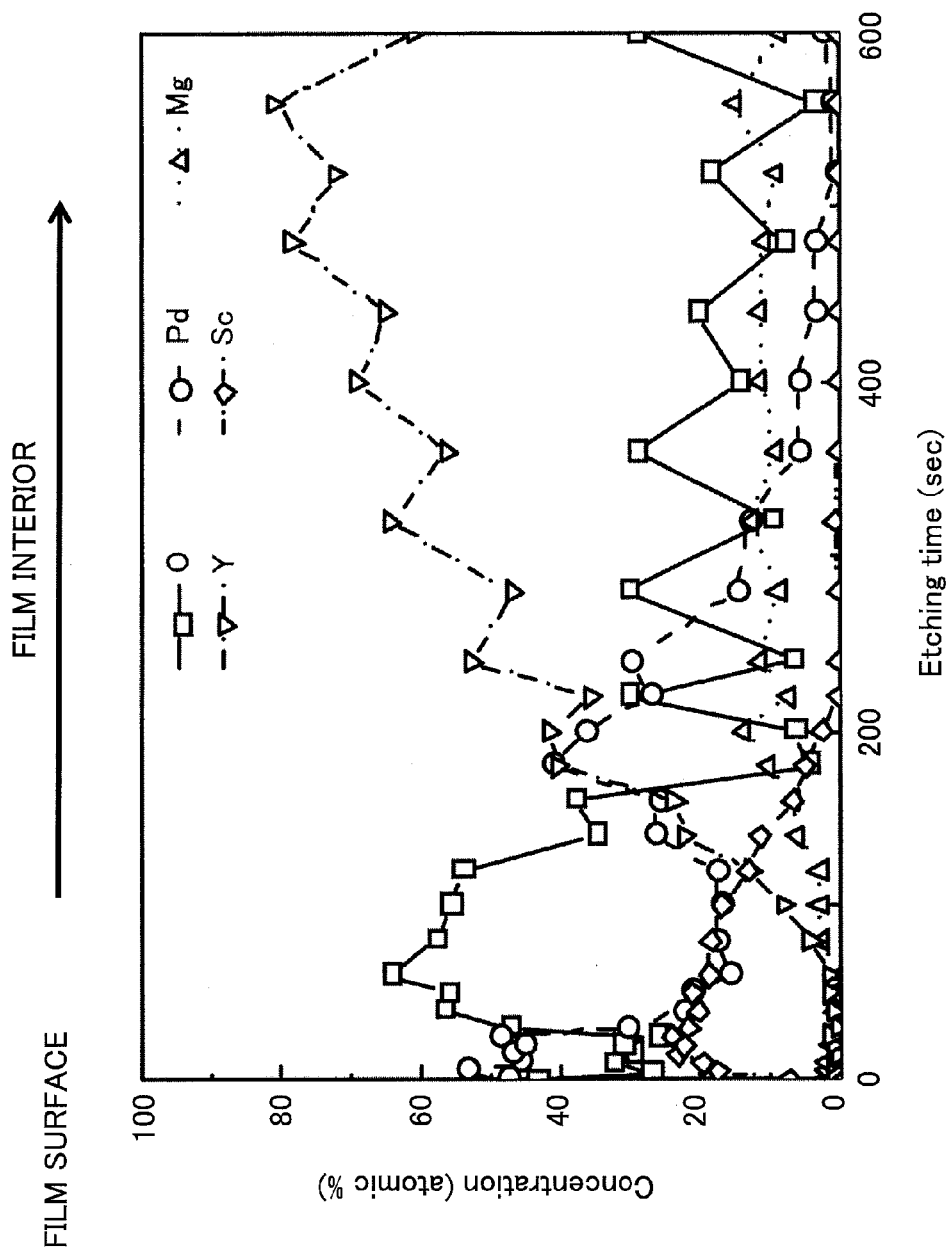
FIG. 24 A distribution condition of each element in a direction of a film thickness of a reflection-type optical control member after a repetition durability test for Practical Example 3 of the present invention.

For a sample in Practical Example 3 after a repetition durability test (after the number of state switching between a reflective state and a transparent state reached 1600), a distribution condition and a chemical bond state of each element (O, Pd, Mg, Y, or Sc) in a film thickness distribution direction were measured by using XPS similarly to Comparative Example 2 and Practical Examples 1 and 2. A result of the distribution condition of each element in a film thickness distribution direction is illustrated in FIG. 24.

As a result, it was possible to confirm that Pd remained on a film top surface and a region with a low Pd composition and a lot of distributed O was near a film surface although Sc that was included in a transmittance-variable oxidation inhibition layer had a low effect of inhibiting diffusion of Pd in a catalyst layer and was diffused in a film interior similarly to Comparative Example 2.

However, Sc was present in such a region differently from Comparative Example 2 and Sc was a sacrifice layer and oxidized to inhibit oxidation of Mg. It was considered that this matter led to inhibition of degradation caused by switching repetition.

Furthermore, little reduction of a transmittance in a transparent state was observed although a film thickness of a transmittance-variable oxidation inhibition layer that included Sc was greater than the tungsten thin film or the tantalum thin film that was a low-oxygen-permeability oxidation inhibition layer in Practical Example 1 or 2.

Figure 25:
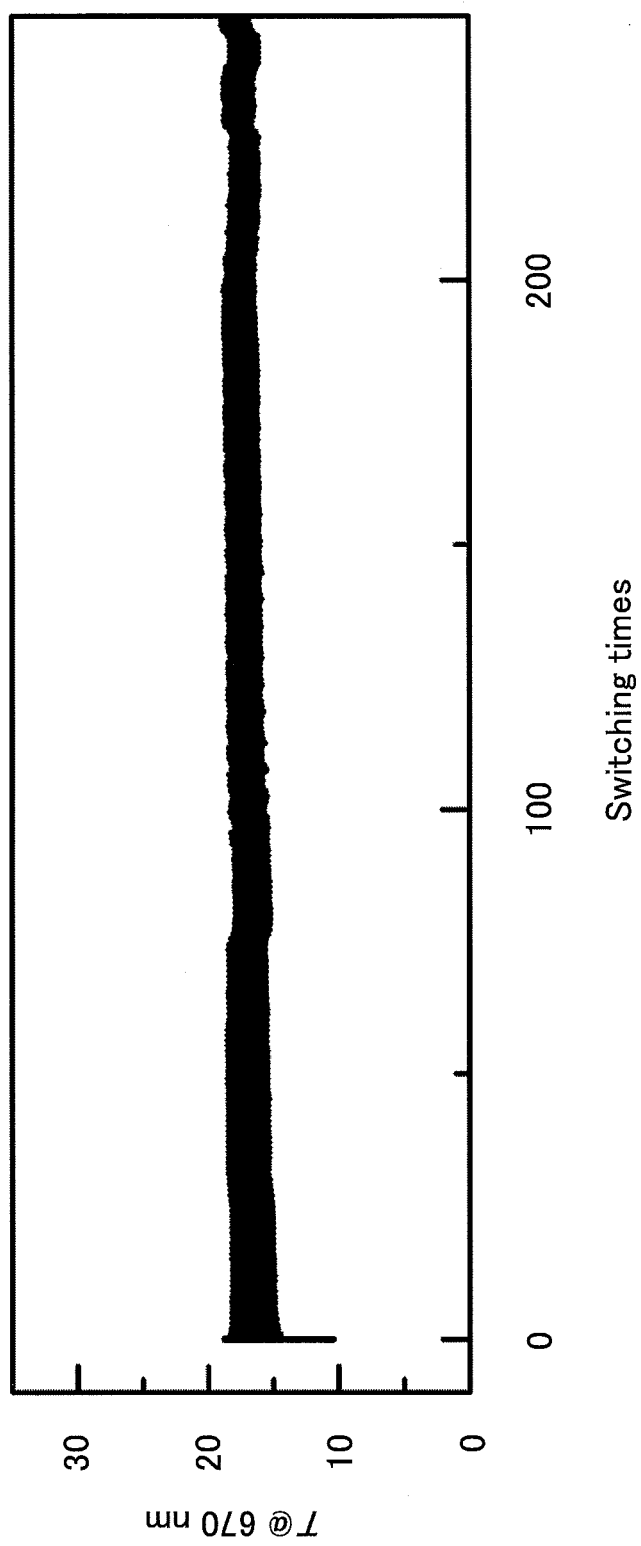
FIG. 25 A diagram that illustrates a relationship between a frequency of state switching between a reflective state and a transparent state and a transmittance of laser light for a bilayer film with Pd deposited on Sc.

In order to confirm this point, FIG. 25 illustrates a result of a measurement of a hydrogen absorption or release characteristic for a sample wherein a scandium thin film and a palladium thin film were deposited on a glass substrate similarly to the present practical example except that an optical control layer was not formed. The measurement was executed by using a device illustrated in FIG. 6 on a condition identical to that of the present practical example.

Thereby, it was possible to find that an optical transmittance was changed when absorption or release of hydrogen was caused by Sc. For a result described above, it was considered that Sc, itself, acted as a reflection-type optical control layer.

As described above, it was possible to use a low-oxygen-permeability oxidation inhibition layer or a transmittance-variable oxidation inhibition layer so that degradation of a reflection-type optical control element was inhibited without reducing a transmittance in a transparent state.

Practical Example 4

In the present practical example, a reflection-type optical control member was fabricated in such a manner that an optical control layer that was composed of a magnesium-yttrium alloy, a low-oxygen-permeability oxidation inhibition layer, a transmittance-variable oxidation inhibition layer, and a catalyst layer were sequentially deposited on a glass substrate that was a transparent member, and an evaluation thereof was executed.

Specifically, a magnesium-yttrium alloy thin film with a thickness of 40 nm (optical control layer), a tungsten thin film with a thickness of 0.8 nm (low-oxygen-permeability oxidation inhibition layer), a scandium thin film with a thickness of 4 nm (transmittance-variable oxidation inhibition layer), and a palladium thin film with a thickness of 3.8 nm (catalyst layer) were sequentially film-formed on a glass substrate with a thickness of 1 mm (transparent member).

Specific film formation conditions for an optical control layer, a low-oxygen-permeability oxidation inhibition layer, a transmittance-variable oxidation inhibition layer, and a catalyst layer will be described.

Film formation of a magnesium-yttrium alloy thin film as an optical control layer, a tungsten thin film as a low-oxygen-permeability oxidation inhibition layer, a scandium thin film as a transmittance-variable oxidation inhibition layer, and a palladium thin film as a catalyst layer was executed by using a magnetron sputtering device capable of multi-element film formation.

A metallic magnesium, a metallic yttrium, a metallic tungsten, a metallic scandium, and a metallic palladium as targets were set in five sputtering guns, respectively.

First, a glass substrate was washed, and subsequently, set in a vacuum device, and evacuation was executed in a chamber thereof.

Then, a magnesium-yttrium alloy thin film was fabricated on a condition identical to that of Practical Example 1. At this time, as a calibration curve of an obtained composition was estimated from a ratio of powers applied to respective targets by using film thicknesses and metal densities and a composition of a fabricated sample was estimated from this curve, a composition of such an alloy was $Mg_{0.36}Y_{0.64}$.

Subsequently, deposition of a tungsten thin film was executed by applying a power of 40 W to a metallic tungsten target on a vacuum condition identical to that in a case where the magnesium-yttrium alloy thin film was fabricated.

Then, deposition of a scandium thin film was executed by applying a power of 40 W to a metallic scandium target on the identical vacuum condition.

Finally, deposition of a palladium thin film was executed by applying a power of 30 W to a metallic palladium target on the identical vacuum condition.

A fabricated reflection-type optical control member was in a metal luster reflective state, and as a surface of the palladium thin film was exposed to a hydrogen-containing gas, such a sample was changed into a transparent state due to hydrogenation of the scandium thin film and the magnesium-yttrium alloy thin film. On this condition, as a surface of the palladium thin film was exposed to atmosphere, returning to a reflective state was caused by dehydrogenation of the scandium thin film and the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured in order to execute an evaluation of an obtained reflection-type optical control member. A device illustrated in FIG. 6 was used for a measurement of a transmittance of laser light, similarly to a case of Practical Example 1. At this time, a specific operation procedure and condition were similar to those in a case of Practical Example 1 and hence had been omitted herein.

Figure 26:
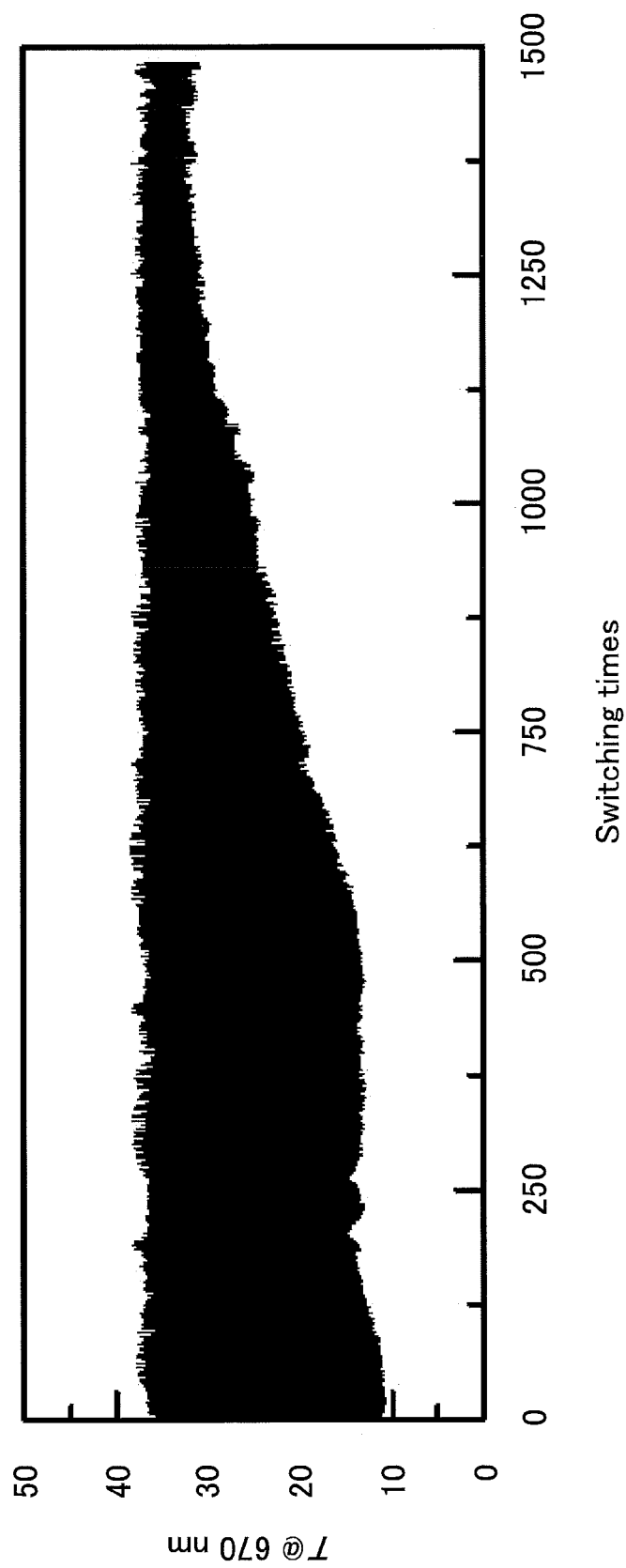
FIG. 26 A diagram that illustrates a relationship between a frequency of state switching between a reflective state and a transparent state and a transmittance of laser light for Practical Example 4 of the present invention.

A measurement result is illustrated in FIG. 26. Thereby, little degradation was caused by switching up to 700 times. It was possible to find that an effect of inhibition of degradation caused by switching repetition was similar to that in Practical Example 3 wherein one kind of oxidation inhibition layer (Sc as a transmittance-variable oxidation inhibition layer) was inserted.

Practical Example 5

In the present practical example, a study was executed for a reflection-type optical control member wherein a sequential order of deposition of a transmittance-variable oxidation inhibition layer and a low-oxygen-permeability oxidation inhibition layer is exchanged in Practical Example 4. That is, a reflection-type optical control member was fabricated in such a manner that an optical control layer that was composed of a magnesium-yttrium alloy, a transmittance-variable oxidation inhibition layer, a low-oxygen-permeability oxidation inhibition layer, and a catalyst layer were sequentially deposited on a glass substrate that was a transparent member.

A detailed film formation condition had been omitted because it was identical to that of Practical Example 4 except a sequential order of deposition.

A fabricated reflection-type optical control member was in a metal luster reflective state, and as a surface of the palladium thin film was exposed to a hydrogen-containing gas, such a sample was changed into a transparent state due to hydrogenation of the scandium thin film and the magnesium-yttrium alloy thin film. On this condition, as a surface of the palladium thin film was exposed to atmosphere, returning to a reflective state was caused by dehydrogenation of the scandium thin film and the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured in order to execute an evaluation of an obtained reflection-type optical control member. A device illustrated in FIG. 6 was used for a measurement of a transmittance of laser light, similarly to a case of Practical Example 1. At this time, a specific operation procedure and condition were similar to those in a case of Practical Example 1 and hence had been omitted herein.

Figure 27:
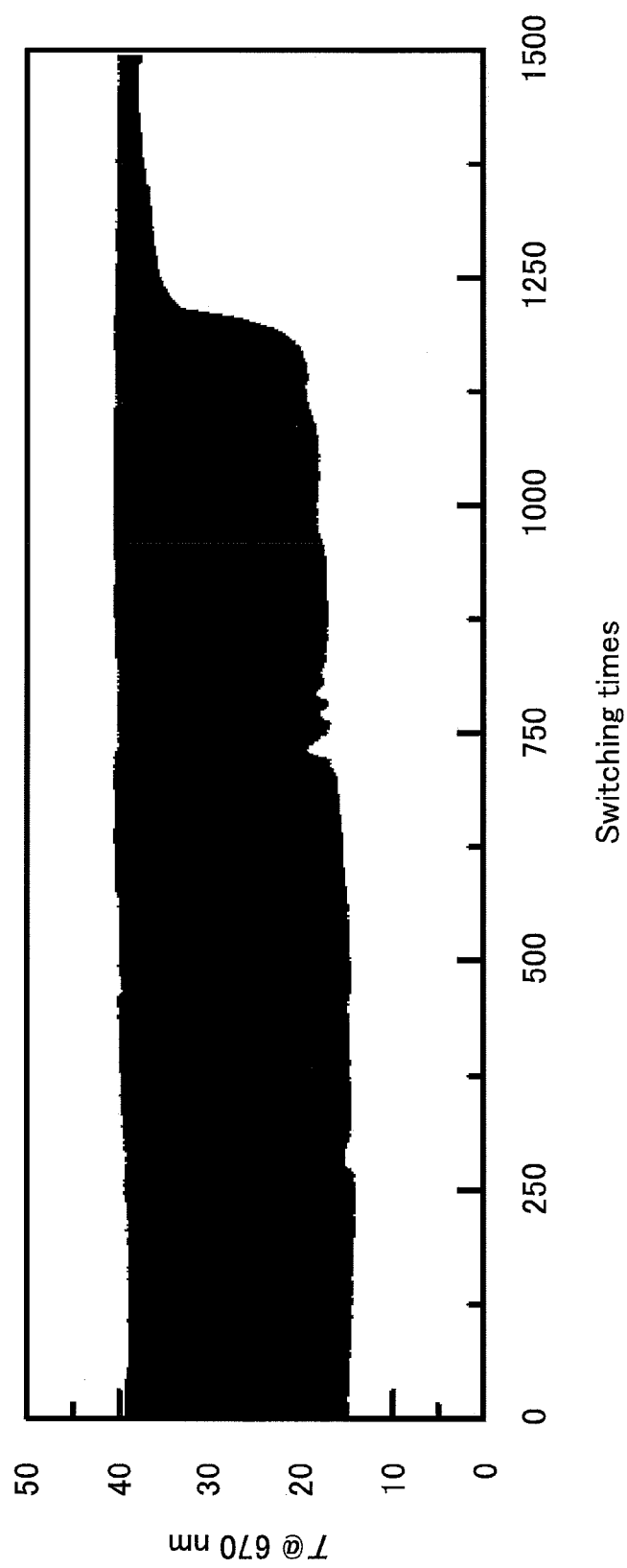
FIG. 27 A diagram that illustrates a relationship between a frequency of state switching between a reflective state and a transparent state and a transmittance of laser light for Practical Example 5 of the present invention.

A measurement result is illustrated in FIG. 27. Thereby, degradation was not caused at all by switching up to 1100 times. Degradation caused by switching repetition was inhibited more than Practical Example 1 or 2 (wherein W or Ta was used as a low-oxygen-permeability oxidation inhibition layer) and Practical Example 3 (wherein Sc was used as a transmittance-variable oxidation inhibition layer) that used one kind of oxidation inhibition layer. Moreover, a transmittance in a transparent state was approximately 40% and was generally identical to a transmittance in a transparent state for Comparative Example 2, and it was possible to find that little reduction of a transmittance was caused even though two kinds of oxidation inhibition layers were inserted.

Then, as compared with a result of Practical Example 4, it was possible to confirm that the present practical example had a higher repetition characteristic although a transmittance-variable oxidation inhibition layer and a low-oxygen-permeability oxidation inhibition layer were possessed.

From a result described above, it was possible to find that, in a case where a low-oxygen-permeability oxidation inhibition layer and a transmittance-variable oxidation inhibition layer were arranged in a oxidation inhibition part, it was possible to inhibit degradation of an optical control layer or a reflection-type optical control element (member) that was caused by switching repetition more effectively in a case where the transmittance-variable oxidation inhibition layer was provided on a side of the optical control layer rather than the low-oxygen-permeability oxidation inhibition layer.

Practical Example 6

In the present practical example, a reflection-type optical control member was fabricated in such a manner that the optical control layer 10 that was composed of a magnesium-yttrium-scandium alloy, the transmittance-variable oxidation inhibition layer 34 that was composed of scandium, the low-oxygen-permeability oxidation inhibition layer 32 that was composed of tantalum, and the catalyst layer 20 that was composed of palladium were sequentially deposited on a glass substrate that was a transparent member, and an evaluation thereof was executed.

Specifically, a magnesium-yttrium-scandium alloy thin film with a thickness of 40 nm (optical control layer 10), a scandium thin film with a thickness of 4 nm (transmittance-variable oxidation inhibition layer 34), a tantalum thin film with a thickness of 1 nm (low-oxygen-permeability oxidation inhibition layer 32), and a palladium thin film with a thickness of 2.6 nm that was less than that of Practical Example 1 (catalyst layer 20) were sequentially film-formed on a glass substrate with a thickness of 1 mm (transparent member).

Specific film formation conditions for the optical control layer 10, the transmittance-variable oxidation inhibition layer 34, the low-oxygen-permeability oxidation inhibition layer 32, and the catalyst layer 20 will be described.

Film formation of a magnesium-yttrium-scandium alloy thin film as the optical control layer 10, a scandium thin film as the transmittance-variable oxidation inhibition layer 34, a tantalum thin film as the low-oxygen-permeability oxidation inhibition layer 32, and a palladium thin film as the catalyst layer 20 was executed by using a magnetron sputtering device capable of multi-element film formation.

A metallic magnesium, a metallic yttrium, a metallic scandium, a metallic tantalum, and a metallic palladium as targets were set in five sputtering guns, respectively.

First, a glass substrate was washed, and subsequently, set in a vacuum device, and evacuation was executed in a chamber thereof.

Then, a magnesium-yttrium-scandium alloy thin film was fabricated by simultaneously applying a voltage to metallic magnesium, metallic yttrium, and metallic scandium targets.

Sputtering was executed by applying powers (electric powers) of 10 W, 30 W, and 10 W, to the metallic magnesium, metallic yttrium, and metallic scandium targets, respectively, in accordance with a direct current sputtering method, while an argon gas pressure in a chamber was 0.3 Pa as a vacuum condition during the sputtering. Here, it was possible to select and control a composition of an obtained film (optical control layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.40}Y_{0.52}Sc_{0.08}$.

Subsequently, deposition of a scandium thin film was executed by applying a power of 40 W to a metallic scandium target on an identical vacuum condition.

Then, deposition of a tantalum thin film was executed by applying a power of 40 W to a metallic tantalum target on the identical vacuum condition.

Finally, deposition of a palladium thin film was executed by applying a power of 30 W to a metallic palladium target on the identical vacuum condition.

A reflection-type optical control member fabricated in accordance with a procedure described above was in a metal luster reflective state, and as a surface of the palladium thin film was exposed to a hydrogen-containing gas, such a sample was changed into a transparent state due to hydrogenation of the scandium thin film and the magnesium-yttrium-scandium alloy thin film. On this condition, as a surface of the palladium thin film was exposed to atmosphere, returning to a reflective state was caused by dehydrogenation of the scandium thin film and the magnesium-yttrium-scandium alloy thin film. Thus, it was possible to confirm that a state of a fabricated reflection-type optical control member was reversibly changed between a transparent state caused by hydrogenation and a reflective state caused by dehydrogenation.

Then, a transmittance of light-emitting diode light was measured in order to execute an evaluation of an obtained reflection-type optical control member. A device illustrated in FIG. 6 was used for a measurement of a transmittance of light-emitting diode light, similarly to a case of Practical Example 1. At this time, a specific operation procedure and condition were similar to those in a case of Comparative Example 3 and hence had been omitted herein.

Figure 28:
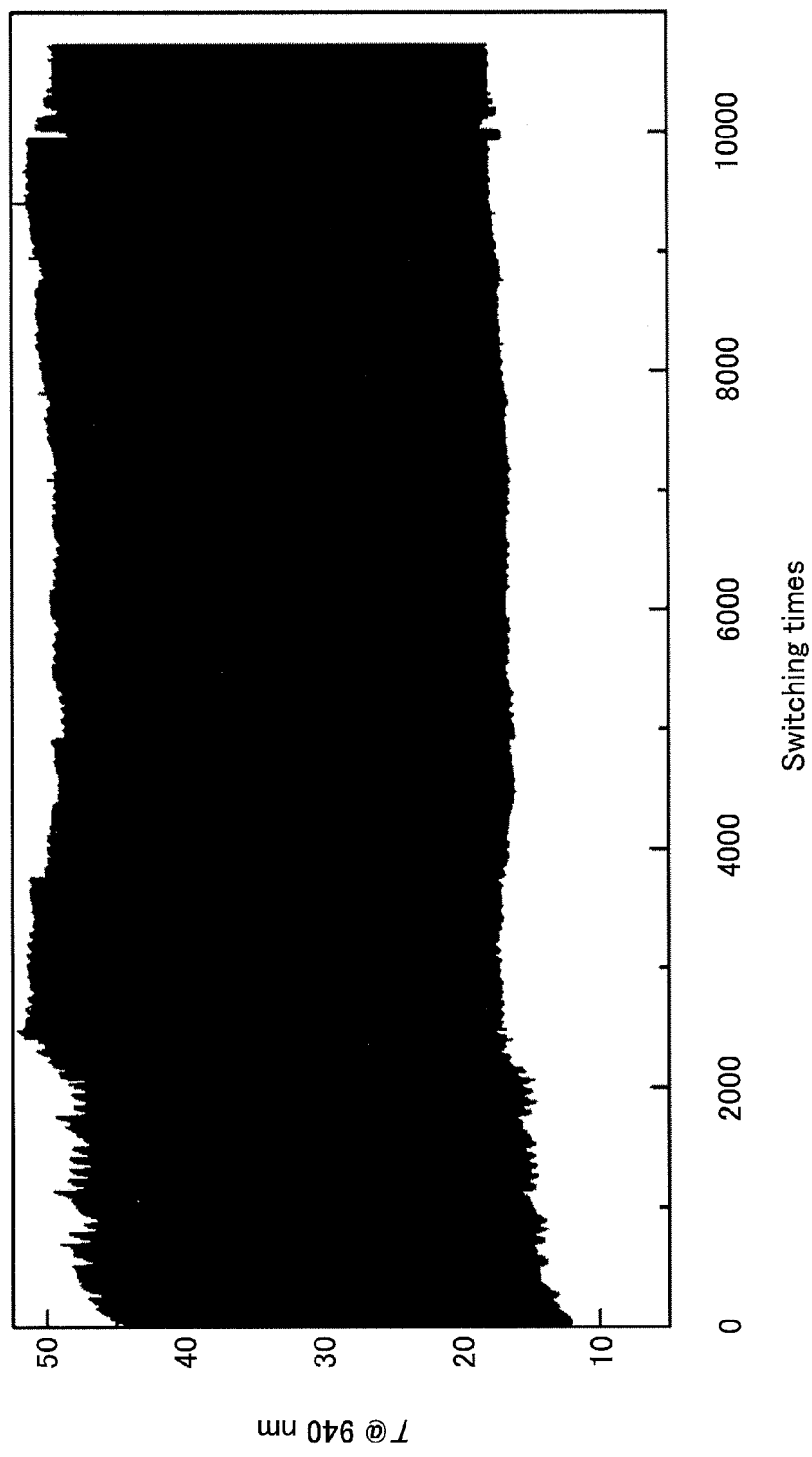
FIG. 28 A diagram that illustrates a relationship between a frequency of state switching between a reflective state and a transparent state and an optical transmittance for a light-emitting diode for Practical Example 6 of the present invention.

A measurement result is illustrated in FIG. 28. Thereby, degradation was not caused at all by switching 10000 or more times. Furthermore, it was possible to find that a transmittance of light-emitting diode light was greater than 50% and such a very high transmittance was obtained because a film thickness of a catalyst layer is particularly reduced.

Figure 29:
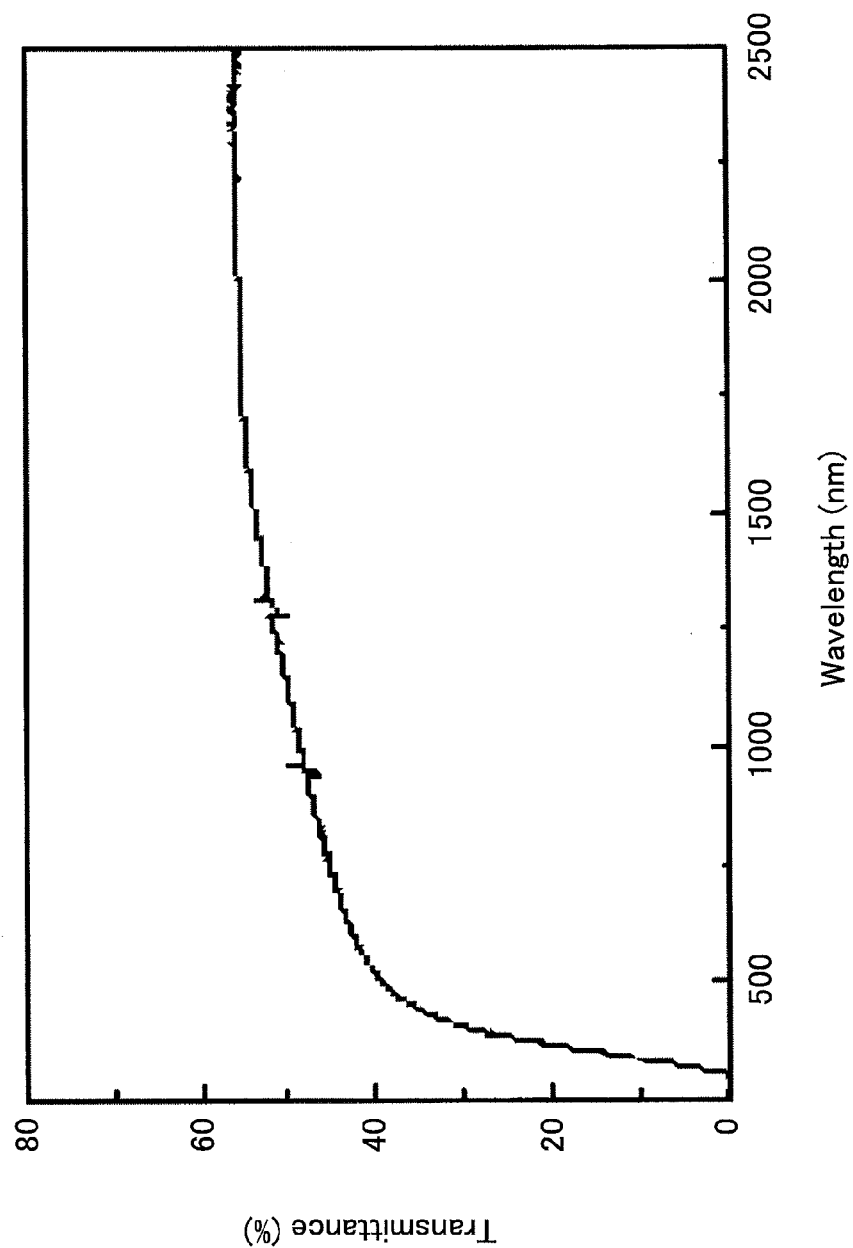
FIG. 29 A spectrum of a transmittance in a transparent state for Comparative Example 3

A transmittance spectrum of such a sample in a transparent state thereof is illustrated in FIG. 29. From this result, a visible transmittance of such a sample in a transparent state thereof was estimated to be 41%. A transmittance in a transparent state was successfully improved by about 10% as compared to Comparative Example 3 by inserting an oxidation inhibition part and thinning a catalyst layer.

Practical Example 7

In the present practical example, a reflection-type optical control member was fabricated in such a manner that the optical control layer 10 that was composed of a magnesium-yttrium-scandium alloy, the transmittance-variable oxidation inhibition layer 34 that was composed of a magnesium-scandium alloy, the low-oxygen-permeability oxidation inhibition layer 32 that was composed of tantalum, and the catalyst layer 20 that was composed of palladium were sequentially deposited on a glass substrate that was a transparent member, and an evaluation thereof was executed.

Specifically, a magnesium-yttrium-scandium alloy thin film with a thickness of 40 nm (optical control layer 10), a magnesium-scandium alloy thin film with a thickness of 4 nm (transmittance-variable oxidation inhibition layer 34), a tantalum thin film with a thickness of 1 nm (low-oxygen-permeability oxidation inhibition layer 32), and a palladium thin film with a thickness of 2.6 nm that was less than that of Practical Example 1 (catalyst layer 20) were sequentially film-formed on a glass substrate with a thickness of 1 mm (transparent member).

Specific film formation conditions for the optical control layer 10, the transmittance-variable oxidation inhibition layer 34, the low-oxygen-permeability oxidation inhibition layer 32, and the catalyst layer 20 will be described.

Film formation of a magnesium-yttrium-scandium alloy thin film as the optical control layer 10, a magnesium-scandium alloy thin film as the transmittance-variable oxidation inhibition layer 34, a tantalum thin film as the low-oxygen-permeability oxidation inhibition layer 32, and a palladium thin film as the catalyst layer 20 was executed by using a magnetron sputtering device capable of multi-element film formation.

A metallic magnesium, a metallic yttrium, a metallic scandium, a metallic tantalum, and a metallic palladium as targets were set in five sputtering guns, respectively.

First, a glass substrate was washed, and subsequently, set in a vacuum device, and evacuation was executed in a chamber thereof.

Then, a magnesium-yttrium-scandium alloy thin film was fabricated by simultaneously applying a voltage to metallic magnesium, metallic yttrium, and the metallic scandium targets.

Sputtering was executed by applying powers (electric powers) of 10 W, 40 W, and 10 W, to the metallic magnesium, metallic yttrium, and metallic scandium targets, respectively, in accordance with a direct current sputtering method, while an argon gas pressure in a chamber was 0.3 Pa as a vacuum condition during the sputtering. Here, it was possible to select and control a composition of an obtained film (optical control layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.34}Y_{0.60}Sc_{0.06}$.

Subsequently, deposition of a magnesium-scandium alloy thin film was executed by applying powers of 10 W and 40 W to the metallic magnesium and metallic scandium targets, respectively, on an identical vacuum condition. Here, it was possible to select and control a composition of an obtained film (transmittance-variable oxidation inhibition layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.54}Sc_{0.46}$.

Then, deposition of a tantalum thin film was executed by applying a power of 40 W to a metallic tantalum target on the identical vacuum condition.

Finally, deposition of a palladium thin film was executed by applying a power of 30 W to a metallic palladium target on the identical vacuum condition.

A reflection-type optical control member fabricated in accordance with a procedure described above was in a metal luster reflective state, and as a surface of the palladium thin film was exposed to a hydrogen-containing gas, such a sample was changed into a transparent state due to hydrogenation of the magnesium-yttrium-scandium alloy thin film and the magnesium-scandium alloy thin film. On this condition, as a surface of the palladium thin film was exposed to atmosphere, returning to a reflective state was caused by dehydrogenation of the magnesium-yttrium-scandium alloy thin film and the magnesium-scandium alloy thin film. Thus, it was possible to confirm that a state of a fabricated reflection-type optical control member was reversibly changed between a transparent state caused by hydrogenation and a reflective state caused by dehydrogenation.

Then, a transmittance of laser light was measured in order to execute an evaluation of an obtained reflection-type optical control member. A device illustrated in FIG. 6 was used for a measurement of a transmittance of laser light, similarly to a case of Practical Example 1. At this time, a specific operation procedure and condition were similar to those in a case of Practical Example 1 and hence had been omitted herein.

Figure 30:
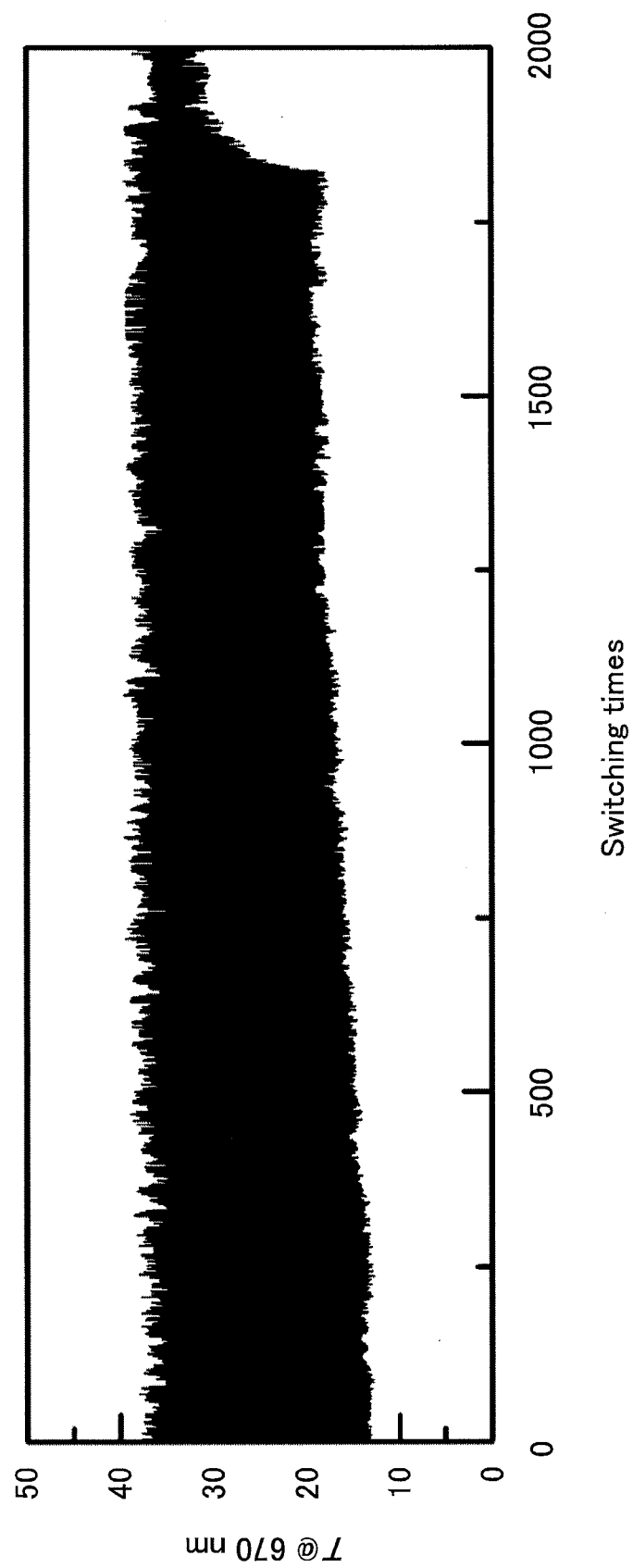
FIG. 30 A diagram that illustrates a relationship between a frequency of state switching between a reflective state and a transparent state and a transmittance of laser light for Practical Example 7 of the present invention.

A measurement result is illustrated in FIG. 30. Thereby, degradation was not caused at all by switching 1800 or more times. From the above, it was possible to find that a magnesium-scandium alloy thin film was effective for inhibition of degradation. Moreover, a transmittance in a transparent state was approximately 40% and was generally identical to a transmittance in a transparent state for Comparative Example 2, and it was possible to find that little reduction of a transmittance was caused even though an oxidation inhibition part was inserted that had such a transmittance-variable oxidation inhibition layer and a low-oxygen-permeability oxidation inhibition layer.

Practical Example 8

In the present practical example, a study was executed for a refractive index of an antireflection layer and a film thickness of such a layer that were suitable for increasing a visible transmittance in a transparent state.

Specifically, a suitable refractive index of an antireflection layer and a film thickness of such a layer were estimated by presuming a structure described below and calculating a visible transmittance in a transparent state on a computer simulation. For executing a calculation, a complex refractive index of a hydride of $Mg_{0.41}Y_{0.59}$ that was estimated by a spectroscopic ellipsometer, a complex refractive index of a hydride of Pd, and a document value of a complex refractive index of Ta described in Edward D. Palik, Handbook of Optical Constants of Solids: Volume 2, pp. 417-418 were used, and a refractive index of an antireflection layer in a range of 380 nm to 780 nm was constant in such a simulation.

For calculation, a model was used wherein an $Mg_{0.41}Y_{0.59}$ hydride layer with a thickness of 50 nm, a Ta layer with a thickness of 2 nm, and a Pd layer with a thickness of 3 nm were sequentially deposited on a transparent substrate with a thickness of 1 mm and a refractive index of 1.5 and further a transparent antireflection layer with changed refractive index and film thickness was deposited thereon.

Figure 31:
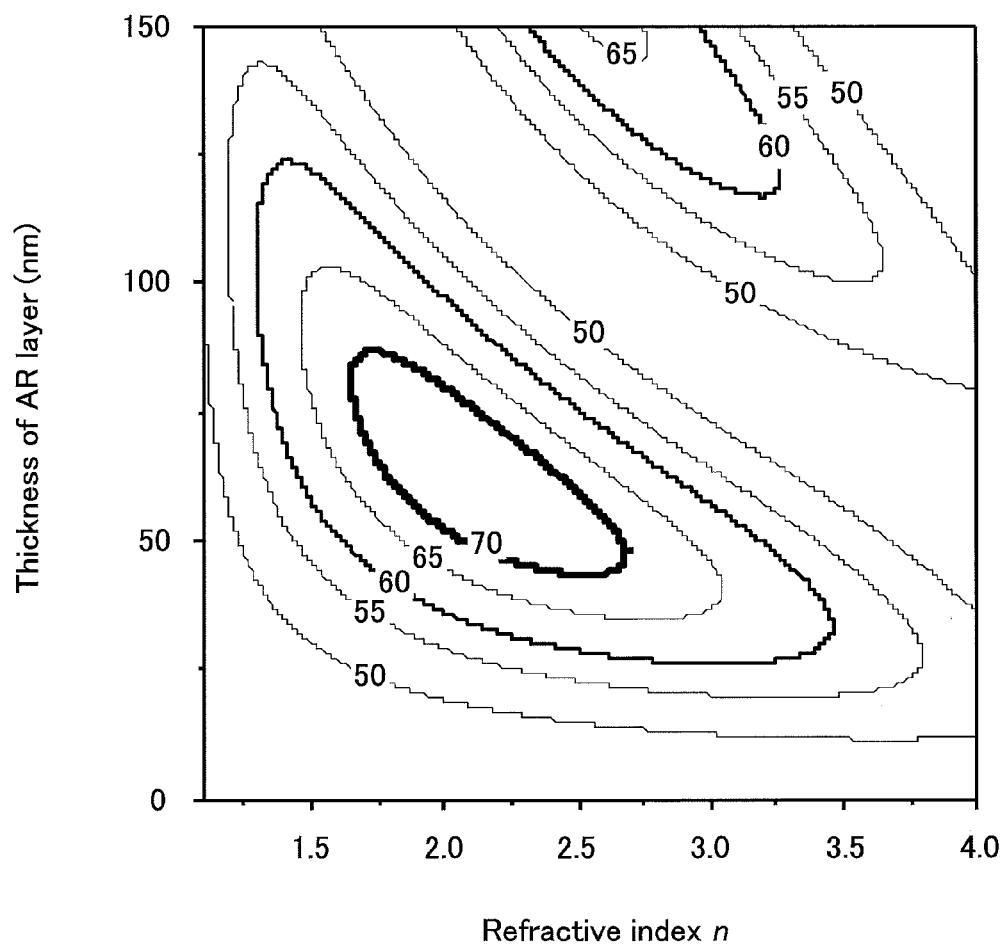
FIG. 31 A contour diagram provided by simulation of a visible transmittance in a transparent state when a refractive index and a film thickness of an antireflection layer are changed, for Practical Example 8 of the present invention.

A result of calculation of a visible transmittance in a transparent state for respective refractive indices and film thicknesses is illustrated in FIG. 31. In FIG. 31, a transverse axis and a longitudinal axis indicate a refractive index of an antireflection layer in a visible region of 380 nm to 780 nm and a film thickness of such an antireflection layer, respectively, and a region where a visible transmittance was in a predetermined range is illustrated by a contour. A number described for a contour in a graph designates a visible transmittance on such a line.

For such a result, it was possible to confirm that a refractive index of an antireflection layer in a visible region of 380 nm to 780 nm was greater than or equal to 1.3 and less than or equal to 3.4 and a film thickness thereof was greater than or equal to 25 nm and less than or equal to 125 nm so that it was possible for a visible transmittance to be greater than or equal to 60%. Furthermore, it was possible to confirm that a refractive index was greater than or equal to 1.5 and less than or equal to 3.1 and a film thickness was greater than or equal to 35 nm and less than or equal to 105 nm so that it was possible for a visible transmittance to be greater than or equal to 65%. Then, it was possible to confirm that a refractive index was greater than or equal to 1.6 and less than or equal to 2.7 and a film thickness was greater than or equal to 45 nm and less than or equal to 85 nm so that it was possible for a visible transmittance to be greater than or equal to 70%.

Practical Example 9

In the present practical example, a study was executed for a film thickness of an optical control layer that was suitable for increasing a visible transmittance in a transparent state.

Specifically, suitable film thicknesses of an optical control layer and an antireflection layer were estimated by presuming a structure described below and calculating a visible transmittance in a transparent state on a computer. For executing a calculation, a complex refractive index of a hydride of $Mg_{0.41}Y_{0.59}$ that was estimated by a spectroscopic ellipsometer, a complex refractive index of a hydride of Pd, and a document value of a complex refractive index of Ta described in Edward D. Palik, Handbook of Optical Constants of Solids: Volume 2, pp. 417-418, and a refractive index of an antireflection layer suitable for a visible transmittance in a transparent state that was estimated in Practical Example 8 were used.

For calculation, a model was used wherein an $Mg_{0.41}Y_{0.59}$ hydride layer with a changed thickness, a Ta layer with a thickness of 2 nm, and a Pd layer with a thickness of 3 nm were sequentially deposited on a transparent substrate with a thickness of 1 mm and a refractive index of 1.5 and further a transparent antireflection layer with a changed film thickness was deposited thereon. Herein, a refractive index of the antireflection layer was 2.1.

Figure 32:
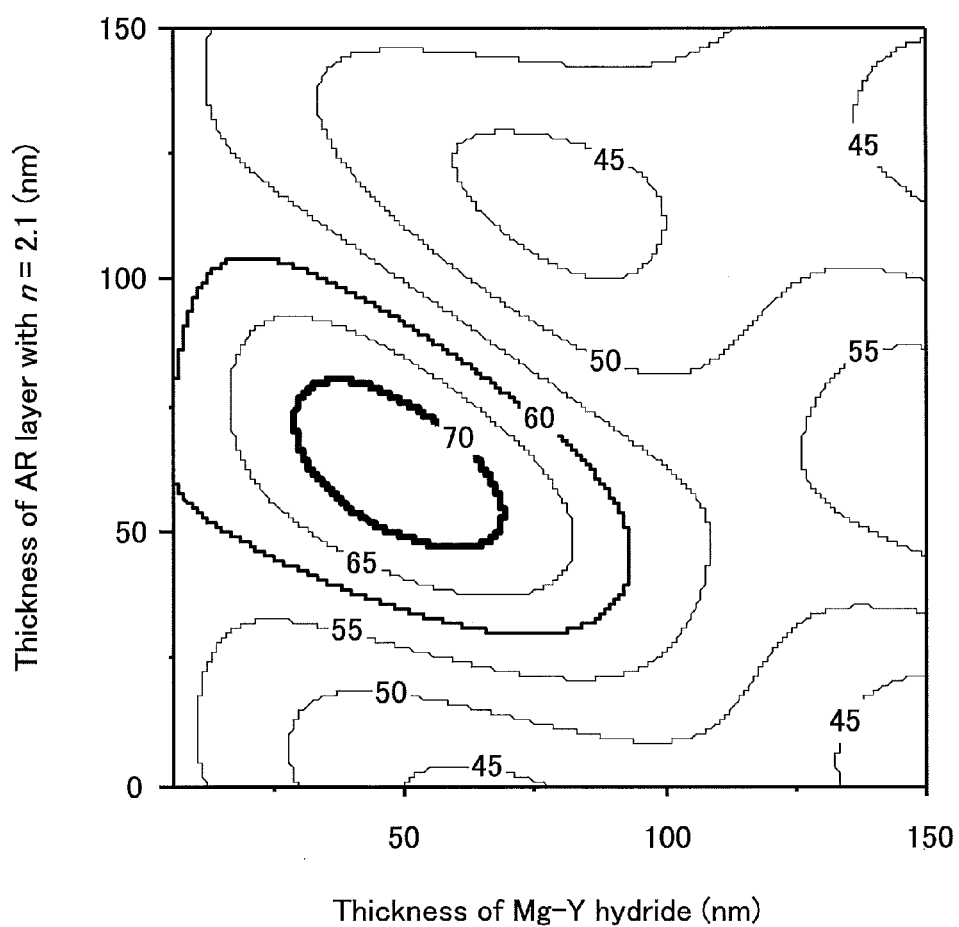
FIG. 32 A contour diagram provided by simulation of a visible transmittance in a transparent state when film thicknesses of an optical control layer and an antireflection layer are changed, for Practical Example 9 of the present invention.

A result of calculation of a visible transmittance in a transparent state in a case where film thicknesses of an optical control layer and an antireflection layer were changed is illustrated in FIG. 32. In FIG. 32, a transverse axis and a longitudinal axis indicate a film thickness of an optical control layer and a film thickness of an antireflection layer, respectively, and a region where a visible transmittance was in a predetermined range is illustrated by a contour. For such a result, it was possible to find that a film thickness of an optical control layer was less than or equal to 95 nm and a film thickness of an antireflection layer was greater than or equal to 30 nm and less than or equal to 105 nm so that it was possible for a visible transmittance to be greater than or equal to 60%. Furthermore, it was possible to find that a film thickness of an optical control layer was greater than or equal to 16 nm and less than or equal to 82 nm and a film thickness of an antireflection layer was greater than or equal to 37 nm and less than or equal to 93 nm so that it was possible for a visible transmittance to be greater than or equal to 65%. Moreover, it was possible to find that a film thickness of an optical control layer was greater than or equal to 30 nm and less than or equal to 55 nm and a film thickness of an antireflection layer was greater than or equal to 46 nm and less than or equal to 80 nm so that it was possible for a visible transmittance to be greater than or equal to 70%.

Practical Example 10

In the present practical example, a study was executed for a validity of simulation results in Practical Example 8 and Practical Example 9.

Specifically, an $Mg_{0.41}Y_{0.59}$ alloy thin film with a film thickness of 50 nm (optical control layer), a tantalum thin film with a film thickness of 1.6 nm (low-oxygen-permeability oxidation inhibition layer (oxidation inhibition part)), a palladium thin film with a film thickness of 2.6 nm (catalyst layer), and a titanium oxide thin film with a film thickness of 50 nm (antireflection layer) were sequentially film-formed on a glass substrate with a thickness of 1 mm (transparent member). Here, a refractive index of a film-formed antireflection layer with respect to light with a wavelength of 550 nm was 2.0.

Specific film formation conditions for an optical control layer, a low-oxygen-permeability oxidation inhibition layer, and a catalyst layer will be described.

A magnetron sputtering device capable of multi-element film formation was used for film formation of an $Mg_{0.41}Y_{0.59}$ alloy thin film as an optical control layer, a tantalum thin film as an oxidation inhibition layer that had a low oxygen permeability, and a palladium thin film as a catalyst layer. Furthermore, film formation of a titanium oxide thin film as an antireflection layer was executed by a sol-gel method that used spin-coating.

A metallic magnesium, a metallic yttrium, a metallic tantalum, and a metallic palladium as targets were set in four sputtering guns, respectively.

First, a glass substrate was washed, and subsequently, set in a vacuum device, and evacuation was executed in a chamber thereof.

Then, a magnesium-yttrium alloy thin film was fabricated by simultaneously applying a voltage to metallic magnesium and metallic yttrium targets.

Sputtering was executed by applying powers (electric powers) of 10 W and 30 W to the metallic magnesium and metallic yttrium targets, respectively, in accordance with a direct current sputtering method, while an argon gas pressure in a chamber was 0.3 Pa as a vacuum condition during the sputtering. Here, it was possible to select and control a composition of an obtained film (optical control layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.41}Y_{0.59}$.

Subsequently, deposition of a tungsten thin film was executed by applying a power of 20 W to a metallic tantalum target on an identical vacuum condition.

Finally, deposition of a palladium thin film was executed by applying a power of 30 W to a metallic palladium target on the identical vacuum condition.

A reflection-type optical control member fabricated by a procedure described above was in a metal luster reflective state, and as a surface of the palladium thin film was exposed to a hydrogen gas at 1 atmosphere that had been diluted by argon to be 4 volume % (that will be referred to as a "hydrogen-containing gas" below), such a sample was changed into a transparent state due to hydrogenation of a magnesium-yttrium alloy thin film.

Figure 33:
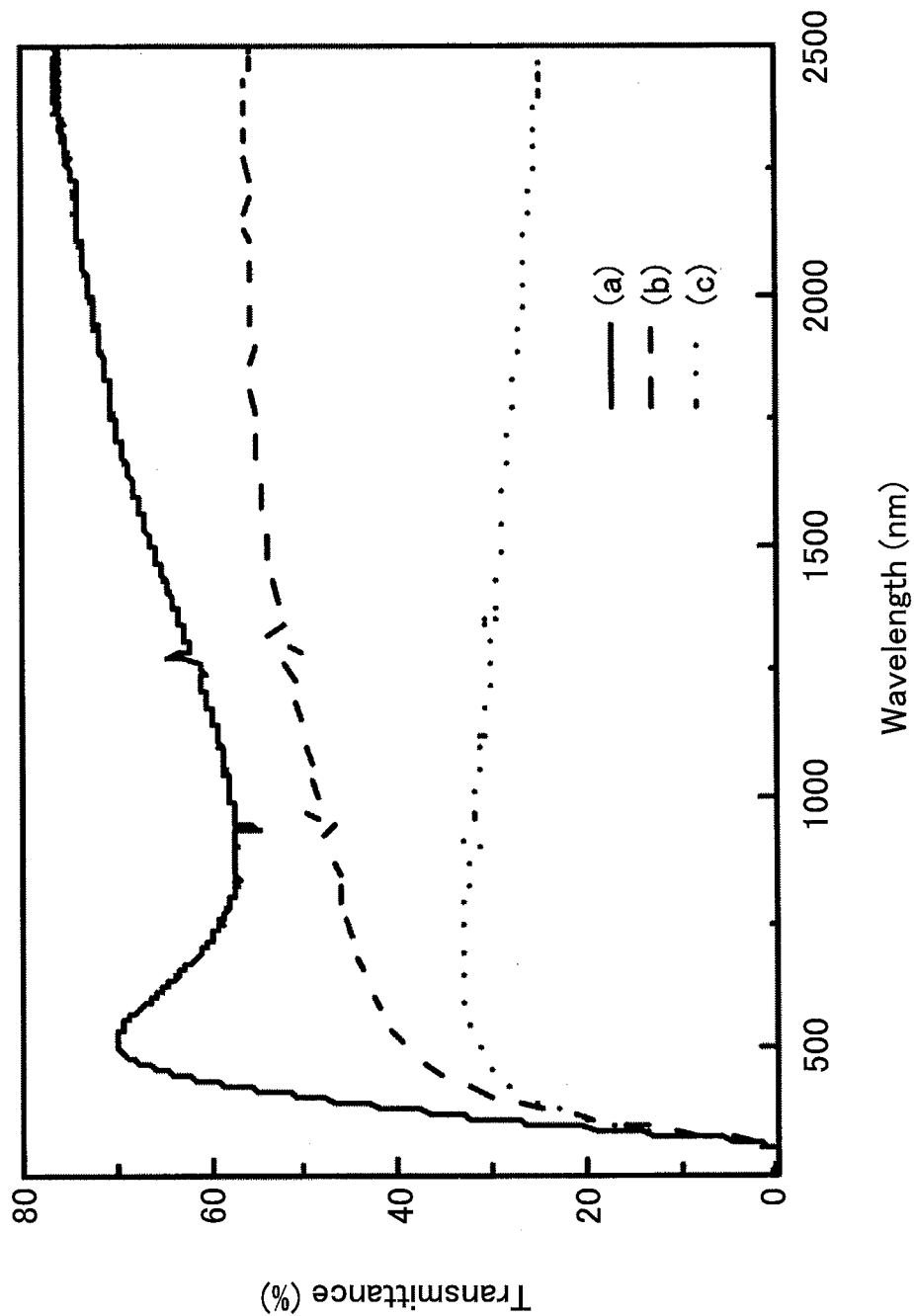
FIG. 33 A spectrum of a transmittance in a transparent state for Practical Example 10 of the present invention.

A transmittance spectrum of such a sample in a transparent state thereof is illustrated in FIG. 33. In FIG. 33, a curve designated by (a) indicates a transmittance spectrum of a sample in the present practical example. Furthermore, transmittance spectra for Practical Example 6 and Comparative Example 3 were designated by (b) and (c), respectively, in the figure, for reference. From this result, a visible transmittance in a transparent state for a sample in the present practical example was estimated to be 68%. This result illustrated a validity of simulation results in Practical Example 8 and Practical Example 9. Moreover, a transmittance in a transparent state was successfully improved significantly as compared with 42% for Practical Example 6 and 32% for Comparative Example 3.

Practical Example 11

In the present practical example, a study was executed for a reflection-type optical control member that had a low-oxygen-permeability oxidation inhibition layer that was a partially-oxidized tantalum thin film as an oxidation inhibition part and further had an antireflection layer.

Specifically, a reflection-type optical control member was fabricated in such a manner that an optical control layer that was composed of a magnesium-yttrium alloy, a low-oxygen-permeability oxidation inhibition layer (oxidation inhibition part) that used a partially-oxidized tantalum thin film, and a catalyst layer were sequentially deposited.

First, a magnesium-yttrium alloy thin film with a thickness of 40 nm (optical control layer), a partially-oxidized tantalum thin film with a thickness of 1.0 nm (low-oxygen-permeability oxidation inhibition layer), and a palladium thin film with a thickness of 3.7 nm (catalyst layer) were film-formed on a glass substrate with a thickness of 1 mm (transparent member). Here, a fluororesin thin film with a film thickness of 80 nm (antireflection layer) was further film-formed before a measurement of a visible transmittance described below was executed. Here, a refractive index of a film-formed antireflection layer with respect to light with a wavelength of 550 nm was 1.4. Furthermore, a fluorine coating agent (commercial name: DURASURF (registered trademark) produced by HARVES Co. Ltd.) was used as a fluororesin.

Specific film formation conditions for an optical control layer, a low-oxygen-permeability oxidation inhibition layer, and a catalyst layer will be described.

Film formation of a magnesium-yttrium alloy thin film as an optical control layer, a partially-oxidized tantalum thin film as an oxidation inhibition layer that had a low oxygen permeability, and a palladium thin film as a catalyst layer was executed by using a magnetron sputtering device capable of multi-element film formation.

A metallic magnesium, a metallic yttrium, a metallic tantalum, and a metallic palladium as targets were set in four sputtering guns, respectively.

First, a glass substrate was washed, and subsequently, set in a vacuum device, and evacuation was executed in a chamber thereof.

Then, a magnesium-yttrium alloy thin film was fabricated by simultaneously applying a voltage to metallic magnesium and metallic yttrium targets.

Sputtering was executed by applying powers (electric powers) of 10 W and 30 W to the metallic magnesium and metallic yttrium targets, respectively, in accordance with a direct current sputtering method, while an argon gas pressure in a chamber was 0.3 Pa as a vacuum condition during the sputtering. Here, it was possible to select and control a composition of an obtained film (optical control layer) depending on a power that was herein applied to each target.

As a calibration curve of an obtained composition was estimated from a ratio of powers applied to respective targets by using film thicknesses and metal densities and a composition of a fabricated sample was estimated from this curve, a composition of such an alloy was $Mg_{0.41}Y_{0.59}$.

Subsequently, deposition of a tantalum thin film was executed by applying a power of 20 W to the metallic tantalum target on an identical vacuum condition and further a portion of tantalum was oxidized with oxygen.

Then, deposition of a palladium thin film was executed by applying a power of 30 W to a metallic palladium target on the identical vacuum condition.

A reflection-type optical control member fabricated by a procedure described above was in a metal luster reflective state, and as a surface of the palladium thin film was exposed to a hydrogen-containing gas, such a sample was changed into a transparent state due to hydrogenation of a magnesium-yttrium alloy thin film. On this condition, as a surface of the palladium thin film was exposed to atmosphere, returning to a reflective state was caused by dehydrogenation of the magnesium-yttrium alloy thin film. Thus, it was possible to confirm that a state of a fabricated reflection-type optical control member was reversibly changed between a transparent state caused by hydrogenation and a reflective state caused by dehydrogenation.

Then, a transmittance of light-emitting diode light was measured in order to execute an evaluation of an obtained reflection-type optical control member. A device illustrated in FIG. 6 was used for a measurement of a transmittance of light-emitting diode light, similarly to a case of Practical Example 1. At this time, a specific operation procedure and condition were similar to those in a case of Comparative Example 3 and hence had been omitted herein.

Figure 34:
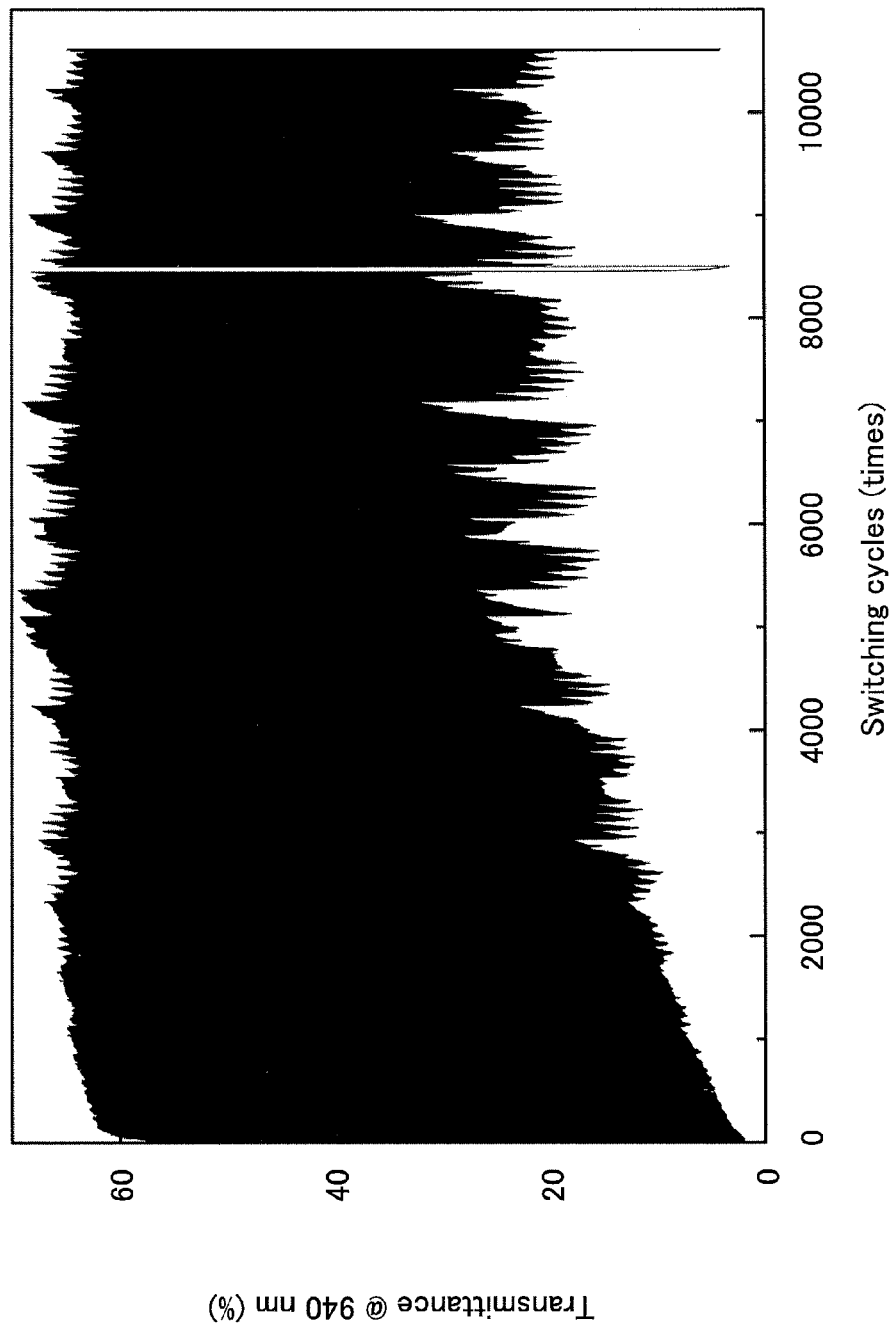
FIG. 34 A distribution condition of each element in a direction of a film thickness of a reflection-type optical control member after a repetition durability test for Practical Example 11 of the present invention.

A measurement result is illustrated in FIG. 34. Thereby, degradation was not caused at all by switching 10000 or more times. Furthermore, it was possible to find that a transmittance of light-emitting diode light was greater than 65% and a very high transmittance was obtained, because a film thickness of a catalyst layer was particularly small.

Figure 35:
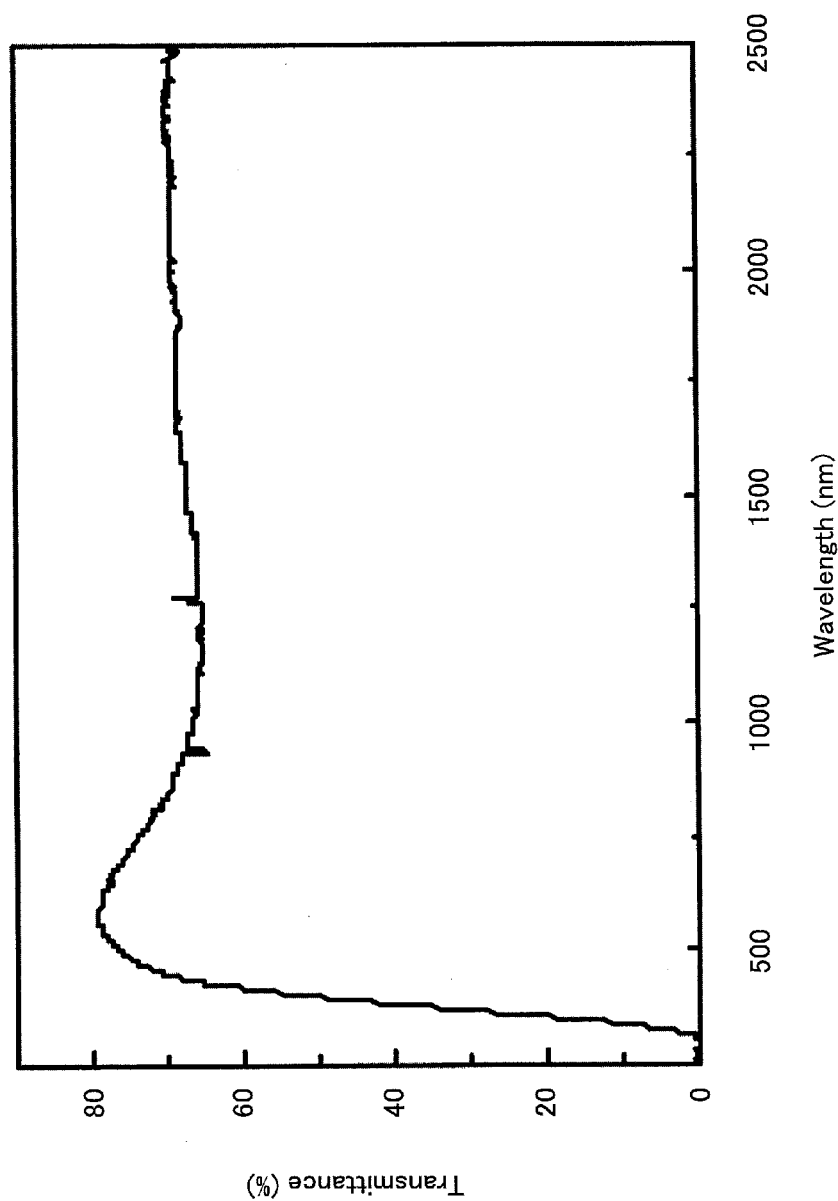
FIG. 35 A spectrum of a transmittance in a transparent state for Practical Example 11 of the present invention.

A transmittance spectrum in a transparent state after an antireflection layer with a refractive index of 1.4 with respect to light with a wavelength of 550 nm was film-formed on a surface of a sample in the present practical example after a repetition durability test (after the number of times of state switching between a reflective state and a transparent state reaches 10600) is illustrated in FIG. 35. Film formation of a fluororesin thin film that was an antireflection layer was executed by a spin-coating method.

From this result, a visible transmittance of such a sample in a transparent state thereof was estimated to be 78%. A transmittance of an oxidation inhibition part was improved by oxidizing a portion of the oxidation inhibition part and a transmittance in a transparent state was successfully improved by about 10% as compared with Practical Example 10.

For a sample in Practical Example 11 after a repetition durability test, a distribution condition and a chemical bond state of each element (O, Pd, Mg, or Y) in a film thickness distribution direction were measured by using XPS similarly to Comparative Example 2 and Practical Examples 1, 2, and 3. Here, a sample wherein an antireflection layer was released after a measurement of a visible transmittance was subjected to an XPS measurement. A result of the distribution condition of each element in a film thickness distribution direction is illustrated in FIG. 36.

Figure 36:
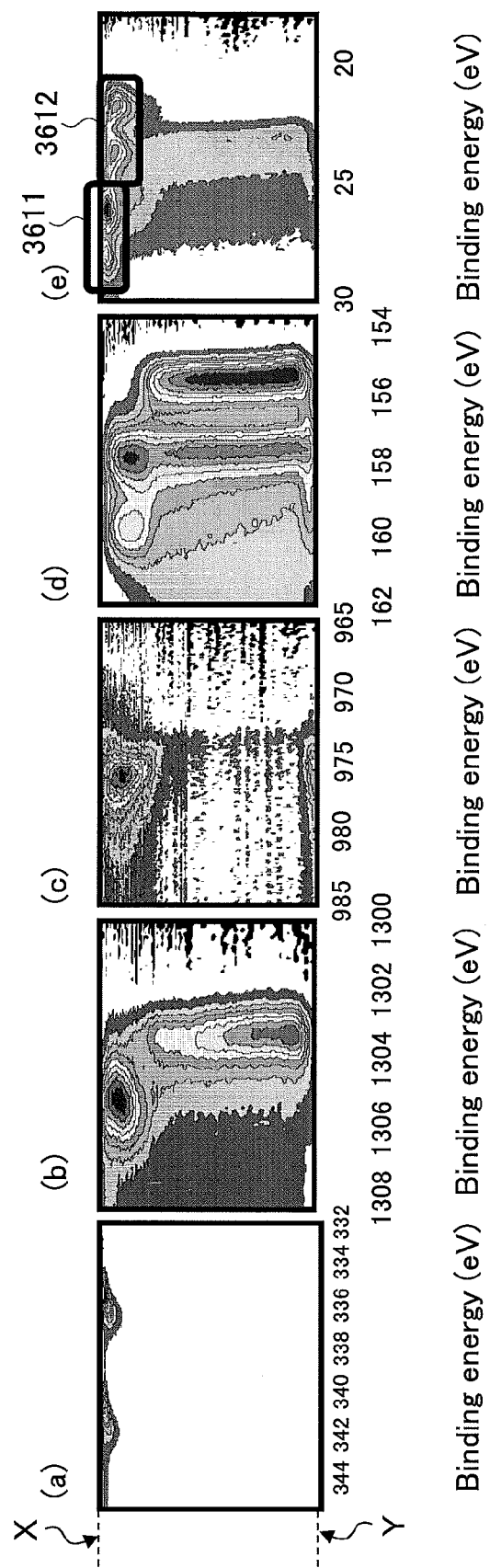
FIG. 36 A distribution condition of each element in a direction of a film thickness of a reflection-type optical control member after a repetition durability test for Practical Example 11 of the present invention

FIG. 36 is such that, for each element indicated in an upper part of each graph, a distribution thereof is mapped in a thickness direction of a reflection-type optical control member after a repetition durability test, wherein FIG. 36 (a), FIG. 36 (b), FIG. 36 (c), FIG. 36 (d), and FIG. 36 (e) illustrate distribution conditions for Pd, for Mg, for O, for Y, and for Ta, respectively. Furthermore, in FIG. 36 (a), a top of the figure that is a portion indicated by X and a bottom of the figure that is a portion indicated by Y illustrate a film surface and an interface with a glass substrate, respectively. For this reason, a distribution of a film interior is illustrated as going to a lower side (Y side) of the figure. A similar matter also applies to FIG. 36 (b)-(e).

From FIG. 36 (a), it was possible to find that a Ta layer was present in such a sample similarly to Practical Example 2 and thereby Pd was present only very near a film surface. Furthermore, as was clear from FIG. 36(c), little O (oxygen) was present very near a film surface where Pd was present, while a part of Ta in a formed film was oxidized and hence O (oxygen) was present in the film. It was possible to find that Ta was oxidized in a region designated as 3611 in FIG. 36 (e) from an energy value of a chemical bond. For that reason, it was considered that a visible transmittance in a transparent state was improved. Furthermore, it was possible to consider that Ta was present in a metallic state in a region designated as 3612 in FIG. 36 (e).

As described above, two kinds of oxidation inhibition layers that are a low-oxygen-permeability oxidation inhibition layer and a transmittance-variable oxidation inhibition layer used, so that it is possible to inhibit degradation of a reflection-type optical control layer without reducing a transmittance in a transparent state. Furthermore, an antireflection layer is provided, so that it is possible to improve a transmittance in a transparent state significantly.

APPENDIX

Illustrative Embodiment (1) is a reflection-type optical control element characterized by comprising: an optical control layer whose state is reversibly changed between a transparent state caused by hydrogenation and a reflective state caused by dehydrogenation; a catalyst layer that accelerates the hydrogenation and the dehydrogenation in the optical control layer; and an oxidation inhibition part that is arranged between the optical control layer and the catalyst layer and inhibits oxidation of the optical control layer that is caused by oxygen that permeates through the catalyst layer.

Illustrative Embodiment (2) is the reflection-type optical control element as described in Illustrative Embodiment (1), characterized in that the oxidation inhibition part comprises at least one of: an low-oxygen-permeability oxidation inhibition layer that has a hydrogen permeability and inhibits permeation of oxygen to inhibit oxidation of the optical control layer; a transmittance-variable oxidation inhibition layer that has a hydrogen permeability and reacts with oxygen to inhibit oxidation of the optical control layer and further changes a transmittance thereof due to hydrogenation; and a mixing-type oxidation inhibition layer that has a part that has a hydrogen permeability and inhibits permeation of oxygen to inhibit oxidation of the optical control layer and a part that reacts with oxygen to inhibit oxidation of the optical control layer and further change a transmittance thereof due to hydrogenation.

Illustrative Embodiment (3) is the reflection-type optical control element as described in Illustrative Embodiment (2), characterized in that: the oxidation inhibition part comprises the low-oxygen-permeability oxidation inhibition layer and the transmittance-variable oxidation inhibition layer; and the oxidation inhibition part comprises the transmittance-variable oxidation inhibition layer at a side of the optical control layer with respect to the low-oxygen-permeability oxidation inhibition layer.

Illustrative Embodiment (4) is the reflection-type optical control element as described in Illustrative Embodiment (2), characterized in that the low-oxygen-permeability oxidation inhibition layer is a thin film that includes a metal consisting of at least one of tungsten, tantalum, and hafnium or an alloy that includes the metal, and/or an oxide of the metal or the alloy.

Illustrative Embodiment (5) is the reflection-type optical control element as described in Illustrative Embodiment (2), characterized in that the transmittance-variable oxidation inhibition layer is a thin film that includes scandium or a magnesium-scandium alloy and/or a hydride of the scandium or the magnesium-scandium alloy.

Illustrative Embodiment (6) is the reflection-type optical control element as described in Illustrative Embodiment (5), wherein a composition of the magnesium-scandium alloy is $Mg_{1-x}Sc_x$ ($0.4 \le x < 1$).

Illustrative Embodiment (7) is the reflection-type optical control element as described in Illustrative Embodiment (2), wherein the oxidation inhibition layers that are comprised by the oxidation inhibition part are such that a thickness per one layer is less than or equal to 10 nm.

Illustrative Embodiment (8) is the reflection-type optical control element as described in Illustrative Embodiment (1), comprising an antireflection layer provided at an opposite side of the oxidation inhibition part with reference to the catalyst layer.

Illustrative Embodiment (9) is the reflection-type optical control element as described in Illustrative Embodiment (8), wherein a refractive index of the antireflection layer is greater than or equal to 1.3 and less than or equal to 3.4.

Illustrative Embodiment (10) is the reflection-type optical control element as described in Illustrative Embodiment (8), wherein a film thickness of the antireflection layer is greater than or equal to 25 nm and less than or equal to 125 nm.

Illustrative Embodiment (11) is the reflection-type optical control element as described in Illustrative Embodiment (8), wherein the antireflection layer includes a metal oxide and/or a polymer.

Illustrative Embodiment (12) is the reflection-type optical control element as described in Illustrative Embodiment (11), wherein the metal oxide has at least one of cerium oxide, hafnium oxide, niobium pentoxide, tantalum pentoxide, titanium dioxide, tungsten oxide, yttrium oxide, zinc oxide, and zirconium oxide.

Illustrative Embodiment (13) is the reflection-type optical control element as described in Illustrative Embodiment (11), wherein the polymer has a fluororesin.

Although the present invention has been described by means of practical examples, it goes without saying that the present invention is not limited to the practical examples described above and a variety of deformations and improvements are possible within the scope of the present invention.

The present international application claims priority based on Japanese Patent Application No. 2012-139118 and Japanese Patent Application No. 2013-089550 filed on Jun. 20, 2012 and Apr. 22, 2013 and entire contents of Japanese Patent Application No. 2012-139118 and Japanese Patent Application No. 2013-089550 are incorporated by reference herein or in the present international application.

EXPLANATION OF LETTERS OR NUMERALS

10 An optical control layer
20 A catalyst layer
30 An oxidation inhibition part
32 A low-oxygen-permeability oxidation inhibition layer
34 A transmittance-variable oxidation inhibition layer
40 A transparent member
45 An antireflection layer

The invention claimed is:

1. A reflection-type optical control element, comprising:
an optical control layer whose state is reversibly changed between a transparent state caused by hydrogenation and a reflective state caused by dehydrogenation;
a catalyst layer that accelerates the hydrogenation and the dehydrogenation in the optical control layer; and
an oxidation inhibition part that is arranged between the optical control layer and the catalyst layer and inhibits oxidation of the optical control layer that is caused by oxygen that permeates through the catalyst layer.

2. The reflection-type optical control element as claimed in claim 1, wherein the oxidation inhibition part includes at least one of:
an low-oxygen-permeability oxidation inhibition layer that has a hydrogen permeability and inhibits permeation of oxygen to inhibit oxidation of the optical control layer;
a transmittance-variable oxidation inhibition layer that has a hydrogen permeability and reacts with oxygen to inhibit oxidation of the optical control layer and further changes a transmittance thereof due to hydrogenation; and
a mixing-type oxidation inhibition layer that has a part that has a hydrogen permeability and inhibits permeation of oxygen to inhibit oxidation of the optical control layer and a part that reacts with oxygen to inhibit oxidation of the optical control layer and further change a transmittance thereof due to hydrogenation.

3. The reflection-type optical control element as claimed in claim 2, wherein:
the oxidation inhibition part includes the low-oxygen-permeability oxidation inhibition layer and the transmittance-variable oxidation inhibition layer; and
the oxidation inhibition part includes the transmittance-variable oxidation inhibition layer at a side of the optical control layer with respect to the low-oxygen-permeability oxidation inhibition layer.

4. The reflection-type optical control element as claimed in claim 2, wherein the low-oxygen-permeability oxidation inhibition layer is a thin film that includes a metal consisting of at least one of tungsten, tantalum, and hafnium or an alloy that includes the metal, or an oxide of the metal or the alloy.

5. The reflection-type optical control element as claimed in claim 2, wherein the transmittance-variable oxidation inhibition layer is a thin film that includes scandium or a magnesium-scandium alloy or a hydride of the scandium or the magnesium-scandium alloy.

6. The reflection-type optical control element as claimed in claim 5, wherein a composition of the magnesium-scandium alloy is $Mg_{1-x}Sc_x$ ($0.4 \leq x < 1$).

7. The reflection-type optical control element as claimed in claim 2, wherein the oxidation inhibition layers that are included in the oxidation inhibition part are such that a thickness per one layer is 10 nm or less.

8. The reflection-type optical control element as claimed in claim 1, further comprising an antireflection layer provided at an opposite side of the oxidation inhibition part with reference to the catalyst layer.

9. The reflection-type optical control element as claimed in claim 8, wherein a refractive index of the antireflection layer is 1.3 or greater and 3.4 or less.

10. The reflection-type optical control element as claimed in claim 8, wherein a film thickness of the antireflection layer is 25 nm or greater and 125 nm or less.

11. The reflection-type optical control element as claimed in claim 8, wherein the antireflection layer includes a metal oxide or a polymer.

12. The reflection-type optical control element as claimed in claim 11, wherein the antireflection layer includes a metal oxide, and the metal oxide has at least one of cerium oxide, hafnium oxide, niobium pentoxide, tantalum pentoxide, titanium dioxide, tungsten oxide, yttrium oxide, zinc oxide, and zirconium oxide.

13. The reflection-type optical control element as claimed in claim 11, wherein the antireflection layer includes a polymer, and the polymer has a fluororesin.

* * * * *